United States Patent [19]

Fukushima et al.

[11] Patent Number: 4,787,721
[45] Date of Patent: Nov. 29, 1988

[54] PHOTOGRAPHIC LENS SYSTEM

[75] Inventors: Akira Fukushima; Yoshinobu Kudo, both of Osaka, Japan

[73] Assignee: Minolta Camera Kabushiki Kaisha, Osaka, Japan

[21] Appl. No.: 766,822

[22] Filed: Aug. 16, 1985

[30] Foreign Application Priority Data

Aug. 18, 1984 [JP] Japan ................................ 59-172268
Dec. 10, 1984 [JP] Japan ................................ 59-261365

[51] Int. Cl.$^4$ ........................ G02B 13/18; G02B 9/60; G02B 9/62
[52] U.S. Cl. ................................ 350/432; 350/464; 350/465
[58] Field of Search ............... 350/432, 433, 434, 435, 350/464, 465

[56] References Cited

U.S. PATENT DOCUMENTS

| | | | |
|---|---|---|---|
| 4,458,991 | 7/1984 | Yamada | 350/432 X |
| 4,477,154 | 10/1984 | Sato | 350/432 |
| 4,596,447 | 6/1986 | Yamada et al. | 350/432 X |
| 4,659,190 | 4/1987 | Mihara | 350/432 |

FOREIGN PATENT DOCUMENTS

| | | |
|---|---|---|
| 54-76147 | 6/1979 | Japan . |
| 54-76148 | 6/1979 | Japan . |
| 56-95207 | 8/1981 | Japan . |
| 56-99314 | 8/1981 | Japan . |
| 56-133711 | 10/1981 | Japan . |
| 56-142515 | 11/1981 | Japan . |
| 57-22215 | 2/1982 | Japan . |
| 57-30814 | 2/1982 | Japan . |
| 57-40219 | 3/1982 | Japan . |
| 57-93310 | 6/1982 | Japan . |
| 58-1117 | 1/1983 | Japan . |
| 58-33211 | 2/1983 | Japan . |
| 58-46312 | 3/1983 | Japan . |
| 58-62608 | 4/1983 | Japan . |
| 58-107509 | 6/1983 | Japan . |
| 58-156916 | 9/1983 | Japan . |
| 58-219509 | 12/1983 | Japan . |
| 59-34508 | 2/1984 | Japan . |
| 59-34509 | 2/1984 | Japan . |
| 59-50416 | 3/1984 | Japan . |
| 59-44016 | 3/1984 | Japan . |
| 59-78315 | 5/1984 | Japan . |
| 59-94727 | 5/1984 | Japan . |
| 59-87418 | 5/1984 | Japan . |
| 59-83121 | 5/1984 | Japan . |
| 59-109018 | 6/1984 | Japan . |
| 59-137916 | 8/1984 | Japan . |
| 59-195212 | 11/1984 | Japan . |
| 59-195213 | 11/1984 | Japan . |

Primary Examiner—John K. Corbin
Assistant Examiner—Scott J. Sugarman
Attorney, Agent, or Firm—Price, Gess & Ubell

[57] ABSTRACT

An improved compact telephoto type lens system is provided, including a front lens group of a positive refractive power having at least four lens components with one of the lens components having an aspheric surface and a rear lens group of a negative refractive power. The aspheric lens component can be a composite lens component of a glass substrate with a thin plastic aspheric surface.

28 Claims, 44 Drawing Sheets

FIG. 1
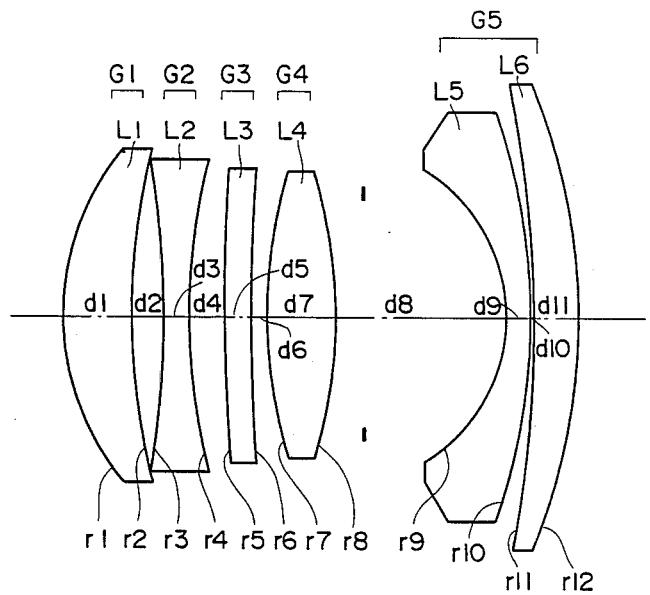
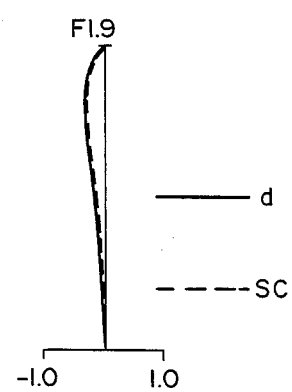
FIG.2(a)
Spherical Aberration
Sine Condition
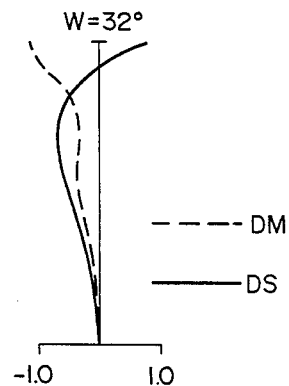
FIG.2(b)
Astigmatism
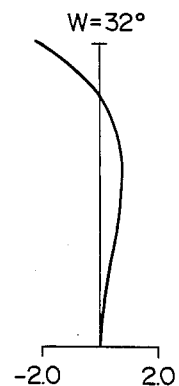
FIG.2(c)
Distortion(%)

FIG. 3
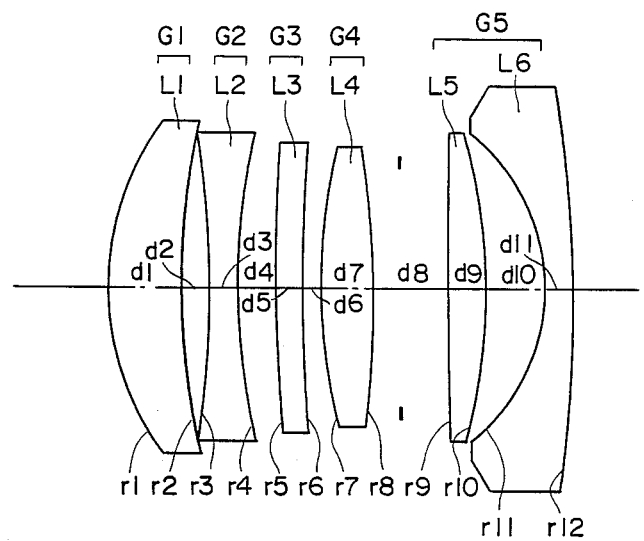
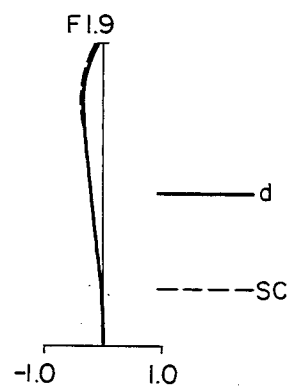
FIG.4(a)
Spherical Aberration
Sine Condition
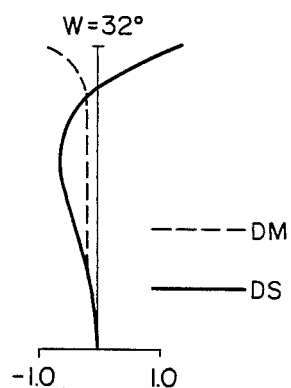
FIG.4(b)
Astigmatism
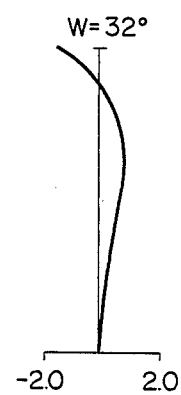
FIG.4(c)
Distortion(%)

Spherical Aberration
Sine Condition

Astigmatism

Distortion(%)

FIG. 7
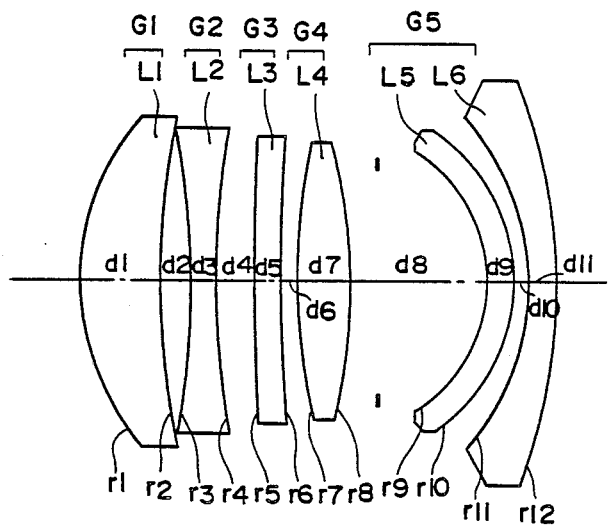
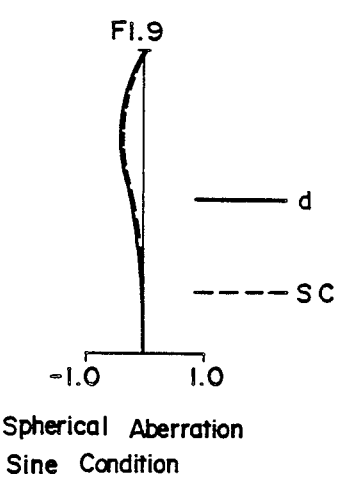
FIG. 8(a)
Spherical Aberration
Sine Condition
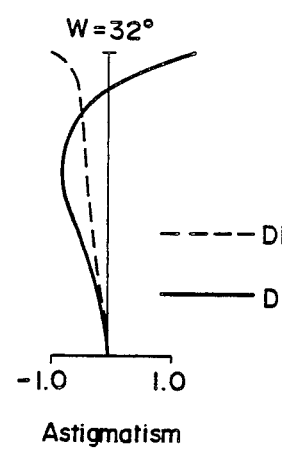
FIG. 8(b)
Astigmatism
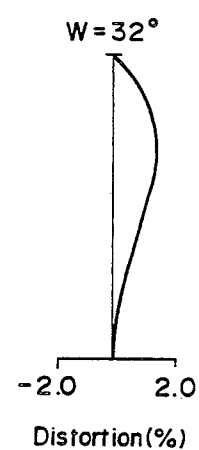
FIG. 8(c)
Distortion(%)

F1.9

— d
---- SC

Spherical Aberration
Sine Condition

W = 32°

---- DM
— DS

Astigmatism

W = 32°

Distortion(%)

Spherical Aberration
Sine Condition

Astigmatism

Distortion(%)

Spherical Aberration
Sine Condition

Astigmatism

Distortion(%)

F1.9

— d
---- SC

-1.0  1.0

Spherical Aberration
Sine Condition

W =32°

---- DM
— DS

-1.0  1.0

Astigmatism

W =32°

-2.0  2.0

Distortion(%)

Spherical Aberration
Sine Condition

Astigmatism

Distortion(%)

Spherical Aberration
Sine Condition

Astigmatism

Distortion(%)

Spherical Aberration
Sine Condition

Astigmatism

Distorrion(%)

Spherical Aberration
Sine Condition

Astigmatism

Distortion(%)

Spherical Aberration
Sine Condition

Astigmatism

Distortion(%)

Spherical Aberration
Sine Condition

Astigmatism

Distortion(%)

FIG. 29
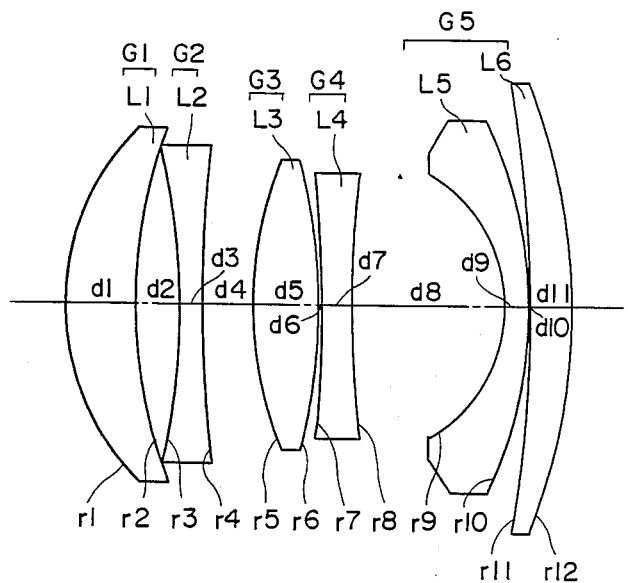
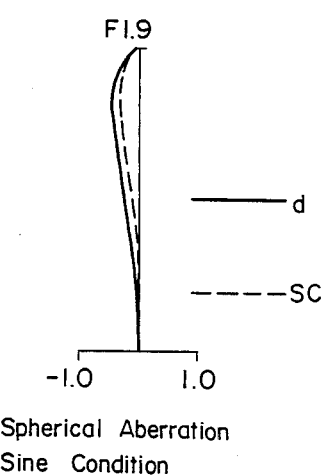
FIG. 30(a)
Spherical Aberration
Sine Condition
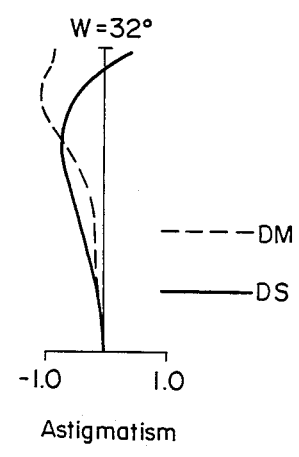
FIG. 30(b)
Astigmatism
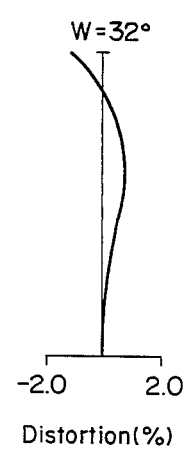
FIG. 30(c)
Distortion(%)

Spherical Aberration
Sine Condition

Astigmatism

Distortion(%)

Spherical Aberration
Sine Condition

Astigmatism

Distortion (%)

Spherical Aberration
Sine Condition

Astigmatism

Distortion(%)

Spherical Aberration
Sine Condition

Astigmatism

Distortion(%)

F1.9

—— d
----- SC

-1.0   1.0

Spherical Aberration
Sine Condition

W=32°

----DM
——DS

-1.0   1.0

Astigmatism

W=32°

-2.0   2.0

Distortion(%)

F 1.9

——— d
---- SC

-1.0   1.0

Spherical Aberration
Sine Condition

W=32°

---- DM
——— DS

-1.0   1.0

Astigmatism

W=32°

-2.0   2.0

Distortion (%)

F1.9

—— d
---- SC

-1.0   1.0

Spherical Aberration
Sine Condition

W = 32°

---- DM
—— DS

-1.0   1.0

Astigmatism

W = 32°

-2.0   2.0

Distortion(%)

Spherical Aberration
Sine Condition

Astigmatism

Distortion (%)

Spherical Aberration
Sine Condition

Astigmatism

Distortion(%)

F1.9

— d
---- SC

-1.0  1.0

Spherical Aberration
Sine Condition

W=32°

---- DM
—— DS

-1.0  1.0

Astigmatism

W=32°

-2.0  2.0

Distortion(%)

Spherical Aberration
Sine Condition

Astigmatism

Distortion(%)

Spherical Aberration
Sine Condition

Astigmatism

Distortion(%)

Spherical Aberration

Astigmatism

Distortion(%)

Spherical Aberration
Sine Condition

Astigmatism

Distortion(%)

Spherical Aberration
Sine Condition

Astigmatism

Distortion (%)

Spherical Aberration
Sine Condition

Astigmatism

Distortion(%)

Spherical Aberration
Sine Condition

Astigmatism

Distortion(%)

Spherical Aberration
Sine Condition

Astigmatism

Distortion(%)

FIG. 67
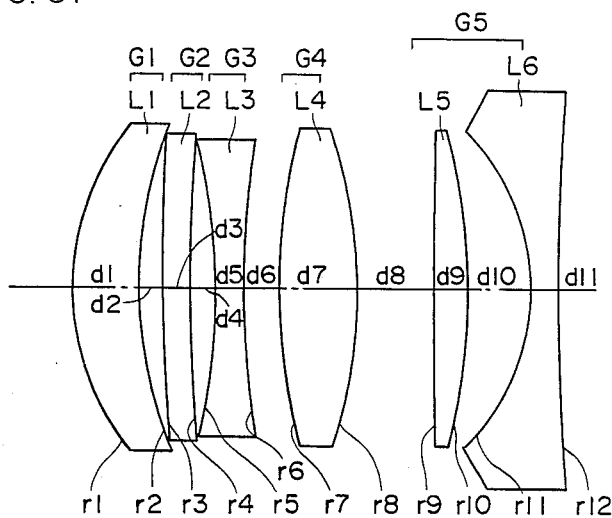
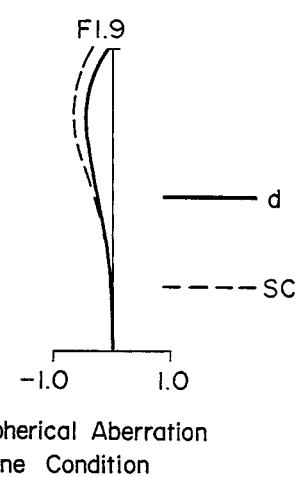
FIG. 68(a)
Spherical Aberration
Sine Condition
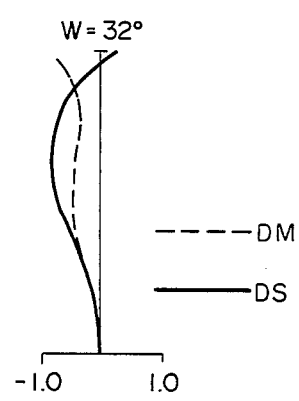
FIG. 68(b)
Astigmatism
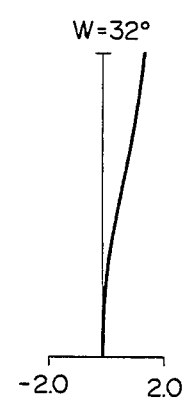
FIG. 68(c)
Distortion(%)

Spherical Aberration
Sine Condition

Astigmatism

Distortion(%)

Spherical Aberration
Sine Condition

Astigmatism

Distortion(%)

Spherical Aberration
Sine Condition

Astigmatism

Distorrion(%)

Spherical Aberration
Sine Condition

Astigmatism

Distortion(%)

Spherical Aberration
Sine Condition

Astigmatism

Distortion (%)

Spherical Aberration    Astigmatism    Distortion (%)
Sine Condition

Spherical Aberration
Sine Condition

Astigmatism

Distortion(%)

Spherical Aberration
Sine Condition

Astigmatism

Distortion(%)

Spherical Aberration
Sine Condition

Astigmatism

Distortion(%)

FIG.88(a) Spherical Aberration Sine Condition

FIG.88(b) Astigmatism

FIG.88(c) Distortion(%)

PHOTOGRAPHIC LENS SYSTEM

BACKGROUND OF THE INVENTION

1. Field of the Invention

The present invention relates to a photographic lens system, and more particular to a photographic lens system suitable for 35 mm lens-shutter camera.

2. Description of the Prior Art

Recently, in the field of 35 mm lens-shutter cameras, compactness thereof is a highly desired design characteristic, and therefore, compactness of the photographic lens for 35 mm lens shutter cameras is also required. In this circumstance, an telephoto type lens system which comprises a negative front lens group and a positive rear lens group, is known as a lens system suitable for compactness, and is applied in many lens-shutter cameras. However, aperture ratios of almost all of the known telephoto type lens system are equal to or less than 1:2.8.

Thus, if the aperture ratio of the lens system can be increased, it would enable photography in lower light conditions, and to extend the photographic permissible distance range in flash photography.

SUMMARY OF THE INVENTION

An object of the present invention is to provide a photographic lens system having an aperture ratio of about 1:1.9, a field of view of about 64°, and a good correction of aberrations.

In the telephoto type lens system, it becomes a problem to correct the spherical aberration and the distortion when providing a large aperture ratio. Especially, with respect to the spherical aberration, it is necessary to overcome two problems as follows: a first problem is to correct the deterioration of the spherical aberration due to the large aperture ratio and a second problem is to correct the change of the spherical aberration due to the focusing operation, when the front lens group is shifted for focusing. To solve the the second problem, it is necessary to correct the spherical aberration well within the front lens group. Therefore, it is effective for correcting the spherical aberration to construct the front lens unit by at least four lens components and to introduce at least an aspheric lens surface to the front lens unit.

Thus, according to the present invention, the photographic lens system comprises from the object side to the image side, a front lens unit of a positive refractive power including at least four lens components with at least one surface having an aspheric surface, and a rear lens unit of a negative refractive power all of whose refractive surfaces are spheric, wherein the lens system fulfills the following condition when $0.5\ R_F < h < R_F$ is maintained:

$$t_F(h) > r_l\left(1 - \sqrt{1 - \left(\frac{h}{r_l}\right)^2}\right) - r_k\left(1 - \sqrt{1 - \left(\frac{h}{r_k}\right)^2}\right) + d_F$$

wherein, h represents the height from the optical axis, $t_F(h)$ represents the thickness of the lens component having the aspheric surface in the front lens unit on the height h, $r_k$ represents the paraxial radius of curvature of the object side surface of the lens component having the aspheric surface in the front lens unit, $r_l$ represents the paraxial radius of curvature of the image side surface of the lens component having the aspheric surface in the front lens unit, $d_F$ represents the axial thickness of the lens component having the aspheric surface in the front lens unit, and $R_F$ represents the minimum value among $|r_k|$, $|r_l|$, and the effective height of the aspheric surface of the front lens unit.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

BRIEF DESCRIPTION OF THE DRAWINGS

FIG. 1 represents a cross sectional view of the first embodiment of the present invention;

FIGS. 2 (a) (b) (c) represent the aberration curves of the first embodiment;

FIG. 3 prepresents a cross sectional view of the second embodiment;

FIGS. 4 (a) (b) (c) represent the aberration curves of the second embodiment;

FIG. 7 represents a cross sectional view of the fourth embodiment;

FIGS. 8 (a) (b) (c) represent the aberration curves of the fourth embodiment;

FIG. 29 represents a cross sectional view of the fifteenth embodiment;

FIGS. 30 (a) (b) (c) represent the aberration curves of the fifteenth embodiment;

FIGS. 40 (a) (b) (c) represent the aberration curves of the twentieth embodiment;

FIGS. 42 (a) (b) (c) represent the aberration curves of the twenty-first embodiment;

FIG. 67 represents a cross sectional view of the thirty-fourth embodiment;

FIGS. 68 (a) (b) (c) represent the aberration curves of the thirty-fourth embodiment;

FIGS. 88 (a) (b) (c) represent the aberration curves of the forty-fourth embodiment.

DETAILED DESCRIPTION OF THE PREFERRED EMBODIMENT

Figure 5:
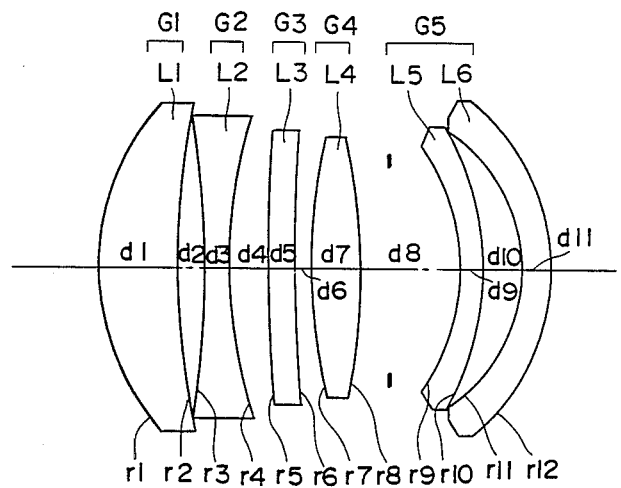
FIG. 5 represents a cross sectional view of the third embodiment.
Figure 6A:
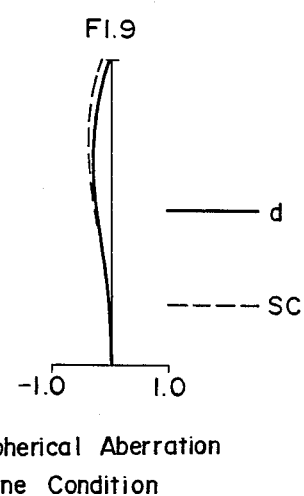
FIGS. 6 (a) (b) (c) represent the aberration curves of the third embodiment.
Figure 6B:
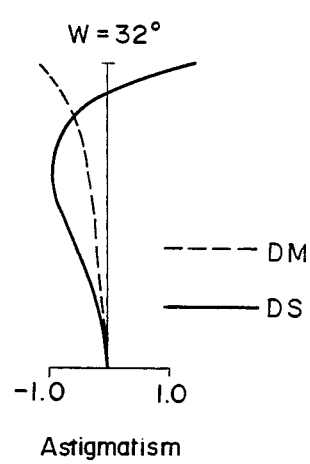
Figure 6C:
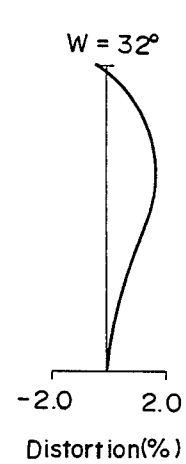

The following description is provided to enable any person skilled in the optical and camera field to make and use the invention and sets forth the best modes contemplated by the inventors for carrying out their invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm lens-shutter camera.

In the drawings, schematic cross sectional views disclose the position of the lens groups and lens elements. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 9:
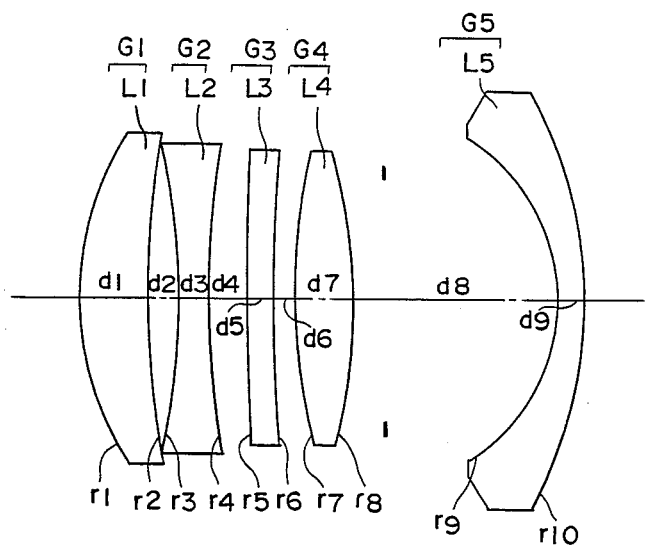
FIG. 9 represents a cross sectional view of the fifth embodiment.
Figure 10A:
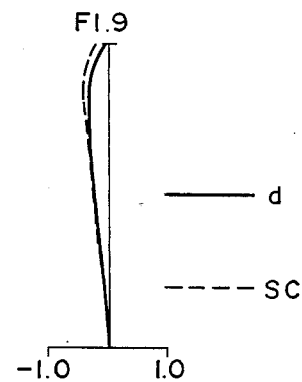
FIGS. 10 (a) (b) (c) represent the aberration curves of the fifth embodiment.
Figure 10B:
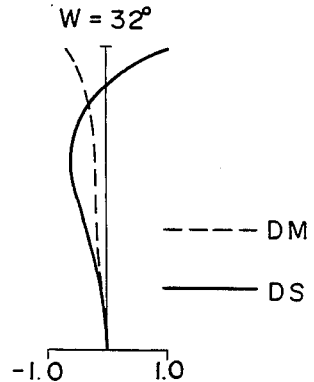
Figure 10C:
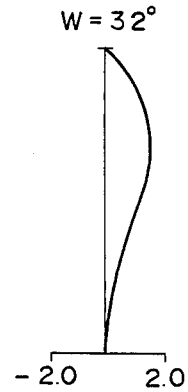
Figure 11:
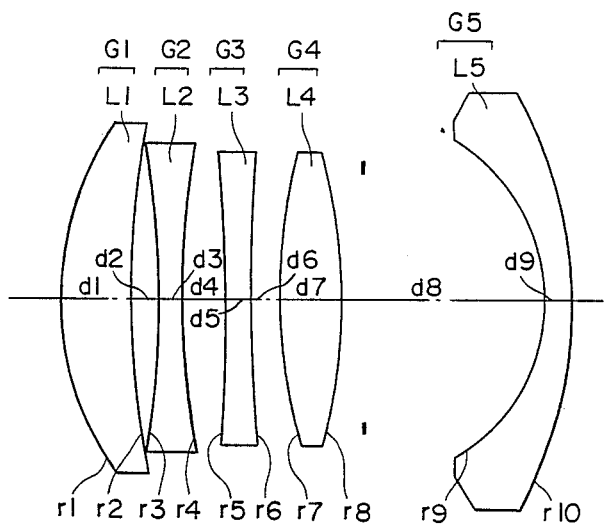
FIG. 11 represents a cross sectional view of the sixth embodiment.
Figure 12A:
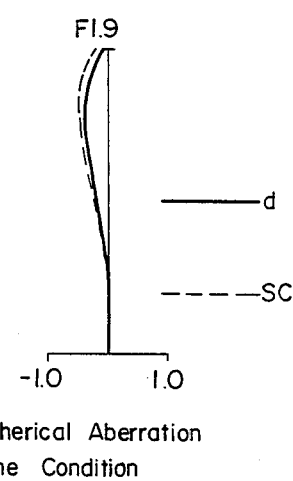
FIGS. 12 (a) (b) (c) represent the aberration curves of the sixth embodiment.
Figure 12B:
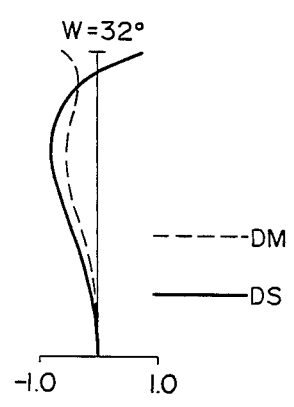
Figure 12C:
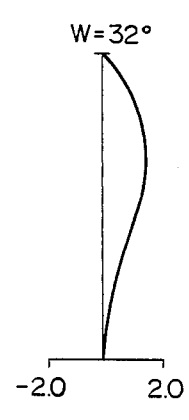
Figure 13:
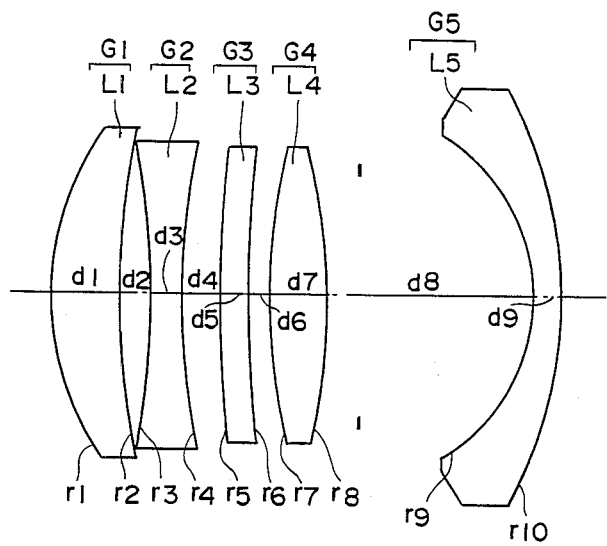
FIG. 13 represents a cross sectional view of the seventh embodiment.
Figure 14A:
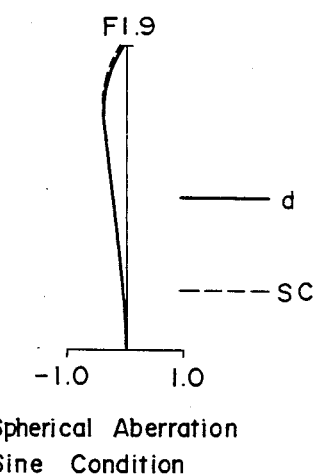
FIGS. 14 (a) (b) (c) represent the aberration curves of the seventh embodiment.
Figure 14B:
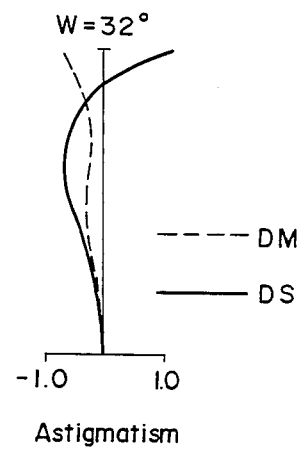
Figure 14C:
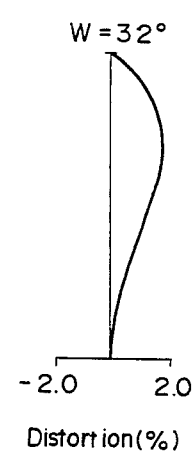
Figure 15:
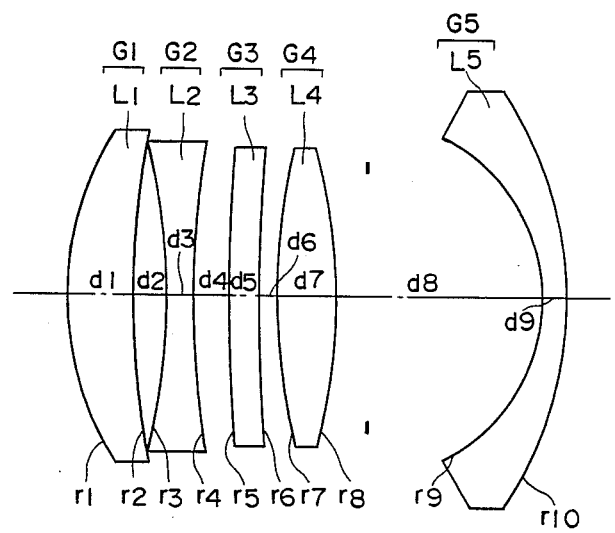
FIG. 15 represents a cross sectional view of the eighth embodiment.
Figure 16A:
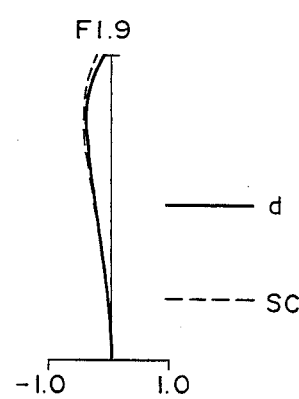
FIGS. 16 (a) (b) (c) represent the aberration curves of the eighth embodiment.
Figure 16B:
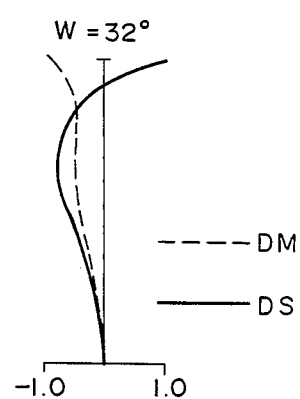
Figure 16C:
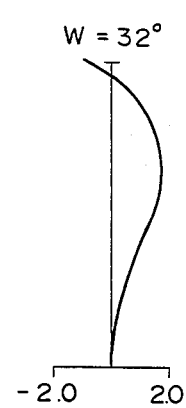
Figure 17:
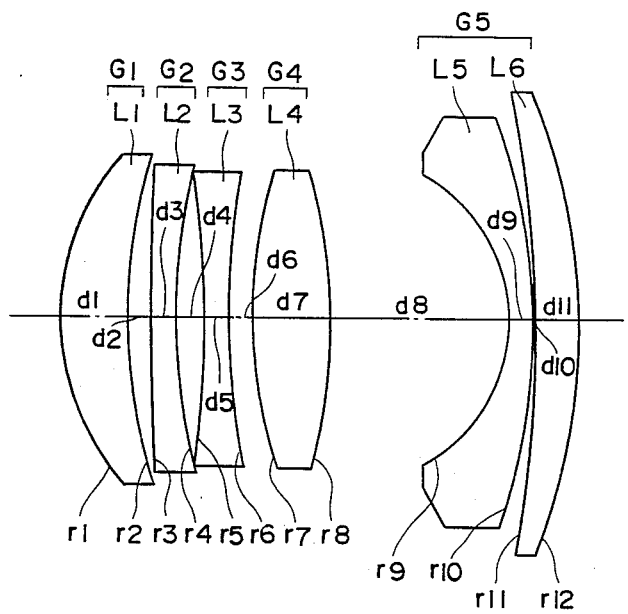
FIG. 17 represents a cross sectional view of the ninth embodiment.
Figure 18A:
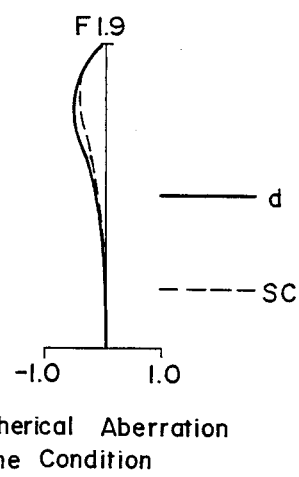
FIGS. 18 (a) (b) (c) represent the aberration curves of the ninth embodiment.
Figure 18B:
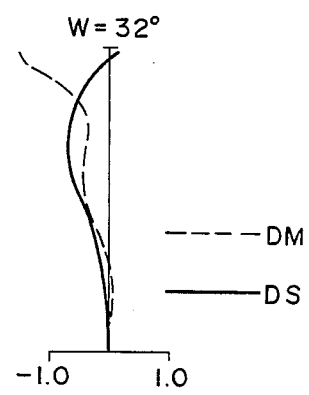
Figure 18C:
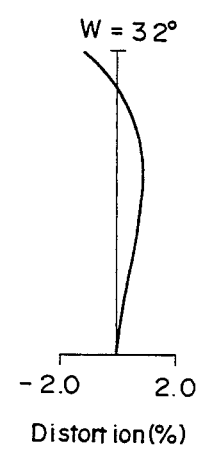
Figure 19:
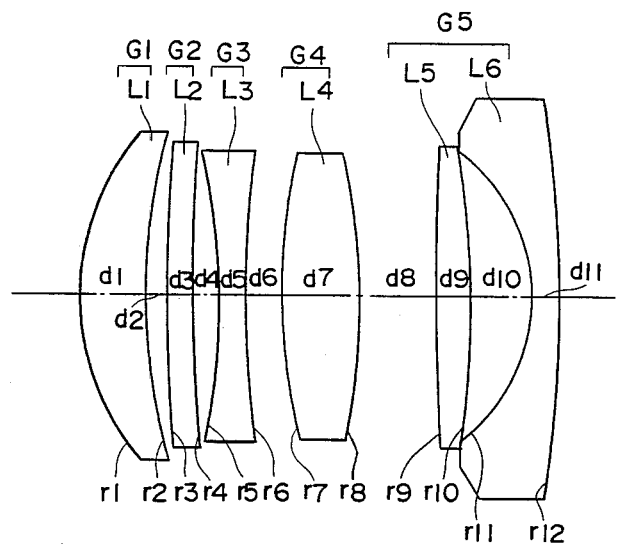
FIG. 19 represents a cross sectional view of the tenth embodiment.
Figure 20A:
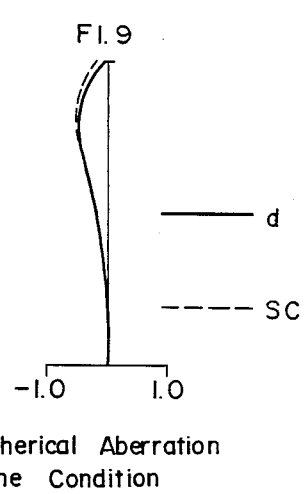
FIGS. 20 (a) (b) (c) represent the aberration curves of the tenth embodiment.
Figure 20B:
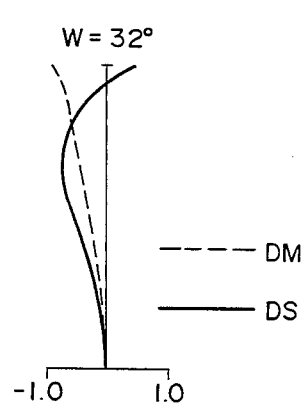
Figure 20C:
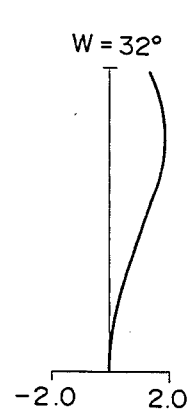
Figure 21:
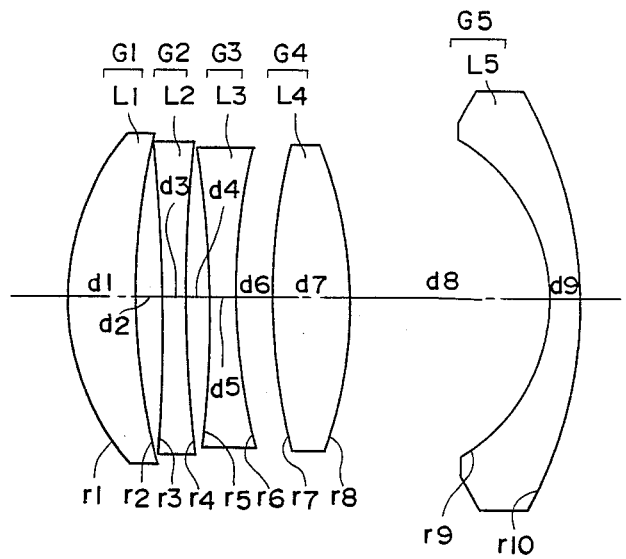
FIG. 21 represents a cross sectional view of the eleventh embodiment.
Figure 22A:
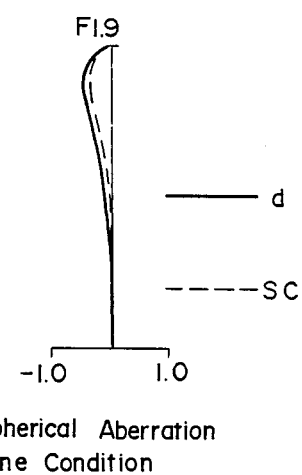
FIGS. 22 (a) (b) (c) represent the aberration curves of the eleventh embodiment.
Figure 22B:
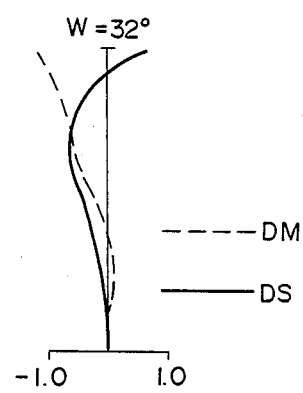
Figure 22C:
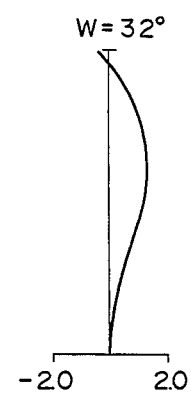
Figure 23:
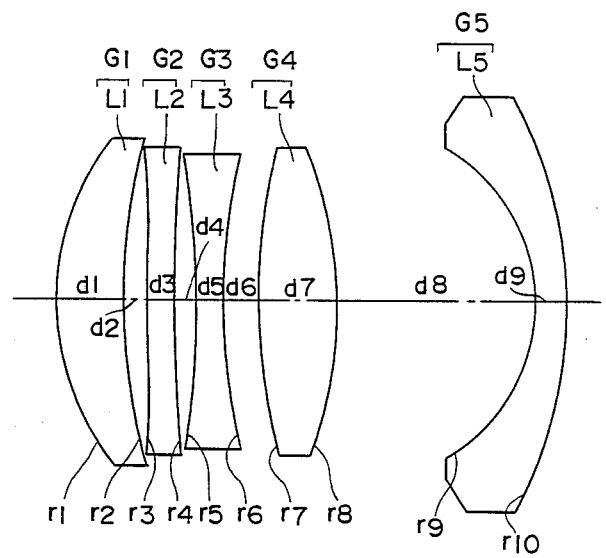
FIG. 23 represents a cross sectional view of the twelfth embodiment.
Figure 24A:
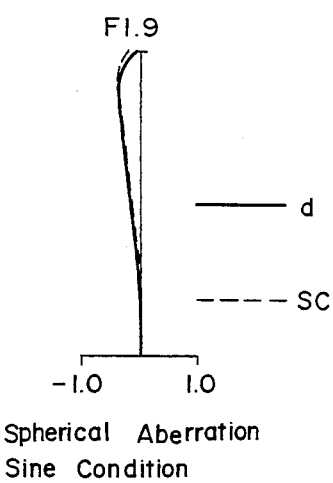
FIGS. 24 (a) (b) (c) represent the aberration curves of the twelfth embodiment.
Figure 24B:
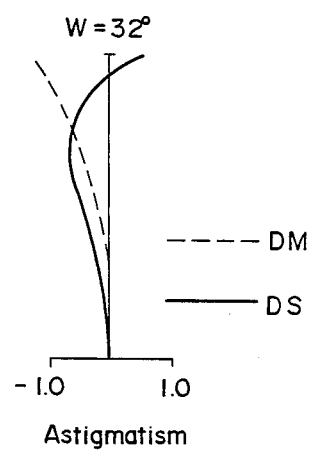
Figure 24C:
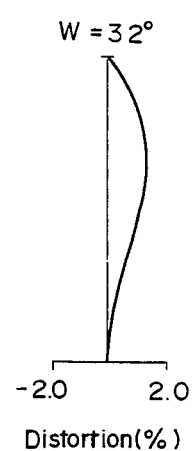
Figure 25:
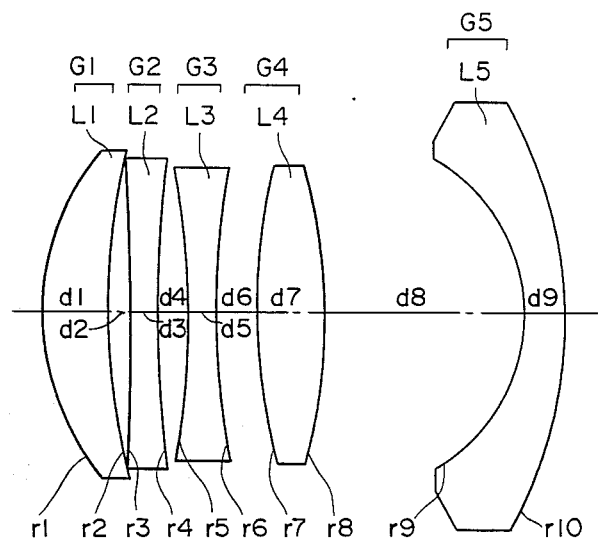
FIG. 25 represents a cross sectional view of the thirteenth embodiment.
Figure 26A:
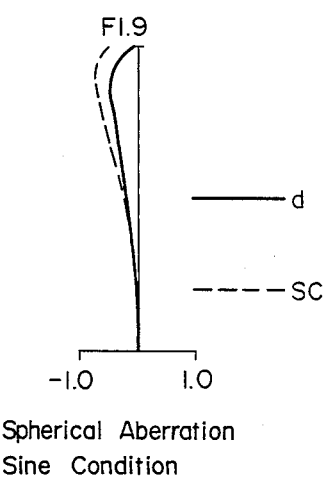
FIGS. 26 (a) (b) (c) represent the aberration curves of the thirteenth embodiment.
Figure 26B:
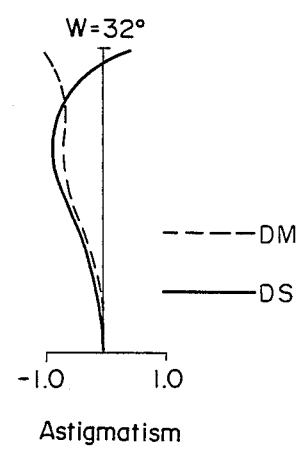
Figure 26C:
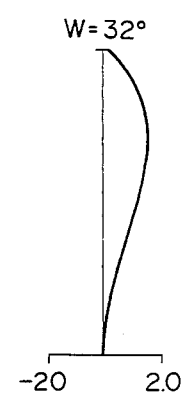
Figure 27:
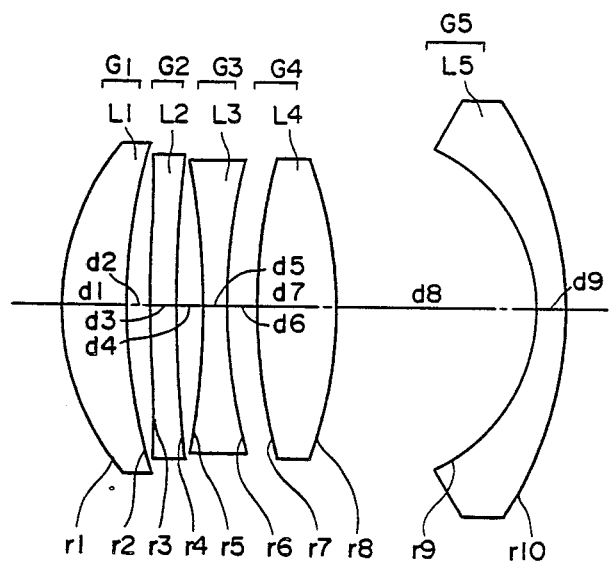
FIG. 27 represents a cross sectional view of the fourteenth embodiment.
Figure 28A:
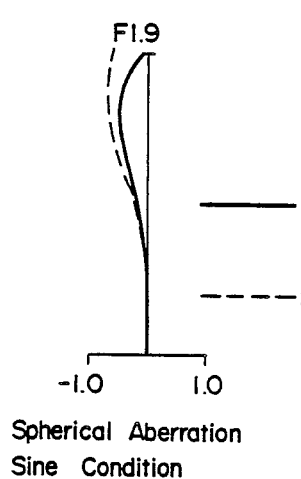
FIGS. 28 (a) (b) (c) represent the aberration curves of the fourteenth embodiment.
Figure 28B:
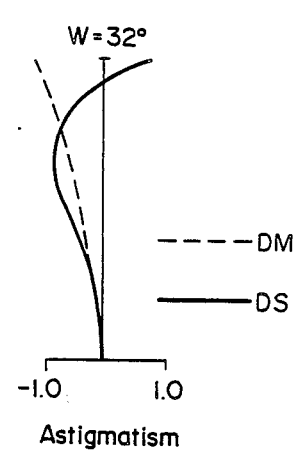
Figure 28C:
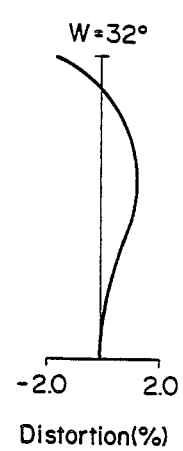
Figure 31:
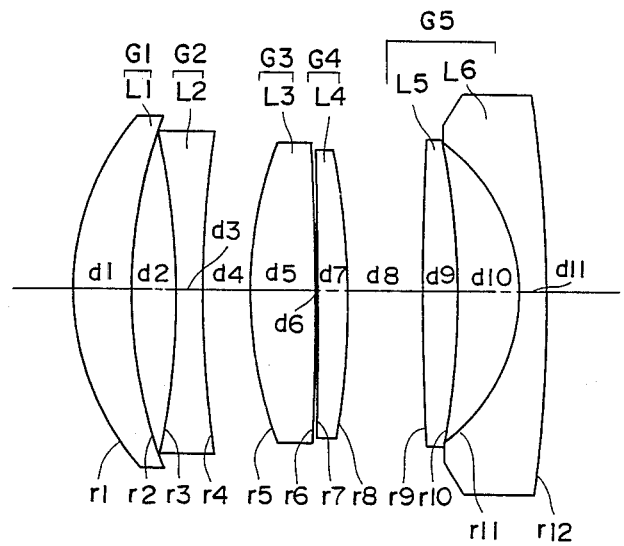
FIG. 31 represents a cross sectional view of the sixteenth embodiment.
Figure 32A:
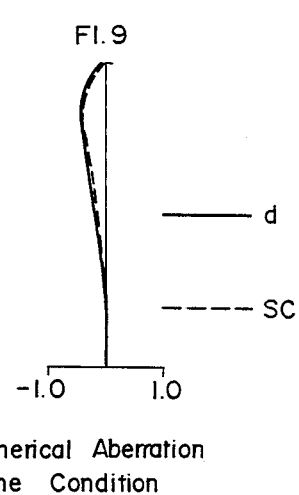
FIGS. 32 (a) (b) (c) represent the aberration curves of the the sixteenth embodiment.
Figure 32B:
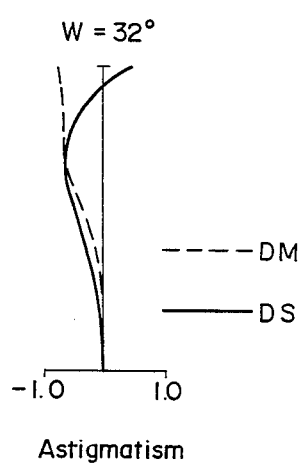
Figure 32C:
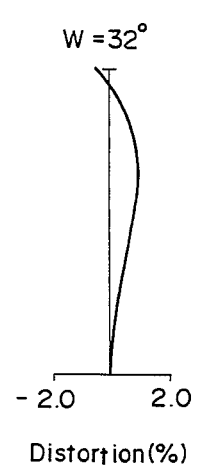
Figure 33:
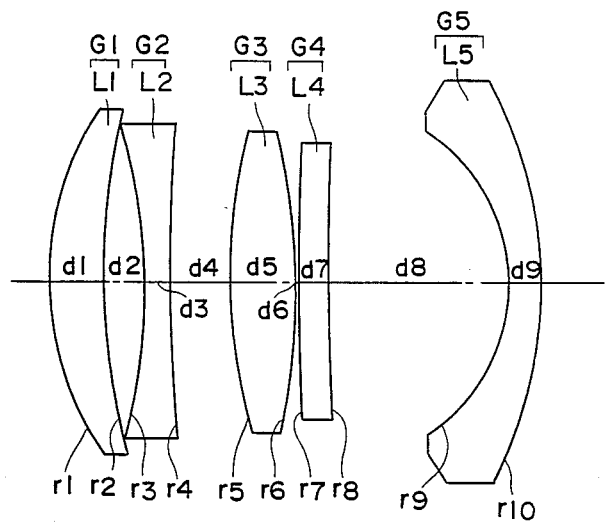
FIG. 33 represents a cross sectional view of the seventeenth embodiment.
Figure 34A:
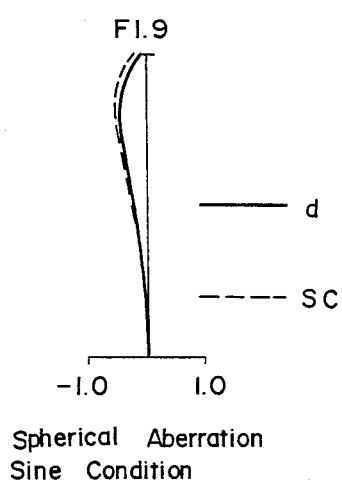
FIGS. 34 (a) (b) (c) represent the aberration curves of the seventeenth embodiment.
Figure 34B:
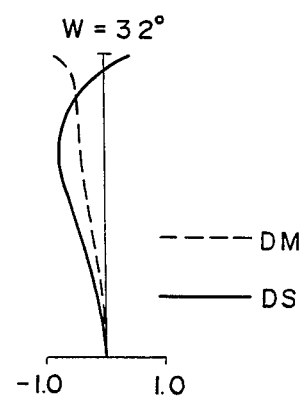
Figure 34C:
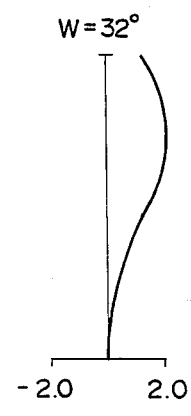
Figure 35:
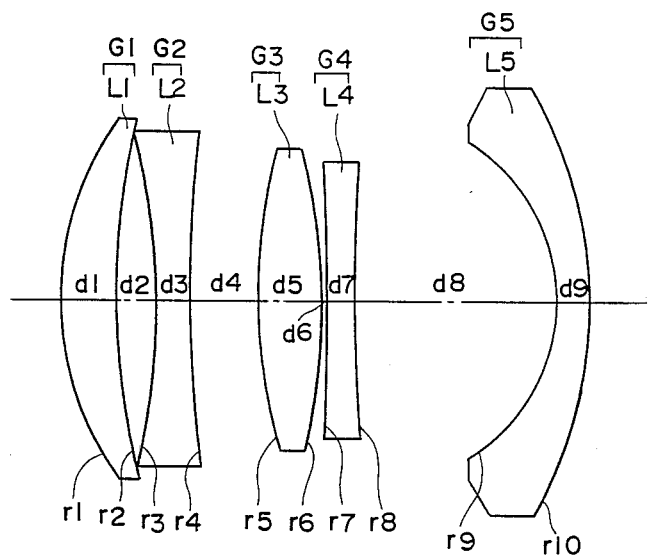
FIG. 35 represents a cross sectional view of the eighteenth embodiment.
Figure 36A:
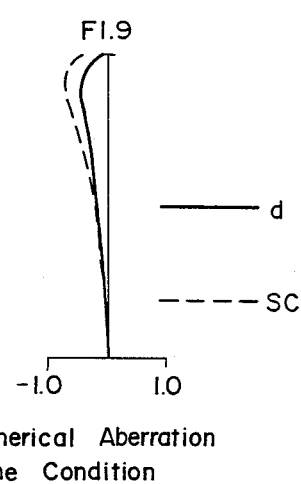
FIGS. 36 (a) (b) (c) represent the aberration curves of the eighteenth embodiment.
Figure 36B:
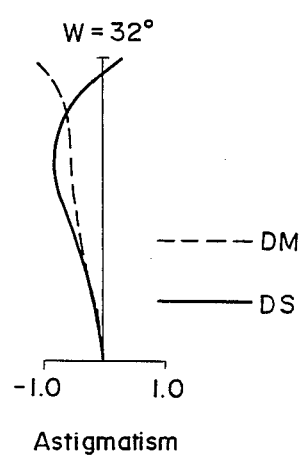
Figure 36C:
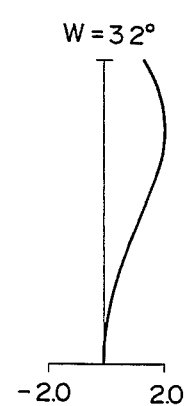
Figure 37:
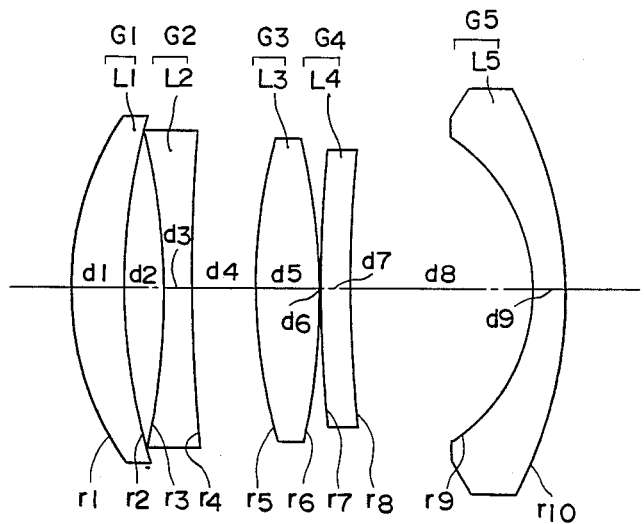
FIG. 37 represents a cross sectional view of the nineteenth embodiment.
Figure 38A:
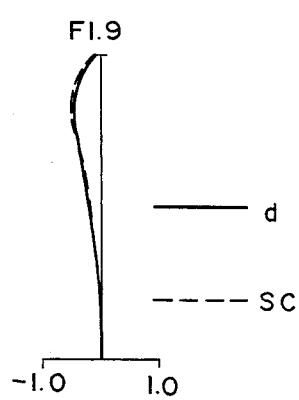
FIGS. 38 (a) (b) (c) represent the aberration curves of the nineteenth embodiment.
Figure 38B:
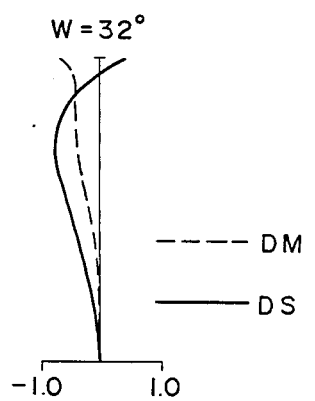
Figure 38C:
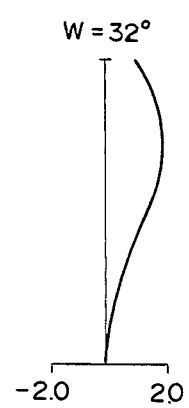
Figures 39, 40A, 40B, 40C:
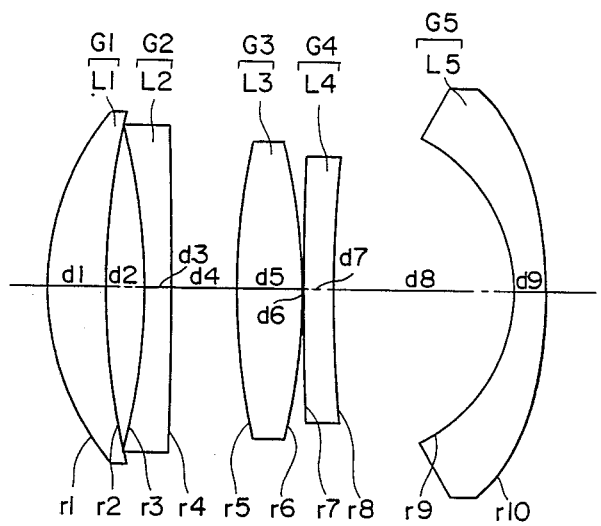
FIG. 39 represents a cross sectional view of the twentieth embodiment.
Figures 41, 42A, 42B, 42C:
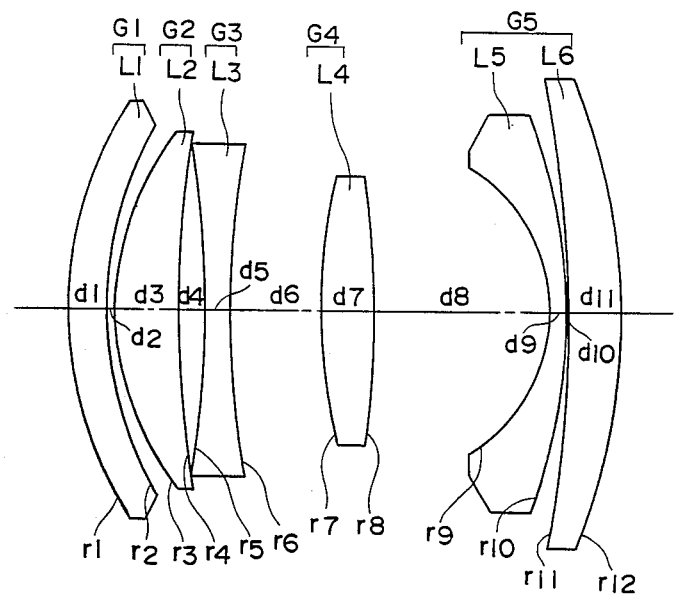
FIG. 41 represents a cross sectional view of the twenty-first embodiment.
Figure 43:
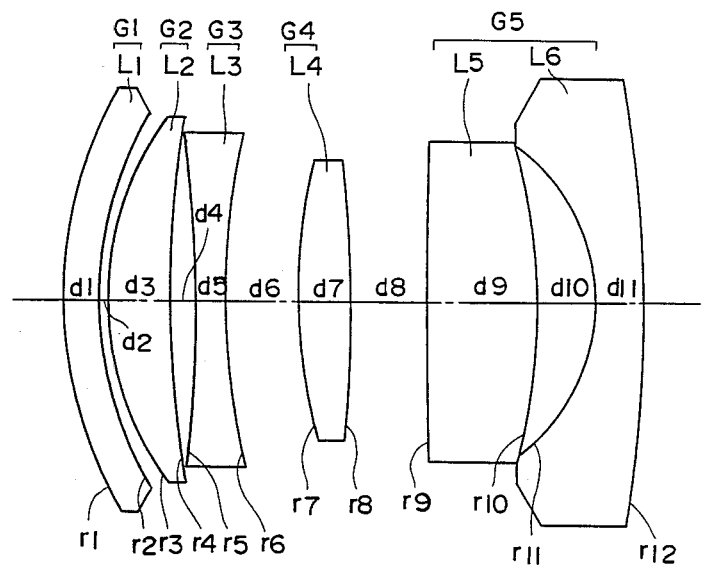
FIG. 43 represents a cross sectional view of the twenty-second embodiment.
Figure 44A:
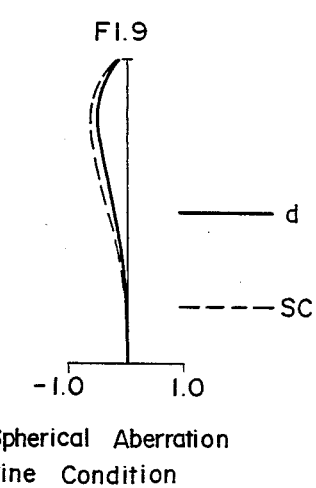
FIGS. 44 (a) (b) (c) represent the aberration curves of the twenty-second embodiment.
Figure 44B:
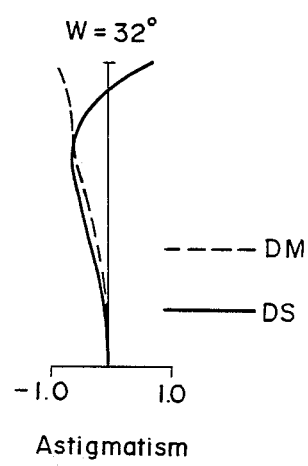
Figure 44C:
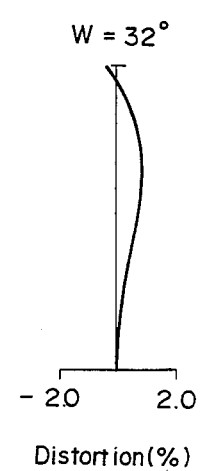
Figure 45:
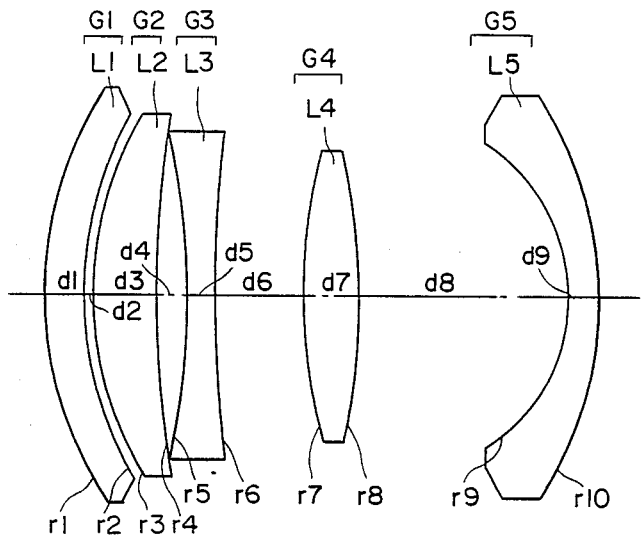
FIG. 45 represents a cross sectional view of the twenty-third embodiment.
Figure 46A:
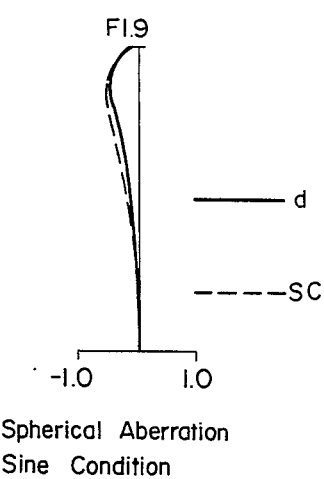
FIGS. 46 (a) (b) (c) represent the aberration curves of the twenty-third embodiment.
Figure 46B:
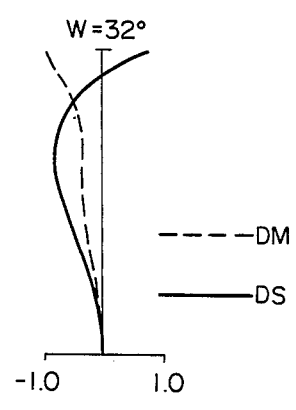
Figure 46C:
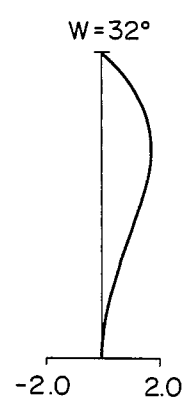
Figure 47:
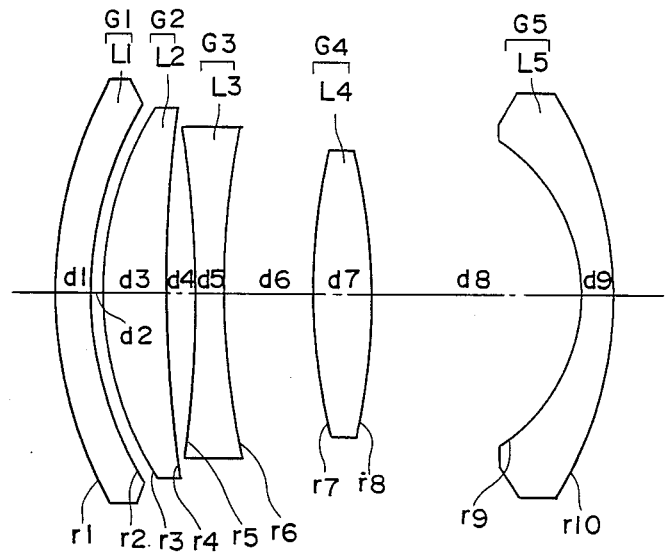
FIG. 47 represents a cross sectional view of the twenty-fourth embodiment.
Figure 48A:
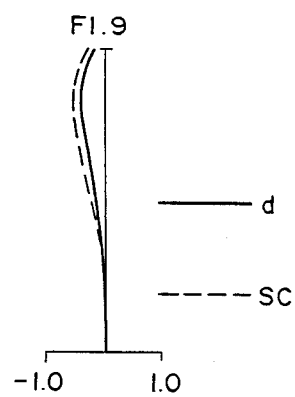
FIGS. 48 (a) (b) (c) represent the aberration curves of the twenty-fourth embodiment.
Figure 48B:
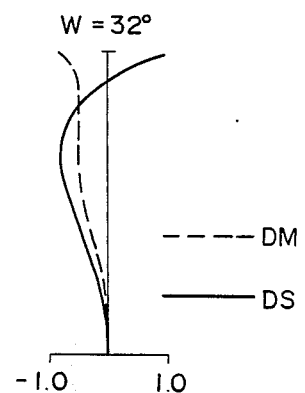
Figure 48C:
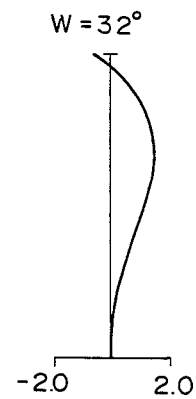
Figure 49:
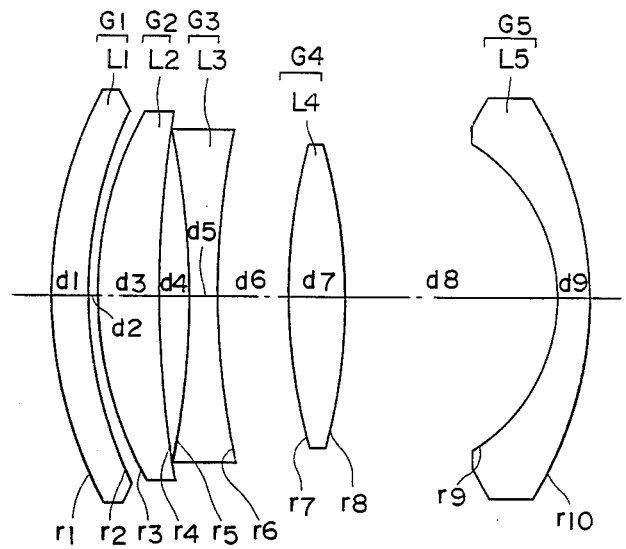
FIG. 49 represents a cross sectional view of the twenty-fifth embodiment.
Figure 50A:
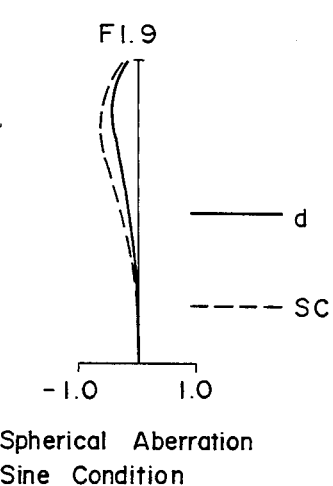
FIGS. 50 (a) (b) (c) represent the aberration curves of the twenty-fifth embodiment.
Figure 50B:
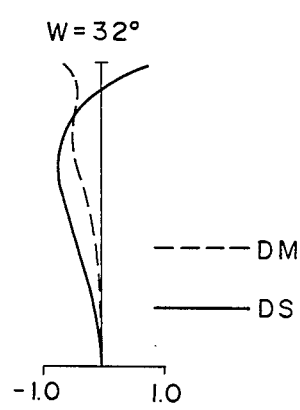
Figure 50C:
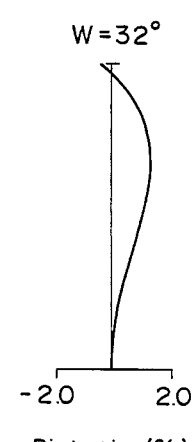
Figure 51:
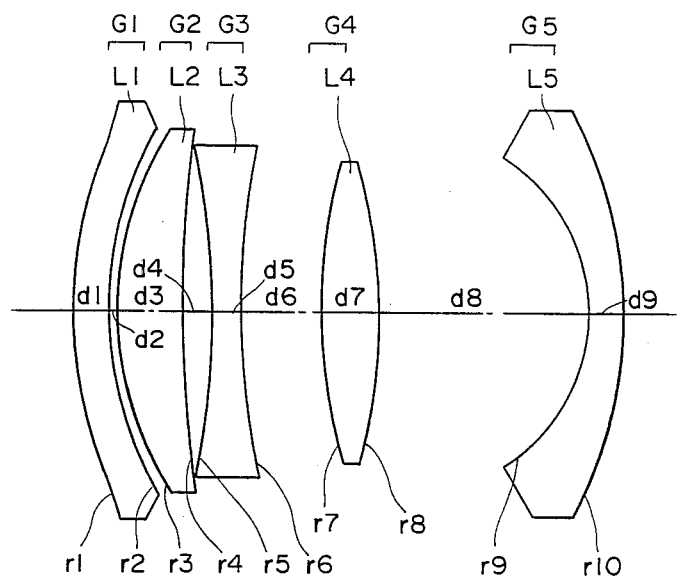
FIG. 51 represents a cross sectional view of the twenty-sixth embodiment.
Figure 52A:
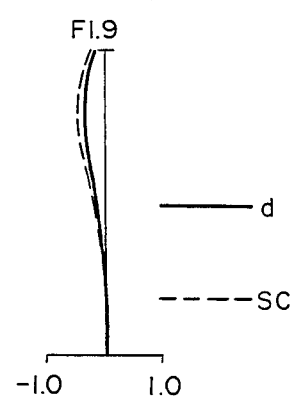
FIGS. 52 (a) (b) (c) represent the aberration curves of the twenty-sixth embodiment.
Figure 52B:
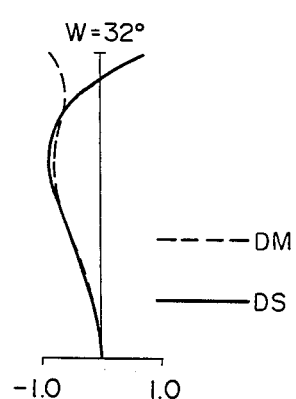
Figure 52C:
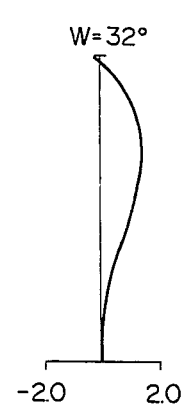
Figure 53:
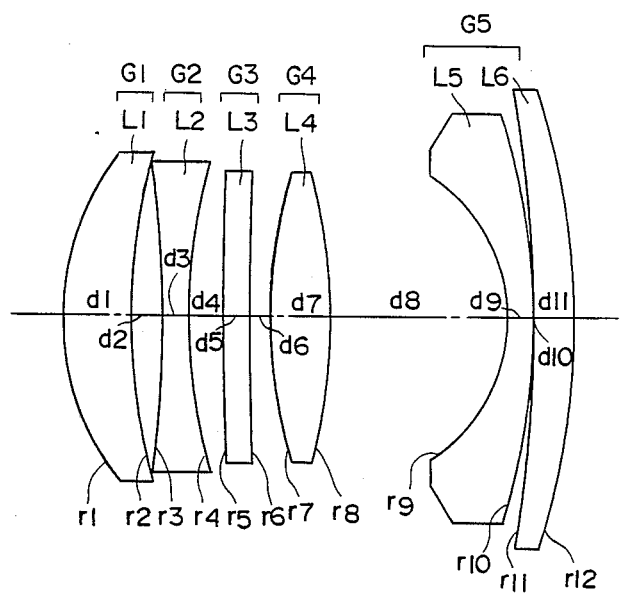
FIG. 53 represents a cross sectional view of the twenty-seventh embodiment.
Figure 54A:
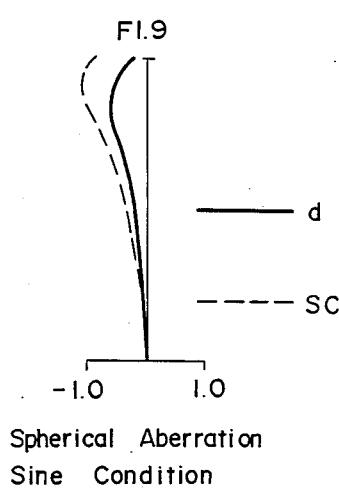
FIGS. 54 (a) (b) (c) represent the aberration curves of the twenty-seventh embodiment.
Figure 54B:
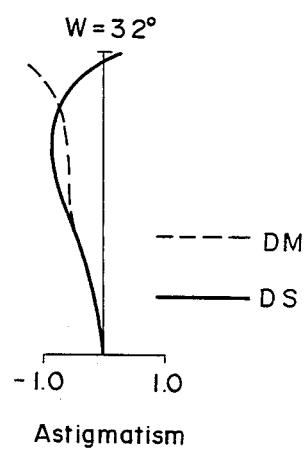
Figure 54C:
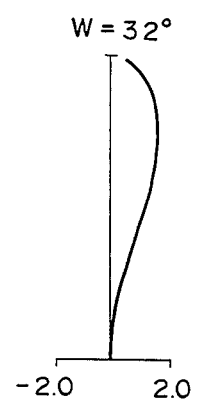
Figure 55:
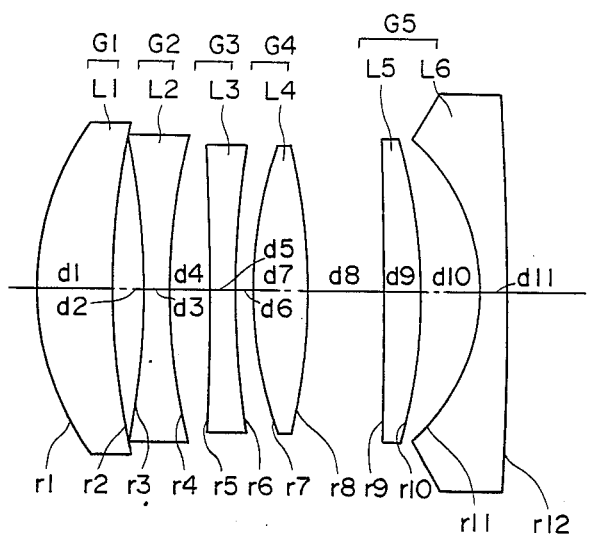
FIG. 55 represents a cross sectional view of the twenty-eight embodiment.
Figure 56A:
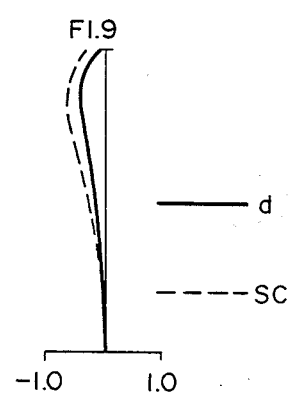
FIGS. 56 (a) (b) (c) represent the aberration curves of the twenty-eight embodiment.
Figure 56B:
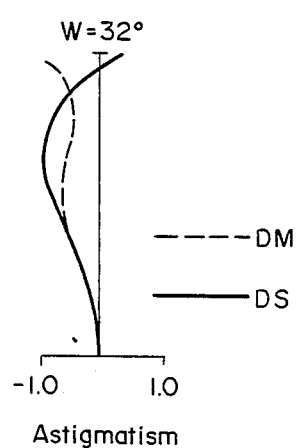
Figure 56C:
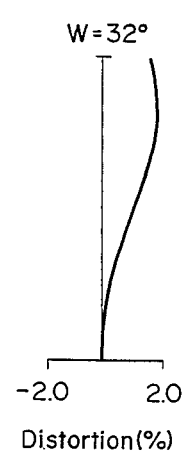
Figure 57:
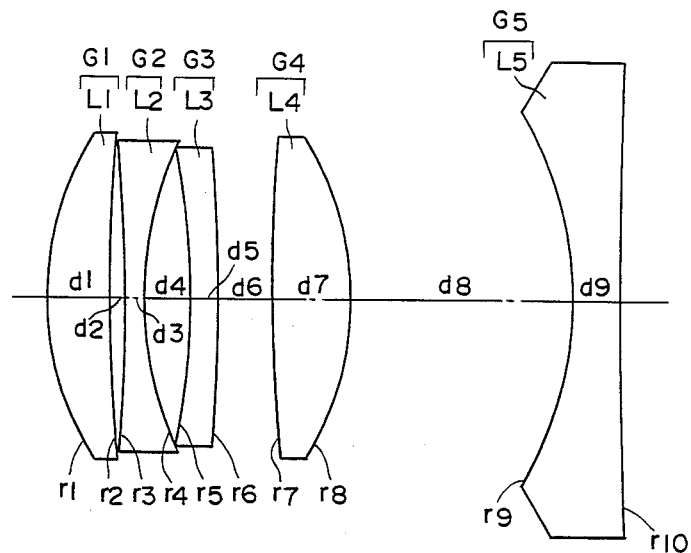
FIG. 57 represents a cross sectional view of the twenty-ninth embodiment.
Figure 58A:
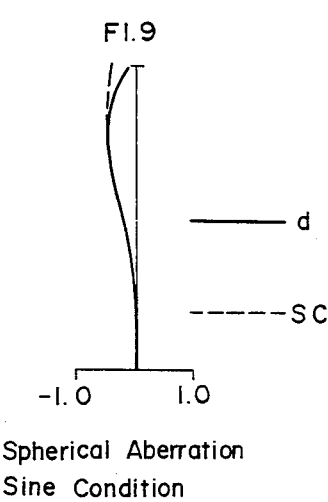
FIGS. 58 (a) (b) (c) represent the aberration curves of the twenty-ninth embodiment.
Figure 58B:
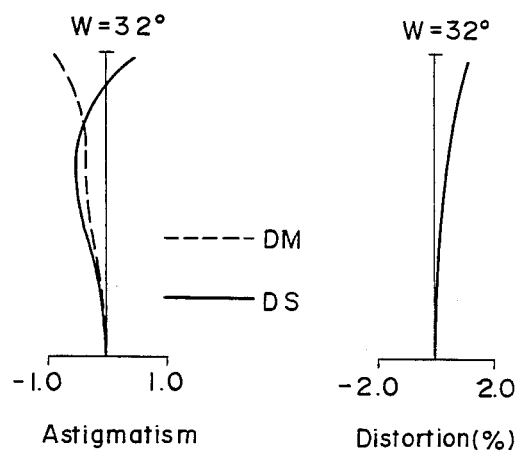
Figure 58C:
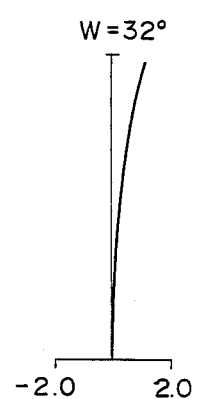
Figure 59:
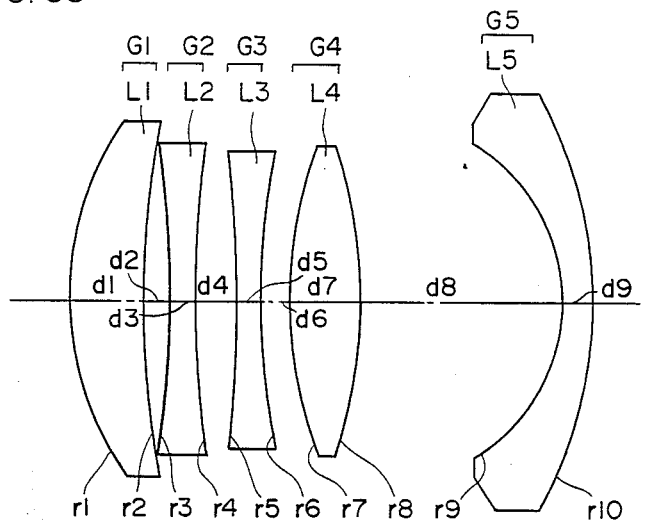
FIG. 59 represents a cross sectional view of the thirtieth embodiment.
Figure 60A:
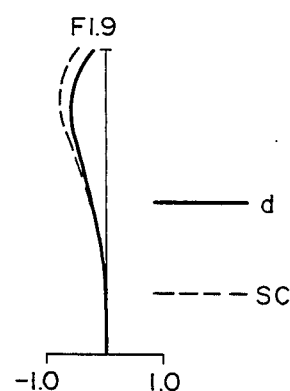
FIGS. 60 (a) (b) (c) represent the aberration curves of the thirtieth embodiment.
Figure 60B:
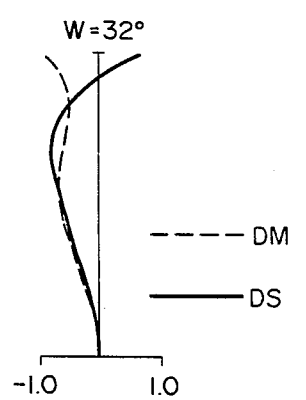
Figure 60C:
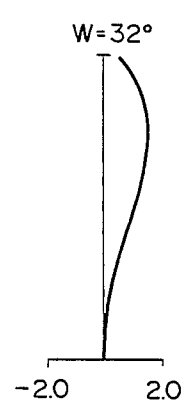
Figure 61:
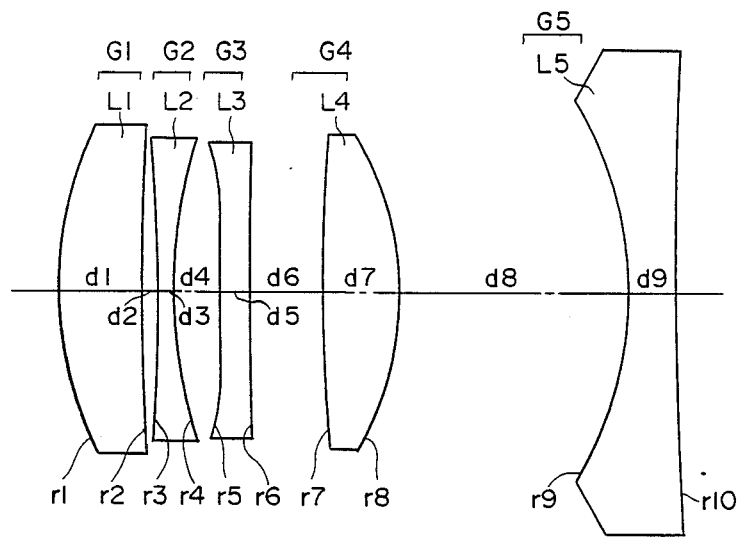
FIG. 61 represents a cross sectional view of the thiryfirst embodiment.
Figure 62A:
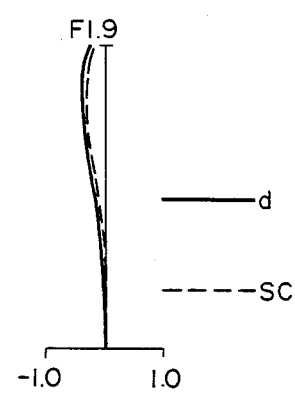
FIGS. 62 (a) (b) (c) represent the aberration curves of the thirty-first embodiment.
Figure 62B:
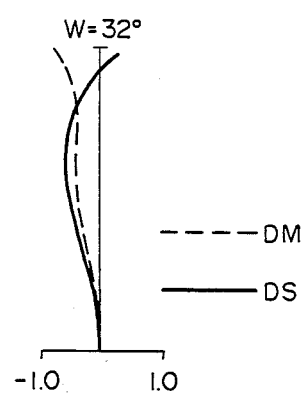
Figure 62C:
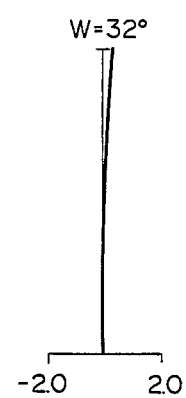
Figure 63:
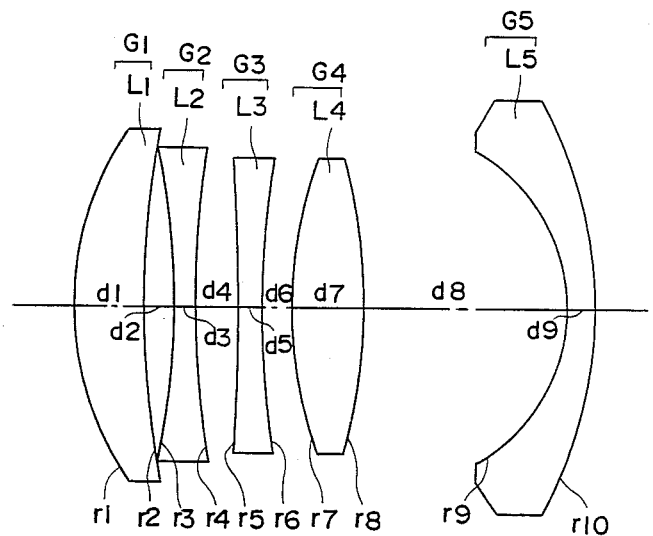
FIGS. 63 represents a cross sectional view of the thirty-second embodiment.
Figure 64A:
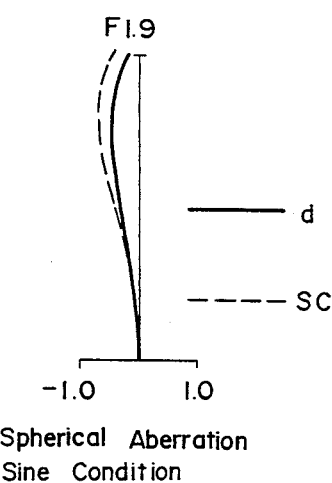
FIGS. 64 (a) (b) (c) represent the aberration curves of the thirty-second embodiment.
Figure 64B:
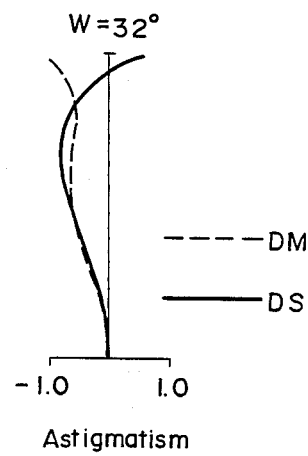
Figure 64C:
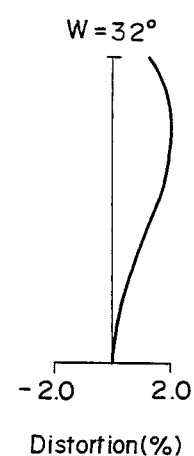
Figure 65:
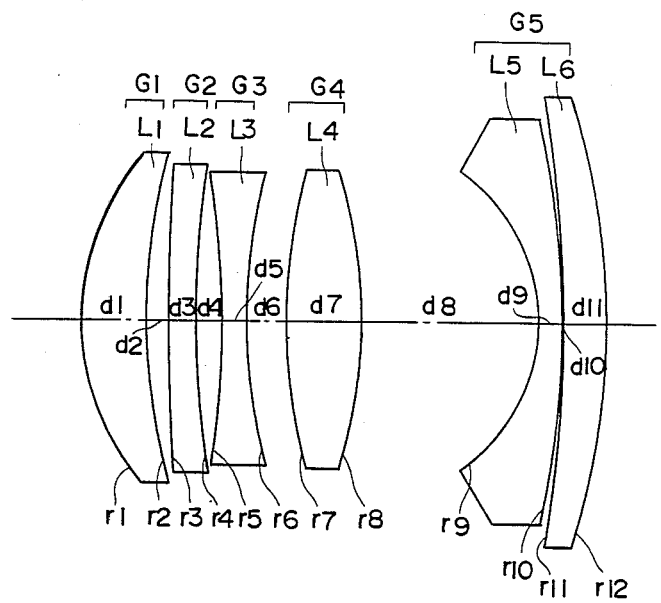
FIG. 65 represents a cross sectional view of the thirty-third embodiment.
Figure 66A:
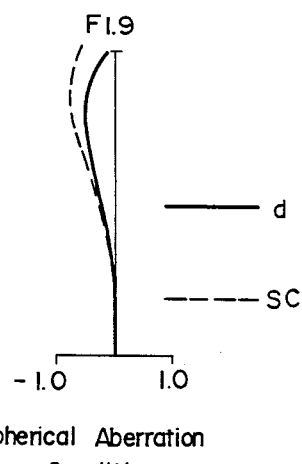
FIGS. 66 (a) (b) (c) represent the aberration curves of the thirty-third embodiment.
Figure 66B:
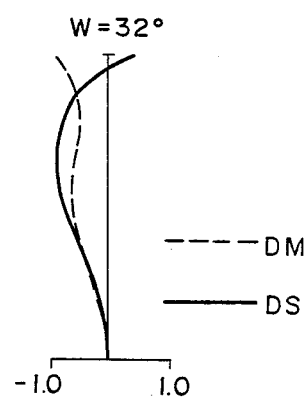
Figure 66C:
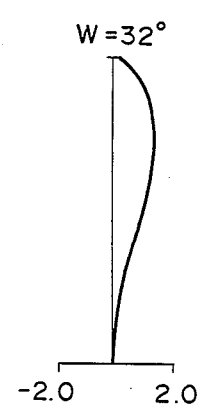
Figure 69:
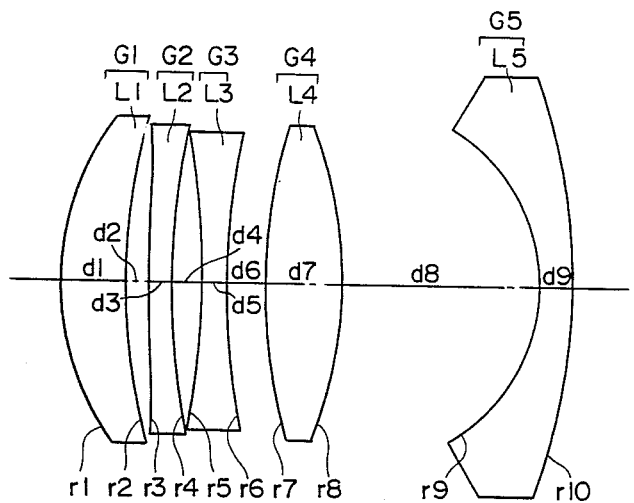
FIG. 69 represents a cross sectional view of the thirty-fifth embodiment.
Figure 70A:
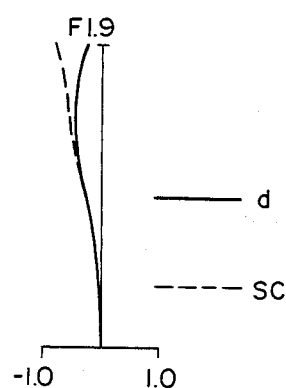
FIGS. 70 (a) (b) (c) represent the aberration curves of the thirty-fifth embodiment.
Figure 70B:
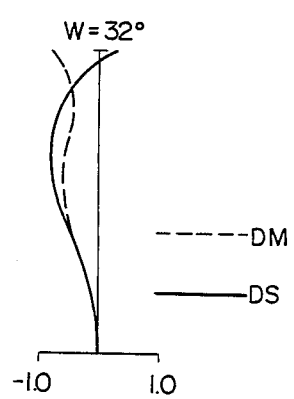
Figure 70C:
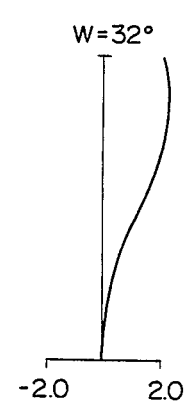
Figure 71:
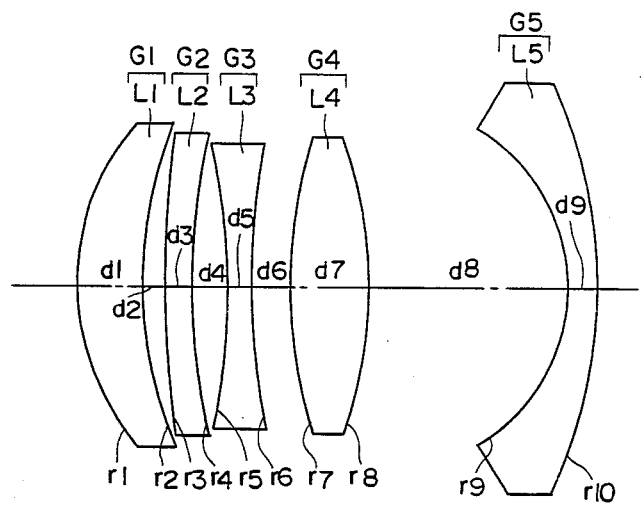
FIG. 71 represents a cross sectional view of the thirty-sixth embodiment.
Figure 72A:
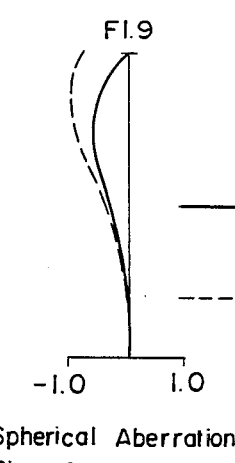
FIGS. 72 (a) (b) (c) represent the aberration curves of the thirty-sixth embodiment.
Figure 72B:
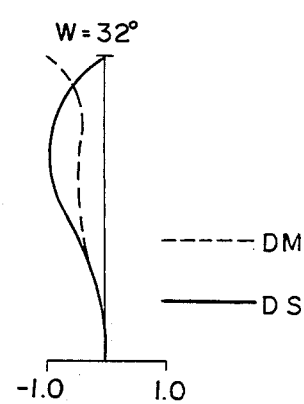
Figure 72C:
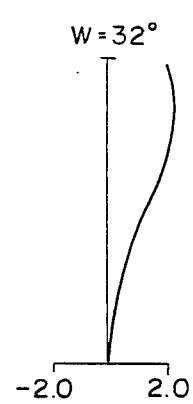
Figure 73:
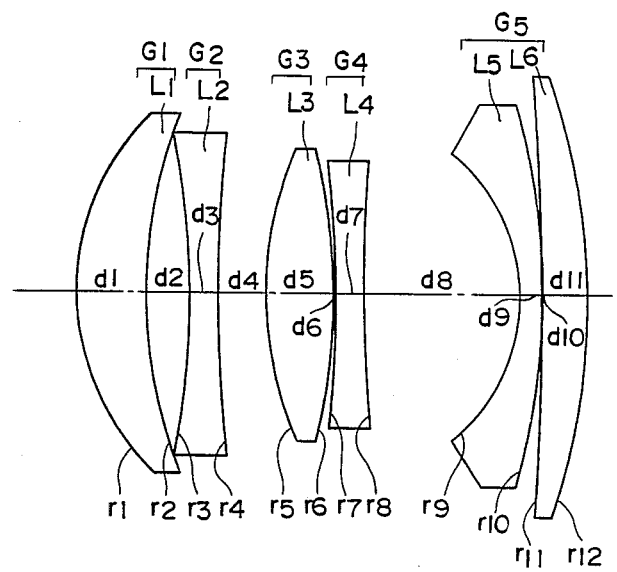
FIG. 73 represents a cross sectional view of the thirty-seventh embodiment.
Figure 74A:
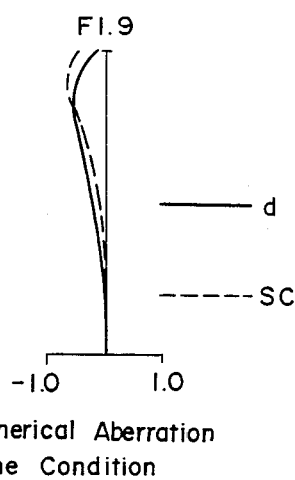
FIGS. 74 (a) (b) (c) represent the aberration curves of the thirty-seventh embodiment.
Figure 74B:
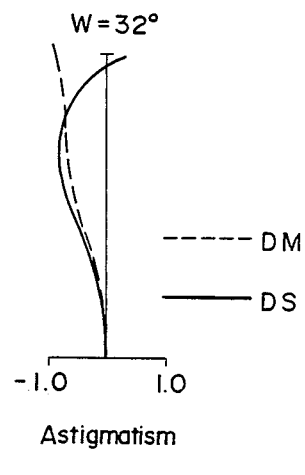
Figure 74C:
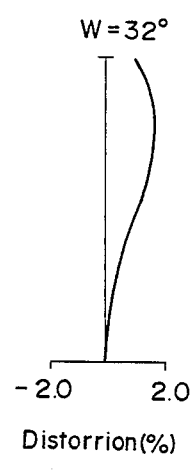
Figure 75:
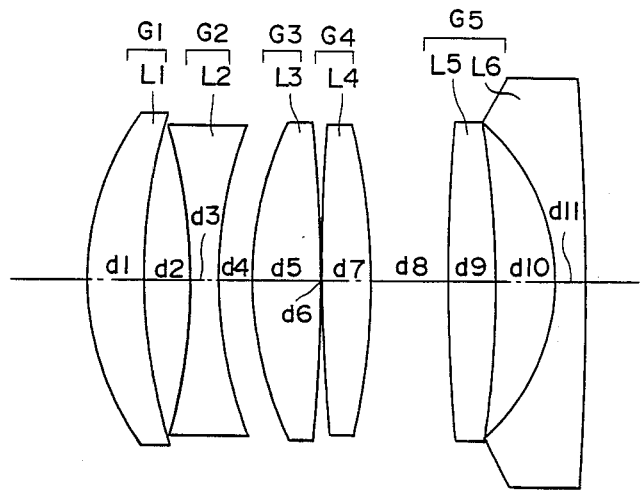
FIG. 75 represents a cross sectional view of the thirty-eighth embodiment.
Figure 76A:
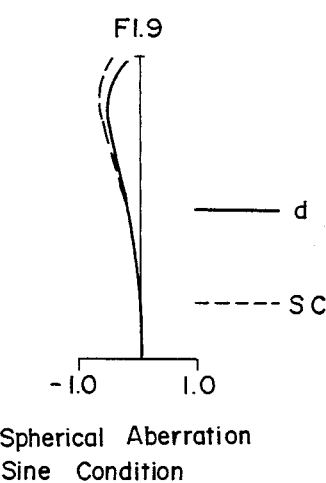
FIGS. 76 (a) (b) (c) represent the aberration curves of the thirty-eighth embodiment.
Figure 76B:
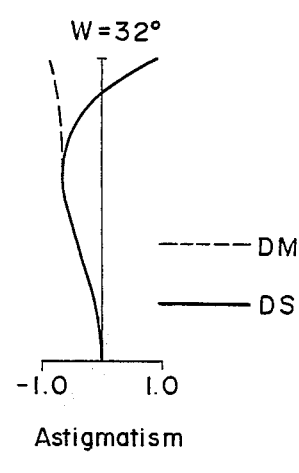
Figure 76C:
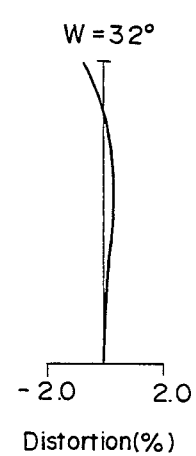
Figure 77:
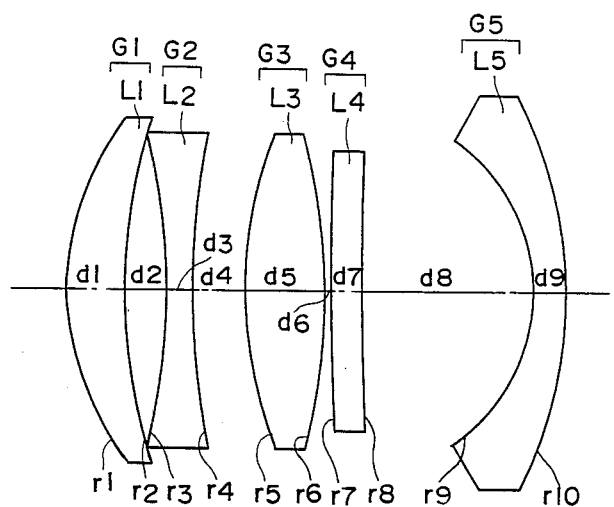
FIG. 77 represents a cross sectional view of the thirty-ninth embodiment.
Figure 78A:
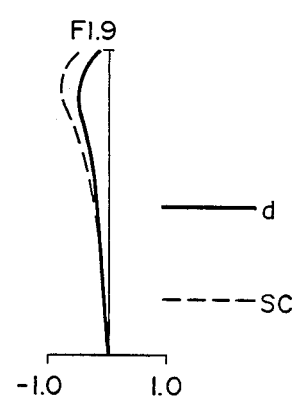
FIGS. 78 (a) (b) (c) represent the aberration curves of the thirty-ninth embodiment.
Figure 78B:
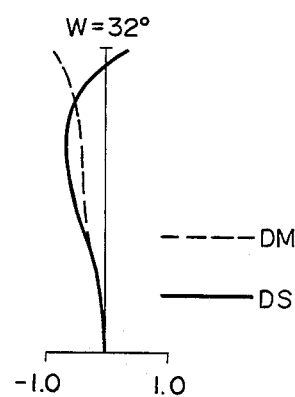
Figure 78C:
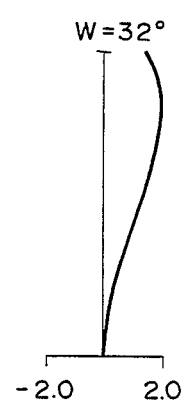
Figure 79:
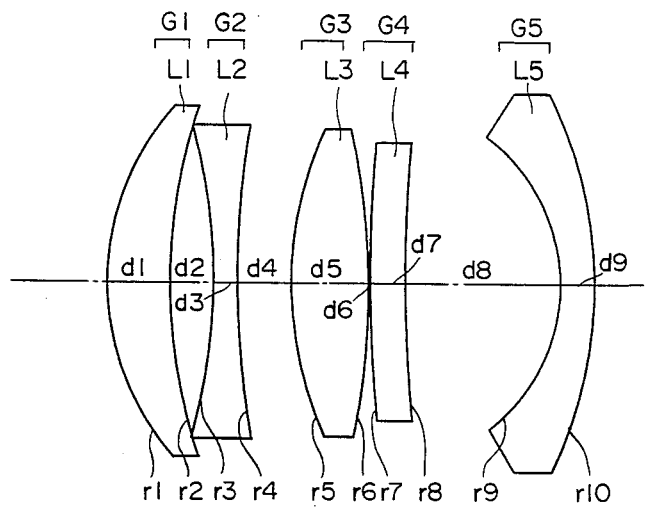
FIG. 79 represents a cross sectional view of the fortieth embodiment.
Figures 80A, 80B, 80C:
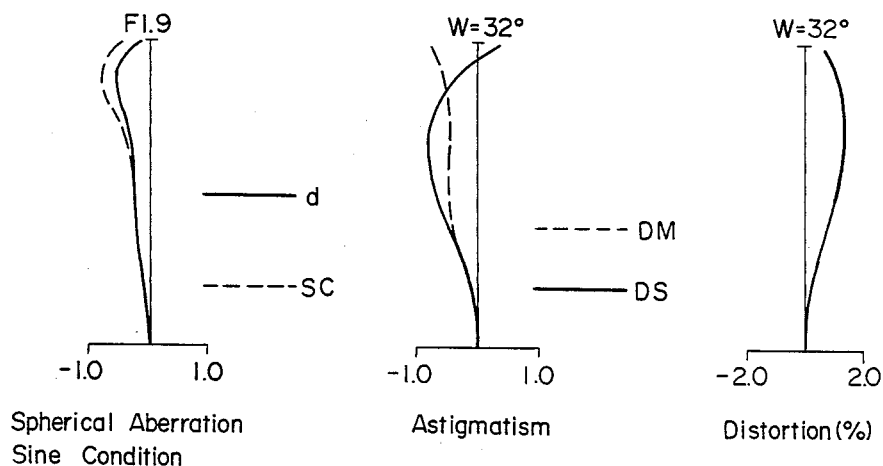
FIGS. 80 (a) (b) (c) represent the aberration curves of the fortieth embodiment.
Figure 81:
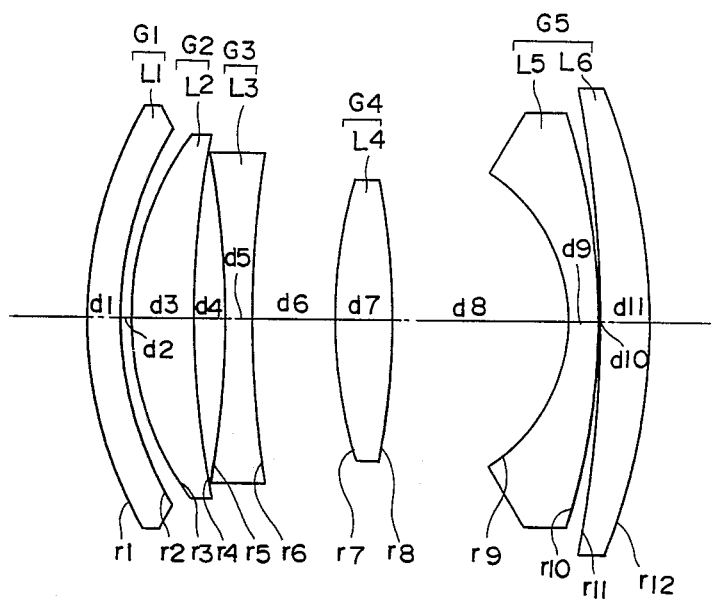
FIG. 81 represents a cross sectional view of the forty-first embodiment.
Figure 82A:
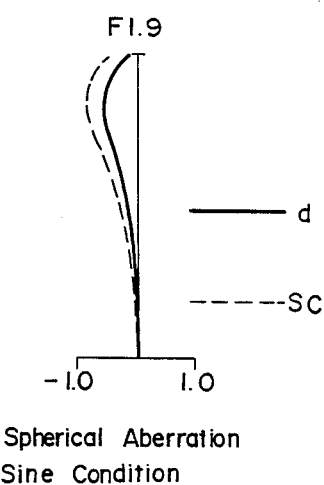
FIGS. 82 (a) (b) (c) represent the aberration curves of the forty-first embodiment.
Figure 82B:
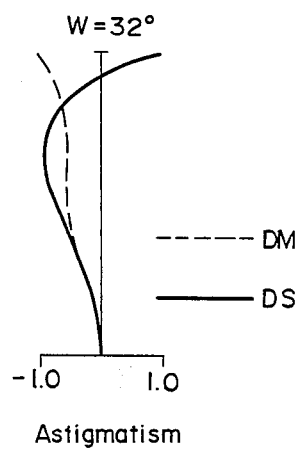
Figure 82C:
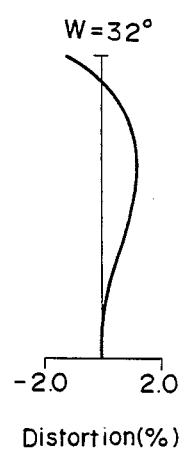
Figure 83:
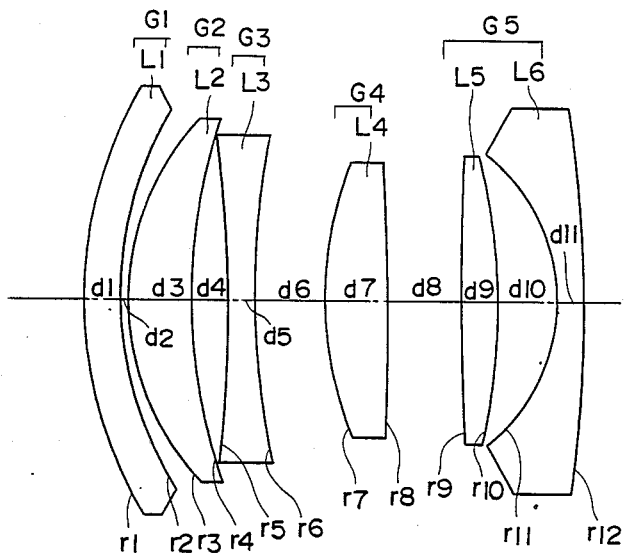
FIG. 83 reprsents a cross sectional view of the forty-second embodiment.
Figure 84A:
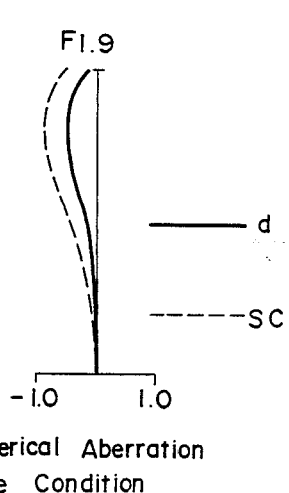
FIG. 84 (a) (b) (c) represent the aberration curves of the forty-second embodiment.
Figure 84B:
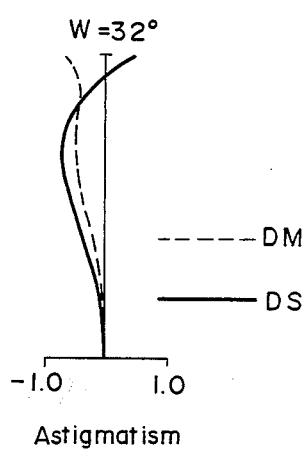
Figure 84C:
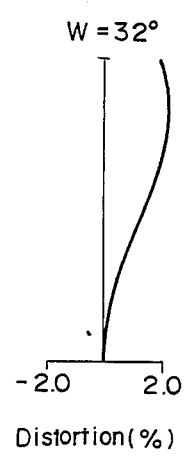
Figure 85:
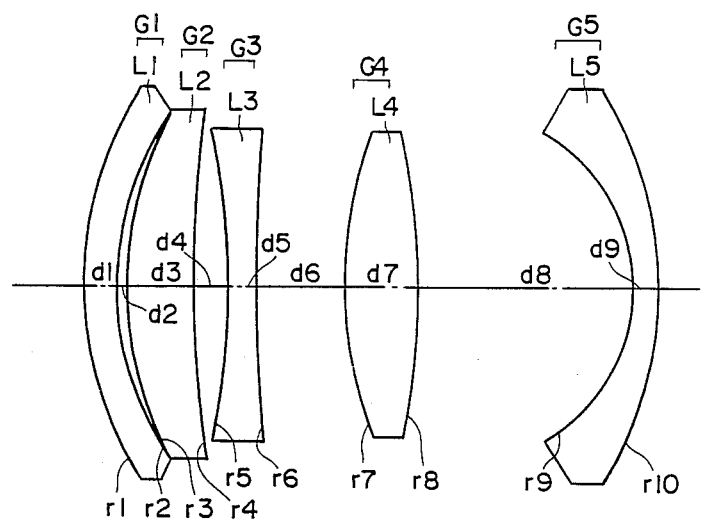
FIG. 85 represents a cross sectional view of the forty-third embodiment.
Figure 86A:
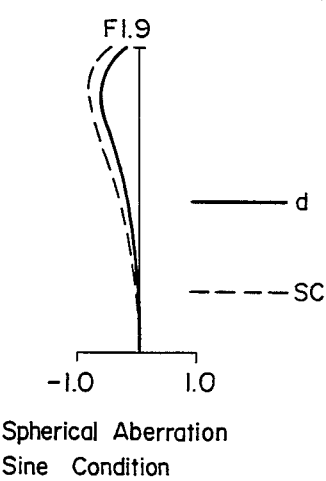
FIGS. 86 (a) (b) (c) represent the aberration curves of the forty-third embodiment.
Figure 86B:
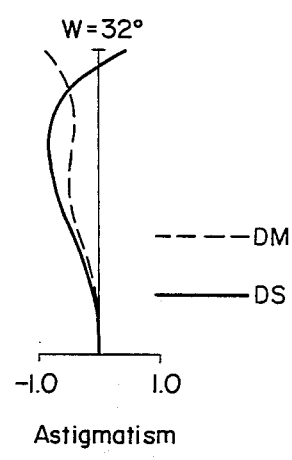
Figure 86C:
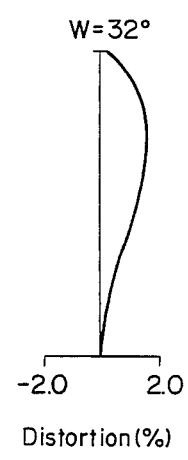
Figure 87:
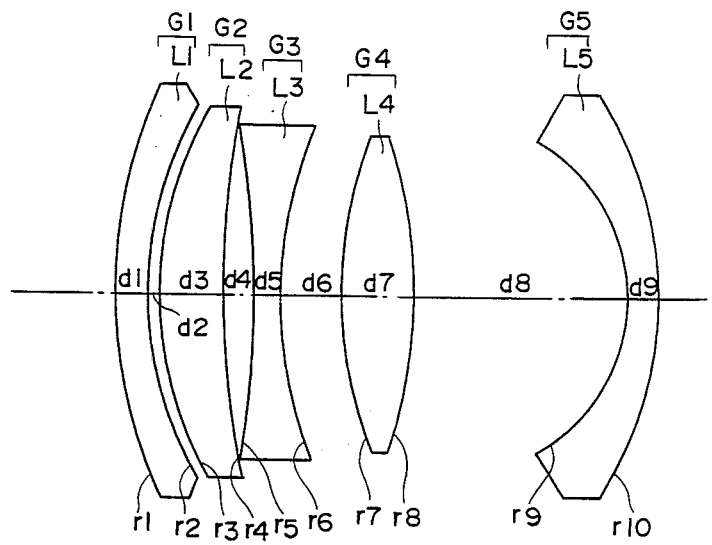
FIG. 87 represents a cross sectional view of the forty-fourth embodiment.
Figure 87:
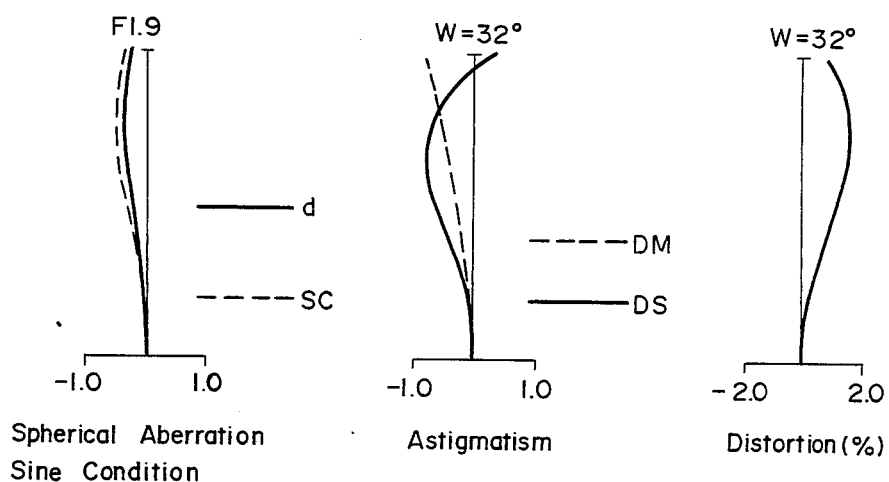

As shown in FIGS. 1, 3, 5, 7, 9, 11, 13, 15, 17, 19, 21, 23, 25, 27, 29, 31, 33, 35, 37, 39, 41, 43, 45, 47, 49, 51, 53, 55, 57, 59, 61, 63, 65, 67, 69, 71, 73, 75, 77, 79, 81, 83, 85 and 87, according to the present invention, the photographic lens system comprises from the object side to the image side, a front lens unit of a positive refractive power including at least four lens components ($G_1$) to ($G_4$) with at least one lens component having an aspheric surface, and a rear lens unit ($G_5$) of a negative refractive power all of whose refractive surfaces are spheric, wherein the lens fulfills the following condition when $0.5\ F_F < h < R_F$ is maintained:

$$t_F(h) > r_l\left(1 - \sqrt{1 - \left(\frac{h}{r_l}\right)^2}\right) - r_k\left(1 - \sqrt{1 - \left(\frac{h}{r_k}\right)^2}\right) + d_F \quad (1)$$

wherein, h represents the height from the optical axis, $t_F(h)$ represents the thickness of the lens component having the aspheric surface in the front lens unit on the height h, $r_k$ represents the paraxial radius of curvature of the object side surface of the lens component having the aspheric surface in the front lens unit, $r_l$ represents the paraxial radius of curvature of the image side surface of the lens component having the aspheric surface in the front lens unit, $d_F$ represents the axial thickness of the lens component having the aspheric surface in the front lens unit, and $R_F$ represents the minimum value among $|r_k|$, $|r_l|$, and the effective height of the aspheric surface of the front lens unit.

Condition (1) limits the configuration of an aspheric lens component having an aspheric surface in the front lens unit, and is effective for correcting the spherical aberration, especially for correcting the spherical aberration with respect to the marginal light rays. If the condition (1) is violated, it becomes very difficult to well correct the spherical aberration with respect to the marginal light rays. Here, the limitation of $0.5\ R_F < h < R_F$ means that, in the large aperture ratio lens system, the configuration of the relatively large height of the aspheric lens component in the front lens unit is important for correcting the spherical aberration with respect to the marginal light rays.

Furthermore, it is effective for properly correcting the distortion to introduce a rear lens component having an aspheric surface to the rear lens unit. Especially, the following condition is effective for correcting the distortion well when $0.4\ R_R < h < R_R$ is maintained;

$$t_R(h) < r_n\left(1 - \sqrt{1 - \left(\frac{h}{r_n}\right)^2}\right) - r_m\left(1 - \sqrt{1 - \left(\frac{h}{r_m}\right)^2}\right) + d_R \quad (2)$$

wherein, $t_R(h)$ represents the thickness of the rear aspheric lens component on the height h, $r_m$ represents the paraxial radius of curvature of the object side surface of the rear aspheric lens component, $r_n$ represents the paraxial radius of curvature of the image side surface of the rear aspheric lens component, $d_R$ represents the axial thickness of the rear aspheric lens component, and $R_R$ represents the minimum value among $|r_k|$, $|r_l|$, and the effective height of the aspheric surface of the rear aspheric lens component.

Condition (2) limits the configuration of the rear aspheric lens component. If condition (2) is violated, it becomes very difficult to properly correct the distortion. Here, the limitation of $0.4\ R_R < h < R_R$ means that, since the distortion is increased according to the increase of the field of view in the telephoto type lens system, the configuration of the relatively large height of the rear aspheric surface is important for properly correcting the distortion in the middle and marginal area.

Contrary, if an aspheric surface is not applied to the rear lens unit, to appropriately correct the distortion, it is desirable that the rear lens unit includes a negative lens component concave to the object side, and that the following condition is satisfied:

$$-0.75 < \phi \cdot r_R < -0.15 \quad (3)$$

wherein, $\phi$ represents the refractive power of the whole lens system, and $r_R$ represents the radius of curvature of the object side surface of the negative lens component. If the upper limit of condition (3) is violated, it is difficult to correct the distortion, since the positive distortion is increased. If the lower limit of condition (3) is violated, although the positive distortion is appropriately corrected, the total length of the lens system is extended undesirably.

In addition to the above conditions (1) and (2), a plurality of lens arrangements and conditions for achieving higher performance will be explained.

A first lens arrangement is constructed as follows: the front lens unit includes from the object side, a positive first lens component ($L_1$) convex to the object side, a negative second lens component ($L_2$), a third lens component ($L_3$) having at least an aspheric surface, and a positive fourth lens component ($L_4$), and the rear lens unit includes a negative fifth lens component ($L_5$) concave to the object side, as shown in Embodiments 1, 2, 3, 4, 5, 6, 7, 8, 27, 28, 29, 30, 31, and 32 described below.

And the following condition is effective for the first lens arrangement:

$$-1.0 < \phi_3/\phi < 1.0 \qquad (4)$$

wherein, $\phi_3$ represents the refractive power of the third lens component, and $\phi$ represents the refractive power of the whole lens system.

Condition (4) is effective for correcting the spherical aberration, for obtaining the sufficient marginal illumination, and for shortening the total length of the lens system. If the upper limit of condition (4) is violated, the spherical aberration is considerably generated in the marginal area, and therefore, the image point is shifted considerably according to the the change of the aperture diaphragm. If the lower limit of condition (4) is violated, it is difficult to obtain the sufficient marginal illumination, and the total length of the lens system is extended undesirably.

In the first arrangement, it is desirable to satisfy the following conditions:

$$-2.0 < \phi_F/\phi_R < -1.0 \qquad (5)$$

$$-1.7 < \phi_b/\phi < 0 \qquad (6)$$

wherein, $\phi_F$ represent the refractive power of the front lens unit, $\phi_R$ represents the refractive power of the rear lens unit, and $\phi_b$ represents the refractive power of an air lens formed between the second and third lens components.

Condition (5) limits the refractive power balance between the front and rear lens units for correcting the field curvature and the sagittal flare in the middle area. If the upper limit of condition (5) is violated, the negative field curvature is generated considerably, since the Petzual sum becomes a large positive value. If the lower limit of condition (5) is violated, since the Petzual sum becomes too small, the flare of the saggital rays is generated in the middle area.

Condition (6) is effective for properly correcting the coma. If the upper limit of condition (6) is violated, the outer coma is generated undesirably. If the lower limit thereof is violated, the inner coma is generated considerably.

A second lens arrangement is constructed as follows: The front lens unit includes from the object side, a positive first lens component ($L_1$) convex to the object side, a second lens component ($L_2$) having at least an aspheric surface, a negative third lens component ($L_3$), and a positive fourth lens component ($L_4$), and the rear lens unit includes a negative fifth lens component ($L_5$) concave to the object surface, as shown in Embodiments 9, 10, 11, 12, 13, 14, 33, 34, 35, and 36 described below. And the following condition is effective for the second lens arrangement.

$$-1.0 < \phi_2/\phi < 1.0 \qquad (7)$$

wherein, $\phi_2$ represents the refractive power of the second lens component, and $\phi$ represents the refractive power of the whole lens system.

Condition (7) limits the refractive power of the second lens component having an aspheric surface. If the upper limit of condition (7) is violated, the spherical aberration is considerably generated in the marginal area, and therefore, the image point is shifted considerably according to the change of the aperture diaphragm. If the lower limit of condition (7) is violated, it is difficult to obtain the sufficient marginal illumination, and the total length of the lens system is extended undesirably.

In the second lens arrangement, it is desirable to further satisfy the following conditions:

$$-2.0 < \phi_F/\phi_R < -1.0 \qquad (8)$$

$$-2.0 < (\phi_a + \phi_b)/\phi < -0.5 \qquad (9)$$

wherein, $\phi_F$ represents the refractive power of the front lens unit, $\phi_R$ represents the refractive power of the rear lens unit, $\phi_a$ represents the refractive power of an air lens formed between the first and second lens components, and $\phi_b$ represents the refractive power of an air lens formed between the second and third lens components.

Condition (8) limits the refractive power balance between the front and rear lens units for correcting the field curvature and the sagittal flare in the middle area. If the lower limit of condition (8) is violated, the negative field curvature is generated considerably, since the Petzual sum becomes a large positive value. If the upper limit of condition (8) is violated, since the Petzual sum becomes too small, the flare of the sagittal rays is generated in the middle area.

Condition (9) limits the sum of the refractive power of an air lens formed between the first and second lens components and the refractive power of the other air lens formed between the second and thrd lens components. The condition (9) is effective for correcting the coma and the distortion in middle area. If the lower limit of condition (9) is violated, the outer coma is increased considerably. If the upper limit of condition (9) is violated, the inner coma is increased considerably, and the positive distortion is generated in the middle area.

A third lens arrangement is constructed as follows: the front lens unit includes from the object side, a positive first lens component ($L_1$) convex to the object side, a negative second lens component ($L_2$), a positive third lens component ($L_3$), and a fourth lens component ($L_4$) having at least an aspheric surface, and the rear lens unit includes a negative fifth lens component ($L_5$) concave to the object side, as shown in Embodiments 15, 16, 17, 18, 19, 20, 37, 38, 39, and 40 as described below. And the following condition is effective for the third lens arrangement:

$$-1.0 < \phi_4/\phi < 1.0 \qquad (10)$$

wherein, $\phi_4$ represents the refractive power of the fourth lens component, and $\phi$ represents the refractive power of the whole lens system.

Condition (10) limits the refractive power of the fourth lens component having an aspheric surface. If the upper limit of condition (10) is violated, the spherical aberration is considerably generated in the marginal area, and therefore, the image point is shifted considerably according to the change of the aperture diaphragm. If the lower limit of condition (10) is violated, it is difficult to obtain the sufficient marginal illumination, and the total length of the lens system is extended undesirably.

In the third lens arrangement, it is desirable to satisfy the following conditions:

$$-2.0 < \phi_F/\phi_R < -1.0 \qquad (11)$$

$$0 < \phi_c/\phi < 1.5 \tag{12}$$

wherein, $\phi_F$ represents the refractive power of the front lens unit, $\phi_R$ represents the refractive power of the rear lens unit, and $\phi_c$ represents the refractive power of an air lens formed between the third and fourth lens components.

Condition (11) limits the refractive power balance between the front and rear lens units for correcting the field curvature and the sagittal flare in the middle area. If the lower limit of condition (11) is violated, the negative field curvature is generated considerably, since the Petzual sum becomes a large positive value. If the upper limit of condition (11) is violated, since the Petzual sum becomes too small, the flare of the sagittal rays is generated in the middle area.

Condition (12) is effective for properly correcting the coma. If the lower limit of condition (12) is violated, the outer coma is generated undesirably. If the upper limit thereof is violated, the inner coma is generated considerably.

A fourth lens arrangement is constructed as follows: the front lens unit includes from the object side, a first lens component ($L_1$) having at least an aspheric surface, a positive second lens component ($L_2$) convex to the object side, a negative third lens component ($L_3$) and a positive fourth lens component ($L_4$), and the rear lens unit includes a fifth lens component ($L_5$) concave to the object side, as shown in Embodiments 21, 22, 23, 24, 25, 26, 41, 42, 43 and 44 described below. And the following condition is effective for the fourth lens arrangement:

$$-1.0 < \phi_1/\phi < 1.0 \tag{13}$$

wherein, $\phi_1$ represents the refractive power of the first lens component, and $\phi$ represents the refractive power of the whole lens system.

Condition (13) limits the refractive power of the first lens component having an aspheric surface. If the upper limit of condition (13) is violated, the spherical aberration is considerably generated in the marginal area, and therefore, the image point is shifted considerably according to the change of the aperture diaphragm. If the lower limit of condition (13) is violated, it is difficult to obtain a sufficient marginal illumination, and the total length of the lens system is extended undesirably.

In the fourth lens arrangement, it is desirable to satisfy the following conditions when an aspheric surface is introduced to the rear lens unit:

$$-2.0 < \phi_F/\phi_R < -1.0 \tag{14}$$

$$-2.0 < \phi_b/\phi < -0.2 \tag{15}$$

wherein, $\phi_F$ represents the refractive power of the front lens unit, $\phi_R$ represents the refractive power of the rear lens unit, and $\phi_b$ represents the refractive power of an air lens formed between the second and third lens components.

Condition (14) limits the refractive power balance between the front and rear lens units for correcting the field curvature and the sagittal flare in the middle area. If the lower limit of condition (14) is violated, the negative field curvature is generated considerably, since the Petzual sum becomes a large positive value. If the upper limit of condition (14) is violated, since the Petzual sum becomes too small, the flare of the sagittal rays is generated in the middle area.

Condition (15) is effective for appropriately correcting the coma. If the lower limit of condition (15) is violated, the outer coma is generated undesirably. If the upper limit thereof is violated, the inner coma is generated considerably.

Furthermore, the following conditions are effective for all of the first to fourth lens arrangements.

$$0.6 < \phi_P/\phi < 1.5 \tag{16}$$

$$-1.1 < \phi_R/\phi < -0.3 \tag{17}$$

wherein, $\phi_P$ represents the refractive power of the lens component which is located at the most object side among the lens components of a positive refractive power without having an aspheric surface.

Condition (16) is effective for making the lens system compact and for achieving a large aperture ratio while maintaining a good correction of the spherical aberration. If the upper limit of condition (16) is violated, the spherical aberration is in an under correcting condition, and therefore, it could not be corrected properly even if an aspheric surface is introduced to the front lens unit. If the lower limit thereof is violated, the total length of the lens system is extended considerably.

Condition (17) limits the refractive power of the rear lens unit for correcting the field curvature and the sagittal flare in the middle area. If the upper limit of condition (17) is violated, the negative field curvature is generated considerably, since the Petzual sum becomes a large positive value. If the lower limit of condition (17) is violated, since the Petzual sum becomes too small, the flare of the sagittal rays is generated in the middle area.

Furthermore, if an aspheric surface is not applied to the rear lens unit, the above first to fourth lens arrangements and the conditions (4) to (17) are effective in addition to the conditions (1) and (3).

In the present invention, the aspheric lens component having an aspheric surface is made by grinding and polishing an optical glass material to the predetermined aspheric surface configuration, or by coating a thin layer having the predetermined aspheric surface configuration on a spheric surface of the glass lens component, or by molding a synthetic resin material to form the aspheric lens component. The last method which uses the mold is, however, the most favorable in view of the low manufacturing cost and the light weight of the lens component. Here, the synthetic resin material has a large coefficient of thermal expansion and a large dimensional change due to the temperature change thereof, when comparing to a glass material. Therefore, in the present invention, it is desirable that the refractive power of the lens component made of the synthetic resin material is relatively weak.

The other problem occurred when the lens component is manufacturing by molding the synthetic resin material is that the molded lens component is distorted by the thermal contraction of the synthetic resin material in the cooling procedure of the molding method. Therefore, it is desirable that the difference in thickness between the central portion of the lens component and the marginal portion thereof is small. Therefore, if the aspheric lens component having the aspheric surface is made of the synthetic resin material, it is desirable to fulfill the following conditions:

$$-0.4 < \phi_f/\phi < 0.4 \quad (18)$$

$$-2.0 < \phi_g/\phi < 0 \quad (19)$$

$$\phi \cdot |t_F(h_F) - d_F| < 0.05 \quad (20)$$

$$\phi \cdot |t_R(h_R) - d_R| < 0.16 \quad (21)$$

wherein, $\phi$ represents the refractive power of the whole lens system, $\phi_f$ represents the refractive power of the front aspheric lens component having an aspheric surface in the front lens group, $\phi_g$ represents the refractive power of the rear aspheric lens component having an aspheric surface in the rear lens group, $t_F(h_F)$ represents the thickness of the front aspheric lens component in the height $h_F$, and $t_R(h_R)$ represents the thickness of the rear aspheric lens component in the height $h_R$.

Conditions (18) and (19) limit the refractive powers of the aspheric lens components, respectively, for decreasing the shifting of the image point due to the temperature change. If conditions (18) and (19) are not satisfied, the image point is considerably shifted in accordance with the temperature change.

Conditions (20) and (21) limit the configurations of the aspheric lens components, respectively. If conditions (20) and (21) are not satisfied, the optical performance of the whole lens system is influenced undesirably by the thermal contraction of the synthetic resin material.

Here, if the camera body is made of the synthetic resin material, the distance from the lens system to the film plane is normally extended in accordance with the increase of temperature. Thus, it is favorable to expect the influence of such extension by constructing the lens system so that the distance from the lens system to the image plane is extended according to the increase of temperature. In doing so, it is desirable that the refractive power of the front aspheric lens component made of the synthetic resin material is positive in addition to conditions (18) and (19).

The following Tables 1 to 44 disclose, respectively, the first through forty-fourth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to image side, and finally, $v$ equals the Abbe number and the sub numbers refer to the specific lens elements from the object to image side. The asterisk (*) (**) represents the aspheric surface, and its coefficients are shown at the bottom of respective Tables.

Here, the aspheric coefficients are defined by the following equation:

$$X = r_i \left\{ 1 - \left(1 - \frac{Y_2}{r_i^2}\right)^{\frac{1}{2}} \right\} + aY^2 + bY^4 + cY^6 + dY^8 + \ldots$$

wherin $$r_i = \frac{1}{\frac{1}{r_i} + 2a}$$

and wherein $r_i$ represents the paraxial radius of curvature, of the basic spheric surface, X represents the coordinate along the optical surface measured from the top of the basic surface, and Y represents the coordinate perpendicular to the optical axis measured from the optical axis. In the tables, $\Delta F$ and $\Delta R$ are defined as follows:

$$\Delta F = t_F(h) - \left\{ r_l \left(1 - \sqrt{1 - \left(\frac{h}{r_l}\right)^2}\right) - r_k \left(1 - \sqrt{1 - \left(\frac{h}{r_k}\right)^2}\right) + d_F \right\}$$

$$\Delta R = t_R(h) - \left\{ r_m \left(1 - \sqrt{1 - \left(\frac{h}{r_m}\right)^2}\right) - r_n \left(1 - \sqrt{1 - \left(\frac{h}{r_n}\right)^2}\right) + d_R \right\}$$

In the present invention, the front lens unit is shiftable along the optical axis for focusing, however, the whole lens system may be used for focusing. Additionally, a part or the entire whole of the rear lens unit can be used for focusing.

In the present invention, each of the lens component are not limited to a single lens element, and may include a compound lens element.

Additionally, the Table 45 shows the value of all embodiments with respect to the parameter of condition (16) and (17).

TABLE 1

| Embodiment 1 | | | | | | |
|---|---|---|---|---|---|---|
| $f = 100$ $F_{No} = 1.9$ | | | | | | |
| | radius of curvature | | axial distance | refractive index (Nd) | | Abbe number ($v$d) |
| $L_1$ | $r_1$ | 43.479 | $d_1$ 11.44 | $N_1$ 1.77250 | $v_1$ | 49.77 |
| | $r_2$ | 124.828 | | | | |
| | | | $d_2$ 4.43 | | | |
| $L_2$ | $r_3$ | −159.644 | $d_3$ 4.77 | $N_2$ 1.76182 | $v_2$ | 26.55 |
| | $r_4$ | 103.019 | | | | |
| | | | $d_4$ 5.84 | | | |
| $L_3$ | $r_5$* | 233.488 | $d_5$ 4.43 | $N_3$ 1.49140 | $v_3$ | 57.82 |
| | $r_6$ | 322.928 | | | | |
| | | | $d_6$ 2.94 | | | |
| $L_4$ | $r_7$ | 80.815 | $d_7$ 10.56 | $N_4$ 1.62135 | $v_4$ | 61.28 |
| | $r_8$ | −91.730 | | | | |
| | | | $d_8$ 29.68 | | | |
| $L_5$ | $r_9$** | −25.829 | $d_9$ 3.82 | $N_5$ 1.49140 | $v_5$ | 57.82 |
| | $r_{10}$ | −100.227 | | | | |
| | | | $d_{10}$ 0.50 | | | |
| $L_6$ | $r_{11}$ | −201.268 | $d_{11}$ 7.04 | $N_6$ 1.77551 | $v_6$ | 37.90 |
| | $r_{12}$ | −100.433 | | | | |

| Aspheric coefficients of $r_5$ | |
|---|---|
| a = 0.00000 | d = −0.12365 × 10$^{-12}$ |
| b = −0.13589 × 10$^{-5}$ | e = −0.90639 × 10$^{-16}$ |
| c = 0.21943 × 10$^{-10}$ | f = 0.84105 × 10$^{-19}$ |

| Aspheric coefficients of $r_9$ | |
|---|---|
| a = 0.00000 | d = 0.18930 × 10$^{-10}$ |

TABLE 1-continued

Embodiment 1

$b = 0.11637 \times 10^{-5}$    $e = -0.51630 \times 10^{-13}$
$c = 0.92487 \times 10^{-9}$    $f = 0.73966 \times 10^{-16}$

Configuration of $L_3$ ($11.6 < h < 23.2$)

| h | ΔF |
|---|---|
| 11.6 | 0.0246 |
| 12.0 | 0.0282 |
| 16.0 | 0.0893 |
| 20.0 | 0.2198 |
| 23.2 | 0.4099 |

Configuration of $L_5$ ($9.5 < h < 23.7$)

| h | ΔR |
|---|---|
| 9.5 | −0.0112 |
| 12.0 | −0.0325 |
| 16.0 | −0.1371 |
| 20.0 | −0.5043 |
| 23.7 | −1.8515 |

$\phi_3/\phi = 0.059$
$\phi_F/\phi_R = -1.475$
$\phi_b/\phi = -0.520$

TABLE 2

Embodiment 2

$f = 100$   $F_{No} = 1.9$

| | radius of curvature | | axial distance | refractive index | Abbe number (νd) |
|---|---|---|---|---|---|
| $L_1$ | $r_1$ 43.479 | $d_1$ | 12.56 | $N_1$ 1.74250 | $\nu_1$ 52.51 |
| | $r_2$ 127.449 | | | | |
| | | $d_2$ | 4.53 | | |
| $L_2$ | $r_3$ −150.004 | $d_3$ | 4.82 | $N_2$ 1.76182 | $\nu_2$ 26.55 |
| | $r_4$ 108.510 | | | | |
| | | $d_4$ | 6.43 | | |
| $L_3$ | $r_5$* 225.705 | $d_5$ | 4.43 | $N_3$ 1.49140 | $\nu_3$ 57.82 |
| | $r_6$ 303.611 | | | | |
| | | $d_6$ | 3.00 | | |
| $L_4$ | $r_7$ 87.434 | $d_7$ | 9.07 | $N_4$ 1.64050 | $\nu_4$ 60.08 |
| | $r_8$ −138.442 | | | | |
| | | $d_8$ | 12.59 | | |
| $L_5$ | $r_9$ 1006.339 | $d_9$ | 6.04 | $N_5$ 1.67003 | $\nu_5$ 47.15 |
| | $r_{10}$ −98.621 | | | | |
| | | $d_{10}$ | 10.07 | | |
| $L_6$ | $r_{11}$** −29.026 | $d_{11}$ | 4.53 | $N_6$ 1.49140 | $\nu_6$ 57.82 |
| | $r_{12}$ −222.004 | | | | |

Aspheric coefficients of $r_5$

$a = 0.00000$    $d = 0.49406 \times 10^{-12}$
$b = -0.80812 \times 10^{-6}$    $e = -0.48023 \times 10^{-15}$
$c = 0.41922 \times 10^{-10}$    $f = 0.77604 \times 10^{-19}$

Aspheric coefficients of $r_{11}$

$a = 0.00000$    $d = 0.15277 \times 10^{-10}$
$b = 0.17571 \times 10^{-5}$    $e = -0.22836 \times 10^{-13}$
$c = -0.16052 \times 10^{-8}$    $f = 0.22169 \times 10^{-16}$

Configuration of $L_3$ ($11.4 < h < 22.9$)

| h | ΔF |
|---|---|
| 11.4 | 0.0134 |
| 12.0 | 0.0165 |
| 16.0 | 0.0506 |
| 20.0 | 0.1186 |
| 22.9 | 0.1963 |

Configuration of $L_6$ ($9.9 < h < 24.8$)

| h | ΔR |
|---|---|
| 9.9 | −0.0166 |
| 12.0 | −0.0370 |
| 16.0 | −0.1350 |
| 20.0 | −0.4265 |
| 24.8 | −1.6675 |

TABLE 2-continued

Embodiment 2

$\phi_3/\phi = 0.057$
$\phi_F/\phi_R = -1.907$
$\phi_b/\phi = -0.475$

TABLE 3

Embodiment 3

$f = 100$   $F_{No} = 1.9$

| | radius of curvature | | axial distance | refractive index (Nd) | Abbe number (νd) |
|---|---|---|---|---|---|
| $L_1$ | $r_1$ 39.635 | $d_1$ | 13.58 | $N_1$ 1.74250 | $\nu_1$ 52.51 |
| | $r_2$ 140.441 | | | | |
| | | $d_2$ | 3.93 | | |
| $L_2$ | $r_3$ −179.613 | $d_3$ | 4.53 | $N_2$ 1.75000 | $\nu_2$ 25.14 |
| | $r_4$ 80.764 | | | | |
| | | $d_4$ | 6.45 | | |
| $L_3$ | $r_5$* 201.831 | $d_5$ | 4.43 | $N_3$ 1.49140 | $\nu_3$ 57.82 |
| | $r_6$ 316.285 | | | | |
| | | $d_6$ | 3.05 | | |
| $L_4$ | $r_7$ 103.482 | $d_7$ | 8.07 | $N_4$ 1.71700 | $\nu_4$ 47.86 |
| | $r_8$ −105.780 | | | | |
| | | $d_8$ | 16.64 | | |
| $L_5$ | $r_9$ −32.981 | $d_9$ | 4.03 | $N_5$ 1.49140 | $\nu_5$ 57.82 |
| | $r_{10}$ −44.970 | | | | |
| | | $d_{10}$ | 6.54 | | |
| $L_6$ | $r_{11}$** −25.868 | $d_{11}$ | 4.53 | $N_6$ 1.49140 | $\nu_6$ 57.82 |
| | $r_{12}$ −35.312 | | | | |

Aspheric coefficients of $r_5$

$a = 0.00000$    $d = 0.10957 \times 10^{-11}$
$b = -0.87983 \times 10^{-6}$    $e = -0.66739 \times 10^{-15}$
$c = 0.18300 \times 10^{-9}$    $f = 0.78273 \times 10^{-19}$

Aspheric coefficients of $r_{11}$

$a = 0.00000$    $d = 0.30835 \times 10^{-10}$
$b = 0.73632 \times 10^{-6}$    $e = -0.61675 \times 10^{-13}$
$c = -0.59010 \times 10^{-8}$    $f = 0.66071 \times 10^{-16}$

Configuration of $L_3$ ($11.0 < h < 22.0$)

| h | ΔF |
|---|---|
| 11.0 | 0.0123 |
| 12.0 | 0.0173 |
| 16.0 | 0.0506 |
| 20.0 | 0.1075 |
| 22.0 | 0.1420 |

Configuration of $L_6$ ($9.0 < h < 22.5$)

| h | ΔR |
|---|---|
| 9.0 | −0.0028 |
| 12.0 | −0.0077 |
| 16.0 | −0.0325 |
| 20.0 | −0.1686 |
| 22.5 | −0.5099 |

$\phi_3/\phi = 0.089$
$\phi_F/\phi_R = -1.757$
$\phi_b/\phi = -0.671$

TABLE 4

Embodiment 4

$f = 100$   $F_{No} = 1.9$

| | radius of curvature | | axial distance | refractive index (Nd) | Abbe number (νd) |
|---|---|---|---|---|---|
| $L_1$ | $r_1$ 39.564 | $d_1$ | 13.58 | $N_1$ 1.65830 | $\nu_1$ 58.52 |
| | $r_2$ 121.406 | | | | |
| | | $d_2$ | 5.03 | | |
| $L_2$ | $r_3$ −121.221 | $d_3$ | 4.39 | $N_2$ 1.75000 | $\nu_2$ 25.14 |
| | $r_4$ 145.392 | | | | |

TABLE 4-continued

Embodiment 4

|  |  |  | $d_4$ | 6.44 |  |  |  |
|---|---|---|---|---|---|---|---|
| $L_3$ | ( | $r_5^*$ 231.883 | $d_5$ | 4.43 | $N_3$ 1.49140 | $\nu_3$ | 57.82 |
|  |  | $r_6$ 310.385 | $d_6$ | 3.03 |  |  |  |
| $L_4$ | ( | $r_7$ 117.513 | $d_7$ | 8.60 | $N_4$ 1.77250 | $\nu_4$ | 49.77 |
|  |  | $r_8$ −93.440 | $d_8$ | 22.76 |  |  |  |
| $L_5$ | ( | $r_9^{**}$ −24.768 | $d_9$ | 4.03 | $N_5$ 1.49140 | $\nu_5$ | 57.82 |
|  |  | $r_{10}$ −30.193 | $d_{10}$ | 3.03 |  |  |  |
| $L_6$ | ( | $r_{11}$ −40.067 | $d_{11}$ | 4.54 | $N_6$ 1.49140 | $\nu_6$ | 57.82 |
|  |  | $r_{12}$ −92.256 |  |  |  |  |  |

Aspheric coefficients of $r_5$ $a = 0.00000$  $d = -0.22902 \times 10^{-11}$
$b = -0.18416 \times 10^{-5}$  $e = 0.18248 \times 10^{-14}$
$c = 0.13159 \times 10^{-8}$  $f = 0.13319 \times 10^{-18}$

Aspheric coefficients of $r_9$ $a = 0.00000$  $d = 0.32277 \times 10^{-10}$
$b = 0.83374 \times 10^{-6}$  $e = -0.63518 \times 10^{-13}$
$c = -0.54094 \times 10^{-8}$  $f = 0.79866 \times 10^{-16}$

Configuration of $L_3$ (11.4 < h < 22.8)

| h | ΔF |
|---|---|
| 11.4 | 0.0288 |
| 12.0 | 0.0351 |
| 16.0 | 0.1064 |
| 20.0 | 0.2498 |
| 22.8 | 0.4081 |

Configuration of $L_5$ (8.6 < h < 21.5)

| −h | ΔR |
|---|---|
| 8.6 | −0.0032 |
| 12.0 | −0.0118 |
| 16.0 | −0.0552 |
| 20.0 | −0.2902 |
| 21.5 | −0.5562 |

$\phi_3/\phi = 0.055$
$\phi_F/\phi_R = -1.435$
$\phi_b/\phi = -0.297$

TABLE 5

Embodiment 5

$f = 100$  $F_{No} = 1.9$

|  |  | radius of curvature | axial distance | refractive index (Nd) | Abbe number ($\nu$d) |
|---|---|---|---|---|---|
| $L_1$ | ( | $r_1$ 47.077 | $d_1$ 11.58 | $N_1$ 1.74250 | $\nu_1$ 52.51 |
|  |  | $r_2$ 139.070 | $d_2$ 5.23 |  |  |
| $L_2$ | ( | $r_3$ −115.337 | $d_3$ 5.03 | $N_2$ 1.75000 | $\nu_2$ 25.14 |
|  |  | $r_4$ 140.522 | $d_4$ 6.64 |  |  |
| $L_3$ | ( | $r_5^*$ 233.488 | $d_5$ 4.53 | $N_3$ 1.49140 | $\nu_3$ 57.82 |
|  |  | $r_6$ 322.928 | $d_6$ 3.52 |  |  |
| $L_4$ | ( | $r_7$ 104.109 | $d_7$ 9.86 | $N_4$ 1.71300 | $\nu_4$ 53.93 |
|  |  | $r_8$ −88.587 | $d_8$ 34.03 |  |  |
| $L_5$ | ( | $r_9^{**}$ −29.342 | $d_9$ 4.53 | $N_5$ 1.49140 | $\nu_5$ 57.82 |
|  |  | $r_{10}$ −72.026 |  |  |  |

Aspheric coefficients of $r_5$ $a = 0.00000$  $d = 0.62329 \times 10^{-12}$
$b = -0.12497 \times 10^{-5}$  $e = -0.54717 \times 10^{-15}$
$c = -0.40336 \times 10^{-9}$  $f = 0.75221 \times 10^{-19}$

Aspheric coefficients of $r_9$ $a = 0.00000$  $d = 0.13251 \times 10^{-10}$

TABLE 5-continued

Embodiment 5

$b = 0.10912 \times 10^{-5}$  $e = -0.19052 \times 10^{-13}$
$c = -0.27931 \times 10^{-8}$  $f = 0.17289 \times 10^{-16}$

Configuration of $L_3$ (11.8 < h < 23.7)

| h | ΔF |
|---|---|
| 11.8 | 0.0251 |
| 12.0 | 0.0269 |
| 16.0 | 0.0866 |
| 20.0 | 0.2151 |
| 23.7 | 0.4319 |

Configuration of $L_5$ (10.4 < h < 26.1)

| h | ΔR |
|---|---|
| 10.4 | −0.0108 |
| 12.0 | −0.0190 |
| 16.0 | −0.0655 |
| 20.0 | −0.2108 |
| 26.1 | −1.4097 |

$\phi_3/\phi = 0.059$
$\phi_F/\phi_R = -1.381$
$\phi_b/\phi = -0.316$

TABLE 6

Embodiment 6

$f = 100$  $F_{No} = 1.9$

|  |  | radius of curvature | axial distance | refractive index (Nd) | Abbe number ($\nu$d) |
|---|---|---|---|---|---|
| $L_1$ | ( | $r_1$ 48.623 | $d_1$ 12.27 | $N_1$ 1.71300 | $\nu_1$ 53.93 |
|  |  | $r_2$ 170.332 | $d_2$ 4.23 |  |  |
| $L_2$ | ( | $r_3$ −130.473 | $d_3$ 4.53 | $N_2$ 1.75000 | $\nu_2$ 25.14 |
|  |  | $r_4$ 170.773 | $d_4$ 6.65 |  |  |
| $L_3$ | ( | $r_5^*$ −1652.891 | $d_5$ 4.53 | $N_3$ 1.49140 | $\nu_3$ 57.82 |
|  |  | $r_6$ 302.195 | $d_6$ 5.03 |  |  |
| $L_4$ | ( | $r_7$ 88.476 | $d_7$ 10.06 | $N_4$ 1.69680 | $\nu_4$ 56.47 |
|  |  | $r_8$ −88.476 | $d_8$ 34.01 |  |  |
| $L_5$ | ( | $r_9^{**}$ −29.707 | $d_9$ 4.53 | $N_5$ 1.49140 | $\nu_5$ 57.82 |
|  |  | $r_{10}$ −70.535 |  |  |  |

Aspheric coefficients of $r_5$ $a = 0.00000$  $d = -0.18166 \times 10^{-12}$
$b = -0.13560 \times 10^{-5}$  $e = -0.11967 \times 10^{-15}$
$c = -0.11639 \times 10^{-9}$  $f = 0.73177 \times 10^{-19}$

Aspheric coefficients of $r_9$ $a = 0.00000$  $d = 0.27689 \times 10^{-10}$
$b = 0.99171 \times 10^{-6}$  $e = -0.42806 \times 10^{-13}$
$c = -0.67905 \times 10^{-8}$  $f = 0.28858 \times 10^{-16}$

Configuration of $L_3$ (11.8 < h < 23.6)

| h | ΔF |
|---|---|
| 11.8 | 0.0267 |
| 12.0 | 0.0286 |
| 16.0 | 0.0917 |
| 20.0 | 0.2300 |
| 23.6 | 0.4625 |

Configuration of $L_6$ (10.6 < h < 26.4)

| h | ΔR |
|---|---|
| 10.6 | −0.0066 |
| 12.0 | −0.0098 |
| 16.0 | −0.0311 |
| 20.0 | −0.1128 |
| 26.4 | −0.9843 |

$\phi_3/\phi = -0.192$
$\phi_F/\phi_R = -1.430$
$\phi_b/\phi = -0.470$

TABLE 7

Embodiment 7

$f = 100 \quad F_{No} = 1.9$

| | | radius of curvature | axial distance | | refractive index (Nd) | | Abbe number ($\nu$d) |
|---|---|---|---|---|---|---|---|
| $L_1$ | $r_1$ | 47.339 | $d_1$ 11.58 | $N_1$ | 1.74250 | $\nu_1$ | 52.51 |
| | $r_2$ | 146.403 | | | | | |
| | | | $d_2$ 5.23 | | | | |
| $L_2$ | $r_3$ | −112.544 | $d_3$ 5.03 | $N_2$ | 1.75000 | $\nu_2$ | 25.14 |
| | $r_4$ | 145.638 | | | | | |
| | | | $d_4$ 6.64 | | | | |
| $L_3$ | $r_5$ | 235.226 | $d_5$ 4.53 | $N_3$ | 1.49140 | $\nu_3$ | 57.82 |
| | $r_6$* | 320.894 | | | | | |
| | | | $d_6$ 3.52 | | | | |
| $L_4$ | $r_7$ | 103.224 | $d_7$ 9.86 | $N_4$ | 1.71300 | $\nu_4$ | 53.93 |
| | $r_8$ | −91.231 | | | | | |
| | | | $d_8$ 34.03 | | | | |
| $L_5$ | $r_9$** | −29.329 | $d_9$ 4.53 | $N_5$ | 1.49140 | $\nu_5$ | 57.82 |
| | $r_{10}$ | −72.044 | | | | | |

Aspheric coefficients of $r_6$

$a = 0.00000 \qquad d = -0.22464 \times 10^{-13}$
$b = 0.11711 \times 10^{-5} \qquad e = 0.25658 \times 10^{-16}$
$c = 0.12121 \times 10^{-9} \qquad f = 0.30650 \times 10^{-21}$

Aspheric coefficients of $r_9$

$a = 0.00000 \qquad d = 0.60961 \times 10^{-11}$
$b = 0.59441 \times 10^{-6} \qquad e = -0.11356 \times 10^{-13}$
$c = 0.17729 \times 10^{-9} \qquad f = 0.14470 \times 10^{-16}$

Configuration of $L_3$ (11.7 < h < 23.4)

| h | $\Delta F$ |
|---|---|
| 11.7 | 0.0223 |
| 12.0 | 0.0246 |
| 16.0 | 0.0787 |
| 20.0 | 0.1948 |
| 23.4 | 0.3703 |

Configuration of $L_6$ (10.4 < h < 26.2)

| h | $\Delta R$ |
|---|---|
| 10.4 | −0.0079 |
| 12.0 | −0.0149 |
| 16.0 | −0.0597 |
| 20.0 | −0.2055 |
| 26.2 | −1.4741 |

$\phi_3/\phi = 0.057$
$\phi_F/\phi_R = -1.377$
$\phi_b/\phi = -0.299$

TABLE 8

Embodiment 8

$f = 100 \quad F_{No} = 1.9$

| | | radius of curvature | axial distance | | refractive index (Nd) | | Abbe number ($\nu$d) |
|---|---|---|---|---|---|---|---|
| $L_1$ | $r_1$ | 47.598 | $d_1$ 11.50 | $N_1$ | 1.74250 | $\nu_1$ | 52.51 |
| | $r_2$ | 135.131 | | | | | |
| | | | $d_2$ 5.20 | | | | |
| $L_2$ | $r_3$ | −108.794 | $d_3$ 4.99 | $N_2$ | 1.75000 | $\nu_2$ | 25.14 |
| | $r_4$ | 191.408 | | | | | |
| | | | $d_4$ 5.99 | | | | |
| $L_3$ | $r_5$* | 267.312 | $d_5$ 4.50 | $N_3$ | 1.49140 | $\nu_3$ | 57.82 |
| | $r_6$ | 244.433 | | | | | |
| | | | $d_6$ 3.48 | | | | |
| $L_4$ | $r_7$ | 104.980 | $d_7$ 9.80 | $N_4$ | 1.71300 | $\nu_4$ | 53.59 |
| | $r_8$ | −86.967 | | | | | |
| | | | $d_8$ 33.81 | | | | |
| $L_5$ | $r_9$ | −29.740 | $d_9$ 4.50 | $N_5$ | 1.49140 | $\nu_5$ | 57.82 |
| | $r_{10}$** | −71.413 | | | | | |

TABLE 8-continued

Embodiment 8

Aspheric coefficients of $r_5$

$a = 0.00000 \qquad d = 0.63229 \times 10^{-12}$
$b = -0.11491 \times 10^{-5} \qquad e = -0.53817 \times 10^{-15}$
$c = -0.46729 \times 10^{-9} \qquad f = 0.81621 \times 10^{-19}$

Aspheric coefficients of $r_{10}$

$a = 0.00000 \qquad d = -0.22577 \times 10^{-12}$
$b = -0.81366 \times 10^{-7} \qquad e = 0.23718 \times 10^{-15}$
$c = -0.61156 \times 10^{-9} \qquad f = -0.15867 \times 10^{-18}$

Configuration of $L_3$ (11.9 < h < 23.8)

| h | $\Delta F$ |
|---|---|
| 11.9 | 0.0242 |
| 12.0 | 0.0250 |
| 16.0 | 0.0810 |
| 20.0 | 0.2028 |
| 23.8 | 0.4172 |

Configuration of $L_5$ (11.8 < h < 29.7)

| h | $\Delta R$ |
|---|---|
| 11.8 | −0.0033 |
| 12.0 | −0.0036 |
| 16.0 | −0.0164 |
| 20.0 | −0.0562 |
| 24.0 | −0.1595 |
| 29.7 | −0.5678 |

$\phi_3/\phi = -0.016$
$\phi_F/\phi_R = -1.422$
$\phi_b/\phi = -0.204$

TABLE 9

Embodiment 9

$f = 100 \quad F_{No} = 1.9$

| | | radius of curvature | axial distance | | refractive index (Nd) | | Abbe number ($\nu$d) |
|---|---|---|---|---|---|---|---|
| $L_1$ | $r_1$ | 39.834 | $d_1$ 10.99 | $N_1$ | 1.60311 | $\nu_1$ | 60.74 |
| | $r_2$ | 84.827 | | | | | |
| | | | $d_2$ 3.88 | | | | |
| $L_2$ | $r_3$* | 164.897 | $d_3$ 4.49 | $N_2$ | 1.49140 | $\nu_2$ | 57.82 |
| | $r_4$ | 106.272 | | | | | |
| | | | $d_4$ 4.49 | | | | |
| $L_3$ | $r_5$ | −163.359 | $d_5$ 4.49 | $N_3$ | 1.84666 | $\nu_3$ | 23.83 |
| | $r_6$ | 149.525 | | | | | |
| | | | $d_6$ 3.99 | | | | |
| $L_4$ | $r_7$ | 78.408 | $d_7$ 13.16 | $N_4$ | 1.77250 | $\nu_4$ | 49.77 |
| | $r_8$ | −80.748 | | | | | |
| | | | $d_8$ 29.68 | | | | |
| $L_5$ | $r_9$** | −25.864 | $d_9$ 3.82 | $N_5$ | 1.49140 | $\nu_5$ | 57.82 |
| | $r_{10}$ | −100.347 | | | | | |
| | | | $d_{10}$ 0.50 | | | | |
| $L_6$ | $r_{11}$ | −200.546 | $d_{11}$ 7.04 | $N_6$ | 1.78100 | 6 | 44.55 |
| | $r_{12}$ | −100.581 | | | | | |

Aspheric coefficients of $r_3$

$a = 0.00000 \qquad d = -0.85908 \times 10^{-11}$
$b = -0.27446 \times 10^{-5} \qquad e = 0.13103 \times 10^{-13}$
$c = 0.17177 \times 10^{-8} \qquad f = -0.73939 \times 10^{-17}$

Aspheric coefficients of $r_9$

$a = 0.00000 \qquad d = 0.12694 \times 10^{-10}$
$b = 0.15781 \times 10^{-6} \qquad e = -0.51672 \times 10^{-13}$
$c = 0.39918 \times 10^{-8} \qquad f = 0.73965 \times 10^{-16}$

Configuration of $L_3$ (12.3 < h < 24.6)

| h | $\Delta F$ |
|---|---|
| 12.3 | 0.0604 |
| 16.0 | 0.1756 |
| 20.0 | 0.4452 |
| 24.6 | 1.0763 |

Configuration of $L_6$ (9.5 < h < 23.7)

TABLE 9-continued

Embodiment 9

| h | ΔR |
|---|---|
| 9.5 | −0.0048 |
| 12.0 | −0.0181 |
| 16.0 | −0.0958 |
| 20.0 | −0.3795 |
| 23.7 | −1.4546 |

$\phi_2/\phi = -0.160$
$\phi_F/\phi_R = -1.497$
$(\phi_a + \phi_b)/\phi = -1.396$

TABLE 10

Embodiment 10

$f = 100 \quad F_{No} = 1.9$

| | | radius of curvature | axial distance | refractive index (Nd) | Abbe number (νd) |
|---|---|---|---|---|---|
| $L_1$ | $r_1$ | 40.038 | | | |
| | $r_2$ | 89.697 | $d_1$ 11.00 | $N_1$ 1.60311 | $\nu_1$ 60.74 |
| | | | $d_2$ 3.90 | | |
| $L_2$ | $r_3^*$ | 200.406 | | | |
| | $r_4$ | 419.759 | $d_3$ 4.50 | $N_2$ 1.49140 | $\nu_2$ 57.82 |
| | | | $d_4$ 4.05 | | |
| $L_3$ | $r_5$ | −115.402 | | | |
| | $r_6$ | 173.053 | $d_5$ 4.50 | $N_3$ 1.84666 | $\nu_3$ 23.83 |
| | | | $d_6$ 6.13 | | |
| $L_4$ | $r_7$ | 98.045 | | | |
| | $r_8$ | −107.103 | $d_7$ 13.16 | $N_4$ 1.78850 | $\nu_4$ 45.68 |
| | | | $d_8$ 12.59 | | |
| $L_5$ | $r_9$ | −389.923 | | | |
| | $r_{10}$ | −149.987 | $d_9$ 6.04 | $N_5$ 1.67003 | $\nu_5$ 47.15 |
| | | | $d_{10}$ 10.07 | | |
| $L_6$ | $r_{11}^{**}$ | −29.066 | | | |
| | $r_{12}$ | −222.175 | $d_{11}$ 4.53 | $N_6$ 1.49140 | $\nu_6$ 57.82 |

Aspheric coefficients of $r_3$ a = 0.00000
b = −0.15733 × 10$^{-5}$
c = 0.24010 × 10$^{-8}$
d = −0.87607 × 10$^{-11}$
e = 0.13224 × 10$^{-13}$
f = −0.73693 × 10$^{-17}$

Aspheric coefficients of $r_{11}$ a = 0.00000
b = 0.97451 × 10$^{-6}$
c = −0.57074 × 10$^{-9}$
d = 0.13471 × 10$^{-10}$
e = −0.22856 × 10$^{-13}$
f = 0.22170 × 10$^{-16}$

Configuration of $L_2$ (12.2 < h < 24.5)

| h | ΔF |
|---|---|
| 12.2 | 0.0304 |
| 16.0 | 0.0880 |
| 20.0 | 0.2171 |
| 24.5 | 0.4991 |

Configuration of $L_6$ (9.8 < h < 24.4)

| h | ΔR |
|---|---|
| 9.8 | −0.0095 |
| 12.0 | −0.0231 |
| 16.0 | −0.0933 |
| 20.0 | −0.3210 |
| 24.4 | −1.1952 |

$\phi_2/\phi = 0.192$
$\phi_F/\phi_R = -1.625$
$(\phi_a + \phi_b)/\phi = -1.275$

TABLE 11

Embodiment 11

$f = 100 \quad F_{No} = 1.9$

| | | radius of curvature | axial distance | refractive index (Nd) | Abbe number (νd) |
|---|---|---|---|---|---|
| | $r_1$ | 42.742 | | | |
| $L_1$ | $r_2$ | 109.550 | $d_1$ 10.98 | $N_1$ 1.60311 | $\nu_1$ 60.74 |
| | | | $d_2$ 3.90 | | |
| $L_2$ | $r_3^*$ | 514.917 | | | |
| | $r_4$ | 244.125 | $d_3$ 4.50 | $N_2$ 1.49140 | $\nu_2$ 57.82 |
| | | | $d_4$ 3.78 | | |
| $L_3$ | $r_5$ | −207.479 | | | |
| | $r_6$ | 90.997 | $d_5$ 4.50 | $N_3$ 1.84666 | $\nu_3$ 23.83 |
| | | | $d_6$ 6.02 | | |
| $L_4$ | $r_7$ | 88.590 | | | |
| | $r_8$ | −70.517 | $d_7$ 13.17 | $N_4$ 1.78850 | $\nu_4$ 45.68 |
| | | | $d_8$ 33.24 | | |
| $L_5$ | $r_9^{**}$ | −29.196 | | | |
| | $r_{10}$ | −71.775 | $d_9$ 5.05 | $N_5$ 1.49140 | $\nu_5$ 57.82 |

Aspheric coefficients of $r_3$ a = 0.00000
b = −0.28392 × 10$^{-5}$
c = 0.14749 × 10$^{-8}$
d = −0.70625 × 10$^{-11}$
e = 0.11544 × 10$^{-13}$
f = −0.68879 × 10$^{-17}$

Aspheric coefficients of $r_9$ a = 0.00000
b = 0.19318 × 10$^{-6}$
c = −0.30080 × 10$^{-9}$
d = 0.12450 × 10$^{-10}$
e = −0.22167 × 10$^{-13}$
f = 0.18472 × 10$^{-16}$

Configuration of $L_2$ (12.4 < h < 24.8)

| h | ΔF |
|---|---|
| 12.4 | 0.0648 |
| 16.0 | 0.1809 |
| 20.0 | 0.4507 |
| 24.8 | 1.0984 |

Configuration of $L_5$ (10.4 < h < 25.9)

| h | ΔR |
|---|---|
| 10.4 | −0.0033 |
| 12.0 | −0.0073 |
| 16.0 | −0.0419 |
| 20.0 | −0.1790 |
| 25.9 | −1.1892 |

$\phi_2/\phi = -0.105$
$\phi_F/\phi_R = -1.401$
$(\phi_a + \phi_b)/\phi = -1.066$

TABLE 12

Embodiment 12

$f = 100 \quad F_{No} = 1.9$

| | | radius of curvature | axial distance | refractive index (Nd) | Abbe number (νd) |
|---|---|---|---|---|---|
| $L_1$ | $r_1$ | 42.770 | | | |
| | $r_2$ | 96.630 | $d_1$ 11.00 | $N_1$ 1.60311 | $\nu_1$ 60.74 |
| | | | $d_2$ 3.90 | | |
| $L_2$ | $r_3^*$ | 250.000 | | | |
| | $r_4$ | 250.000 | $d_3$ 4.50 | $N_2$ 1.49140 | $\nu_2$ 57.82 |
| | | | $d_4$ 3.84 | | |
| $L_3$ | $r_5$ | −162.346 | | | |
| | $r_6$ | 96.341 | $d_5$ 4.50 | $N_3$ 1.84666 | $\nu_3$ 23.83 |
| | | | $d_6$ 6.08 | | |
| $L_4$ | $r_7$ | 87.598 | | | |
| | $r_8$ | −68.705 | $d_7$ 13.20 | $N_4$ 1.78850 | $\nu_4$ 45.68 |
| | | | $d_8$ 33.25 | | |
| $L_5$ | $r_9^{**}$ | −28.924 | | | |
| | $r_{10}$ | −73.932 | $d_9$ 5.06 | $N_5$ 1.49140 | $\nu_5$ 57.82 |

Aspheric coefficients of $r_3$ a = 0.00000
b = −0.28122 × 10$^{-5}$
c = 0.71317 × 10$^{-9}$
d = −0.63952 × 10$^{-11}$
e = 0.11011 × 10$^{-13}$
f = −0.68127 × 10$^{-17}$

Aspheric coefficients of $r_9$

TABLE 12-continued
Embodiment 12 a = 0.00000  d = 0.13650 × 10⁻¹⁰
b = 0.69426 × 10⁻⁶  e = −0.22094 × 10⁻¹³
c = −0.17404 × 10⁻⁸  f = 0.18473 × 10⁻¹⁶

Configuration of $L_2$ (12.3 < h < 24.7)

| h | ΔF |
|---|---|
| 12.3 | 0.0645 |
| 16.0 | 0.1896 |
| 20.0 | 0.4832 |
| 24.7 | 1.1914 |

Configuration of $L_5$ (10.3 < h < 25.8)

| h | ΔR |
|---|---|
| 10.3 | −0.0072 |
| 12.0 | −0.0139 |
| 16.0 | −0.0558 |
| 20.0 | −0.1986 |
| 25.8 | −1.1938 |

$\phi_2/\phi = 0.001$
$\phi_F/\phi_R = -1.362$
$(\phi_a + \phi_b)/\phi = -1.145$

TABLE 13
Embodiment 13 f = 100  $F_{No}$ = 1.9

| | | radius of curvature | axial distance | | refractive index (Nd) | | Abbe number (νd) |
|---|---|---|---|---|---|---|---|
| $L_1$ | $r_1$ | 42.248 | $d_1$ 10.92 | $N_1$ | 1.60311 | $\nu_1$ | 60.74 |
| | $r_2$ | 101.700 | | | | | |
| | | | $d_2$ 3.60 | | | | |
| $L_2$ | $r_3$ | −1997.761 | $d_3$ 5.00 | $N_2$ | 1.49140 | $\nu_2$ | 57.82 |
| | $r_4$* | 4028.034 | | | | | |
| | | | $d_4$ 4.67 | | | | |
| $L_3$ | $r_5$ | −148.661 | $d_5$ 4.85 | $N_3$ | 1.84666 | $\nu_3$ | 23.83 |
| | $r_6$ | 121.642 | | | | | |
| | | | $d_6$ 6.69 | | | | |
| $L_4$ | $r_7$ | 86.470 | $d_7$ 12.01 | $N_4$ | 1.78850 | $\nu_4$ | 45.68 |
| | $r_8$ | −77.803 | | | | | |
| | | | $d_8$ 32.87 | | | | |
| $L_5$ | $r_9$** | −28.629 | $d_9$ 6.77 | $N_5$ | 1.49140 | $\nu_5$ | 57.82 |
| | $r_{10}$ | −73.346 | | | | | |

Aspheric coefficients of $r_4$
a = 0.00000  d = −0.92378 × 10⁻¹²
b = 0.25430 × 10⁻⁵  e = 0.16121 × 10⁻¹⁴
c = 0.93730 × 10⁻⁹  f = −0.60762 × 10⁻¹⁹

Aspheric coefficients of $r_9$
a = 0.00000  d = 0.11398 × 10⁻¹⁰
b = 0.69359 × 10⁻⁶  e = −0.20679 × 10⁻¹³
c = −0.13212 × 10⁻⁸  f = 0.18494 × 10⁻¹⁶

Configuration of $L_2$ (11.8 < h < 23.7)

| h | ΔF |
|---|---|
| 11.8 | 0.0516 |
| 12.0 | 0.0552 |
| 16.0 | 0.1802 |
| 20.0 | 0.4600 |
| 23.7 | 0.9685 |

Configuration of $L_5$ (10.2 < h < 25.5)

| h | ΔR |
|---|---|
| 10.2 | −0.0071 |
| 12.0 | −0.0142 |
| 16.0 | −0.0547 |
| 20.0 | −0.1822 |
| 25.5 | −0.9617 |

$\phi_2/\phi = -0.037$
$\phi_F/\phi_R = -1.363$
$(\phi_a + \phi_b)/\phi = -1.200$

TABLE 14
Embodiment 14 f = 100  $F_{No}$ = 1.9

| | | radius of curvature | axial distance | | refractive index (Nd) | | Abbe number (νd) |
|---|---|---|---|---|---|---|---|
| $L_1$ | $r_1$ | 41.301 | $d_1$ 11.00 | $N_1$ | 1.60311 | $\nu_1$ | 60.74 |
| | $r_2$ | 94.505 | | | | | |
| | | | $d_2$ 3.90 | | | | |
| $L_2$ | $r_3$* | 200.102 | $d_3$ 4.50 | $N_2$ | 1.49140 | $\nu_2$ | 57.82 |
| | $r_4$ | 252.520 | | | | | |
| | | | $d_4$ 4.05 | | | | |
| $L_3$ | $r_5$ | −146.107 | $d_5$ 4.50 | $N_3$ | 1.84666 | $\nu_3$ | 23.83 |
| | $r_6$ | 95.569 | | | | | |
| | | | $d_6$ 5.00 | | | | |
| $L_4$ | $r_7$ | 89.957 | $d_7$ 13.16 | $N_4$ | 1.78850 | $\nu_4$ | 45.68 |
| | $r_8$ | −69.319 | | | | | |
| | | | $d_8$ 33.17 | | | | |
| $L_5$ | $r_9$ | −28.650 | $d_9$ 5.09 | $N_5$ | 1.49140 | $\nu_5$ | 57.82 |
| | $r_{10}$** | −71.531 | | | | | |

Aspheric coefficients of $r_3$
a = 0.00000  d = −0.85006 × 10⁻¹¹
b = −0.28402 × 10⁻⁵  e = 0.13126 × 10⁻¹³
c = 0.16133 × 10⁻⁸  f = −0.74024 × 10⁻¹⁷

Aspheric coefficients of $r_{10}$
a = 0.00000  d = −0.40093 × 10⁻¹²
b = −0.88302 × 10⁻⁶  e = 0.46221 × 10⁻¹⁶
c = −0.24025 × 10⁻⁹  f = 0.20072 × 10⁻²⁰

Configuration of $L_2$ (12.3 < h < 24.6)

| h | ΔF |
|---|---|
| 12.3 | 0.0629 |
| 16.0 | 0.1832 |
| 20.0 | 0.4647 |
| 24.5 | 1.1209 |

Configuration of $L_5$ (11.5 < h < 28.7)

| h | ΔR |
|---|---|
| 11.5 | −0.0161 |
| 12.0 | −0.0192 |
| 16.0 | −0.0636 |
| 20.0 | −0.1664 |
| 24.0 | −0.3800 |
| 28.7 | −0.8998 |

$\phi_2/\phi = 0.052$
$\phi_F/\phi_R = -1.357$
$(\phi_a + \phi_b)/\phi = -1.165$

TABLE 15
Embodiment 15 f = 100  $F_{No}$ = 1.9

| | | radius of curvature | axial distance | | refractive index (Nd) | | Abbe number (νd) |
|---|---|---|---|---|---|---|---|
| $L_1$ | $r_1$ | 40.002 | $d_1$ 11.55 | $N_1$ | 1.71300 | $\nu_1$ | 53.93 |
| | $r_2$ | 73.989 | | | | | |
| | | | $d_2$ 7.35 | | | | |
| $L_2$ | $r_3$ | −112.095 | $d_3$ 4.47 | $N_2$ | 1.84666 | $\nu_2$ | 23.83 |
| | $r_4$ | 297.669 | | | | | |
| | | | $d_4$ 8.00 | | | | |
| $L_3$ | $r_5$ | 56.236 | $d_5$ 11.01 | $N_3$ | 1.69680 | $\nu_3$ | 56.47 |
| | $r_6$ | −99.544 | | | | | |
| | | | $d_6$ 0.5 | | | | |
| $L_4$ | $r_7$* | −880.033 | $d_7$ 5.03 | $N_4$ | 1.49140 | $\nu_4$ | 57.82 |
| | $r_8$ | 170.388 | | | | | |
| | | | $d_8$ 25.55 | | | | |
| $L_5$ | $r_9$** | −24.063 | $d_9$ 3.82 | $N_5$ | 1.49140 | $\nu_5$ | 57.82 |
| | $r_{10}$ | −75.136 | | | | | |
| | | | $d_{10}$ 0.50 | | | | |

TABLE 15-continued

Embodiment 15

| | | | | | | | | |
|---|---|---|---|---|---|---|---|---|
| $L_6$ | $r_{11}$ | −220.365 | $d_{11}$ | 7.04 | $N_6$ | 1.77250 | $\nu_6$ | 49.77 |
| | $r_{12}$ | −100.639 | | | | | | |

Aspheric coefficients of $r_4$ a = 0.00000  
b = −0.33701 × $10^{-5}$  
c = 0.21986 × $10^{-9}$  
d = 0.15898 × $10^{-11}$  
e = −0.19714 × $10^{-14}$  
f = −0.64675 × $10^{-19}$

Aspheric coefficients of $r_9$ a = 0.00000  
b = 0.32305 × $10^{-5}$  
c = −0.95353 × $10^{-8}$  
d = 0.39815 × $10^{-10}$  
e = −0.51560 × $10^{-13}$  
f = 0.73964 × $10^{-16}$

Configuration of $L_4$ (10.5 < h < 21.0)

| h | ΔF |
|---|---|
| 10.5 | 0.0405 |
| 12.0 | 0.0687 |
| 16.0 | 0.2125 |
| 20.0 | 0.5049 |
| 21.0 | 0.6098 |

Configuration of $L_5$ (8.6 < h < 21.6)

| h | ΔR |
|---|---|
| 8.6 | −0.0149 |
| 12.0 | −0.0531 |
| 16.0 | −0.1869 |
| 20.0 | −0.7009 |
| 21.6 | −1.2444 |

$\phi_4/\phi = -0.345$  
$\phi_F/\phi_R = -1.577$  
$\phi_c/\phi = 0.644$

TABLE 16

Embodiment 16 f = 100  $F_{No} = 1.9$

| | | radius of curvature | | axial distance | refractive index (Nd) | | Abbe number (νd) |
|---|---|---|---|---|---|---|---|
| $L_1$ | $r_1$ | 43.930 | $d_1$ | 9.67 | $N_1$ 1.77250 | $\nu_1$ | 49.77 |
| | $r_2$ | 83.336 | | | | | |
| | | | $d_2$ | 7.27 | | | |
| $L_2$ | $r_3$ | −105.855 | $d_3$ | 4.46 | $N_2$ 1.75000 | $\nu_2$ | 25.14 |
| | $r_4$ | 185.128 | | | | | |
| | | | $d_4$ | 7.96 | | | |
| $L_3$ | $r_5$ | 69.504 | $d_5$ | 10.98 | $N_3$ 1.69680 | $\nu_3$ | 56.47 |
| | $r_6$ | −692.592 | | | | | |
| | | | $d_6$ | 0.43 | | | |
| $L_4$ | $r_7$* | 3585.642 | $d_7$ | 4.98 | $N_4$ 1.49140 | $\nu_4$ | 57.82 |
| | $r_8$ | −130.225 | | | | | |
| | | | $d_8$ | 12.54 | | | |
| $L_5$ | $r_9$ | 549.529 | $d_9$ | 6.04 | $N_5$ 1.67003 | $\nu_5$ | 47.15 |
| | $r_{10}$ | −116.020 | | | | | |
| | | | $d_{10}$ | 10.06 | | | |
| $L_6$ | $r_{11}$** | −29.334 | $d_{11}$ | 4.51 | $N_6$ 1.49140 | $\nu_6$ | 57.82 |
| | $r_{12}$ | −252.94 | | | | | |

Aspheric coefficients of $r_7$ a = 0.00000  
b = −0.11318 × $10^{-5}$  
c = 0.56170 × $10^{-9}$  
d = −0.60141 × $10^{-13}$  
e = −0.11459 × $10^{-15}$  
f = −0.15091 × $10^{-18}$

Aspheric coefficients of $r_{11}$ a = 0.00000  
b = 0.59048 × $10^{-6}$  
c = 0.79552 × $10^{-9}$  
d = 0.10690 × $10^{-10}$  
e = −0.22656 × $10^{-13}$  
f = 0.22174 × $10^{-16}$

Configuration of $L_4$ (11.5 < h < 23.1)

| h | ΔF |
|---|---|
| 11.5 | 0.0185 |
| 12.0 | 0.0218 |
| 16.0 | 0.0652 |
| 20.0 | 0.1485 |
| 23.1 | 0.2502 |

Configuration of $L_6$ (9.9 < h < 24.7)

| h | ΔR |
|---|---|
| 9.9 | −0.0072 |
| 12.0 | −0.0180 |
| 16.0 | −0.0793 |
| 20.0 | −0.2779 |
| 24.7 | −1.1445 |

$\phi_4/\phi = 0.391$  
$\phi_F/\phi_R = -1.782$  
$\phi_c/\phi = 0.114$

TABLE 17

Embodiment 17 f = 100  $F_{No} = 1.9$

| | | radius of curvature | | axial distance | refractive index (Nd) | | Abbe number (νd) |
|---|---|---|---|---|---|---|---|
| $L_1$ | $r_1$ | 46.536 | $d_1$ | 9.71 | $N_1$ 1.77250 | $\nu_1$ | 49.77 |
| | $r_2$ | 103.323 | | | | | |
| | | | $d_2$ | 6.50 | | | |
| $L_2$ | $r_3$ | −96.792 | $d_3$ | 4.50 | $N_2$ 1.75000 | $\nu_2$ | 25.14 |
| | $r_4$ | 300.324 | | | | | |
| | | | $d_4$ | 10.34 | | | |
| $L_3$ | $r_5$ | 91.674 | $d_5$ | 11.00 | $N_3$ 1.71300 | $\nu_3$ | 53.93 |
| | $r_6$ | −104.280 | | | | | |
| | | | $d_6$ | 0.50 | | | |
| $L_4$ | $r_7$* | 401.247 | $d_7$ | 5.00 | $N_4$ 1.49140 | $\nu_4$ | 57.82 |
| | $r_8$ | 690.441 | | | | | |
| | | | $d_8$ | 30.00 | | | |
| $L_5$ | $r_9$** | −29.424 | $d_9$ | 5.60 | $N_5$ 1.49140 | $\nu_5$ | 57.82 |
| | $r_{10}$ | −68.969 | | | | | |

Aspheric coefficients of $r_7$ a = 0.00000  
b = −0.12547 × $10^{-5}$  
c = 0.18468 × $10^{-9}$  
d = −0.31085 × $10^{-12}$  
e = −0.14772 × $10^{-15}$  
f = 0.44654 × $10^{-19}$

Aspheric coefficients of $r_9$ a = 0.00000  
b = 0.86954 × $10^{-6}$  
c = −0.67422 × $10^{-8}$  
d = 0.27903 × $10^{-10}$  
e = −0.44825 × $10^{-13}$  
f = 0.32917 × $10^{-16}$

Configuration of $L_4$ (11.0 < h < 22.1)

| h | ΔF |
|---|---|
| 11.0 | 0.0181 |
| 12.0 | 0.0256 |
| 16.0 | 0.0806 |
| 20.0 | 0.1982 |
| 22.1 | 0.2990 |

Configuration of $L_5$ (10.0 < h < 25.1)

| h | ΔR |
|---|---|
| 10.0 | −0.0043 |
| 12.0 | −0.0074 |
| 16.0 | −0.0237 |
| 20.0 | −0.0978 |
| 25.1 | −0.6643 |

$\phi_4/\phi = 0.052$  
$\phi_F/\phi_R = -1.459$  
$\phi_c/\phi = 0.806$

TABLE 18

Embodiment 18 f = 100  $F_{No} = 1.9$

| | radius of curvature | axial distance | refractive index (Nd) | Abbe number (νd) |
|---|---|---|---|---|
| $r_1$ | 48.275 | | | |

TABLE 18-continued

Embodiment 18

| | | radius of curvature | axial distance | | refractive index | | Abbe number | |
|---|---|---|---|---|---|---|---|---|
| $L_1$ | $r_2$ | 116.897 | $d_1$ | 9.70 | $N_1$ | 1.75450 | $\nu_1$ | 51.57 |
| | | | $d_2$ | 6.49 | | | | |
| $L_2$ | $r_3$ | −106.352 | $d_3$ | 6.00 | $N_2$ | 1.75000 | $\nu_2$ | 25.14 |
| | $r_4$ | 231.932 | $d_4$ | 11.00 | | | | |
| $L_3$ | $r_5$ | 82.002 | $d_5$ | 11.00 | $N_3$ | 1.71300 | $\nu_3$ | 53.93 |
| | $r_6$ | −106.198 | $d_6$ | 0.49 | | | | |
| $L_4$ | $r_7^*$ | 659.748 | $d_7$ | 4.99 | $N_4$ | 1.49140 | $\nu_4$ | 57.82 |
| | $r_8$ | 335.649 | $d_8$ | 33.80 | | | | |
| $L_5$ | $r_9^{**}$ | −29.433 | $d_9$ | 5.61 | $N_5$ | 1.49140 | $\nu_5$ | 57.82 |
| | $r_{10}$ | −68.600 | | | | | | |

Aspheric coefficients of $r_7$
a = 0.00000      d = 0.34612 × 10$^{-11}$
b = 0.13802 × 10$^{-5}$    e = −0.35124 × 10$^{-14}$
c = 0.11950 × 10$^{-8}$    f = 0.15744 × 10$^{-19}$ Aspheric coefficients of $r_9$
a = 0.00000      d = 0.28865 × 10$^{-10}$
b = 0.19462 × 10$^{-5}$    e = −0.45192 × 10$^{-13}$
c = −0.74822 × 10$^{-8}$    f = 0.32909 × 10$^{-16}$

Configuration of $L_4$ (10.9 < h < 21.9)

| h | ΔF |
|---|---|
| 10.9 | 0.0209 |
| 12.0 | 0.0309 |
| 16.0 | 0.0995 |
| 20.0 | 0.2446 |
| 21.9 | 0.3551 |

Configuration of $L_5$ (10.5 < h < 26.3)

| h | ΔR |
|---|---|
| 10.5 | −0.0172 |
| 12.0 | −0.0279 |
| 16.0 | −0.0856 |
| 20.0 | −0.2435 |
| 24.0 | −0.7297 |
| 26.3 | −1.5110 |

$\phi_4/\phi = -0.072$
$\phi_F/\phi_R = -1.423$
$\phi_c/\phi = 0.746$

TABLE 19

Embodiment 19 f = 100   $F_{No} = 1.9$

| | | radius of curvature | axial distance | | refractive index (Nd) | | Abbe number ($\nu$d) | |
|---|---|---|---|---|---|---|---|---|
| $L_1$ | $r_1$ | 45.685 | $d_1$ | 9.71 | $N_1$ | 1.74250 | $\nu_1$ | 52.51 |
| | $r_2$ | 104.387 | $d_2$ | 6.50 | | | | |
| $L_2$ | $r_3$ | −96.752 | $d_3$ | 4.50 | $N_2$ | 1.75000 | $\nu_2$ | 25.14 |
| | $r_4$ | 280.836 | $d_4$ | 10.34 | | | | |
| $L_3$ | $r_5$ | 85.097 | $d_5$ | 11.00 | $N_3$ | 1.71300 | $\nu_3$ | 53.93 |
| | $r_6$ | −109.060 | $d_6$ | 0.50 | | | | |
| $L_4$ | $r_7$ | 400.824 | $d_7$ | 5.00 | $N_4$ | 1.49140 | $\nu_4$ | 57.82 |
| | $r_8^*$ | 564.997 | $d_8$ | 30.00 | | | | |
| $L_5$ | $r_9^{**}$ | −29.422 | $d_9$ | 5.60 | $N_5$ | 1.49140 | $\nu_5$ | 57.82 |
| | $r_{10}$ | −68.967 | | | | | | |

Aspheric coefficients of $r_8$
a = 0.00000      d = 0.11535 × 10$^{-11}$
b = 0.16647 × 10$^{-5}$    e = 0.11748 × 10$^{-15}$
c = −0.44163 × 10$^{-9}$    f = 0.12693 × 10$^{-20}$

TABLE 19-continued

Embodiment 19

Aspheric coefficients of $r_9$
a = 0.00000      d = 0.28371 × 10$^{-10}$
b = 0.94138 × 10$^{-6}$    e = −0.44822 × 10$^{-13}$
c = −0.65007 × 10$^{-8}$    f = 0.32917 × 10$^{-16}$

Configuration of $L_4$ (1.03 < h < 20.5)

| h | ΔF |
|---|---|
| 10.3 | 0.0184 |
| 12.0 | 0.0337 |
| 16.0 | 0.1068 |
| 20.5 | 0.2988 |

Configuration of $L_5$ (1.01 < h < 25.2)

| h | ΔR |
|---|---|
| 10.1 | −0.0055 |
| 12.0 | −0.0098 |
| 16.0 | −0.0345 |
| 20.0 | −0.1367 |
| 25.2 | −0.8586 |

$\phi_4/\phi = 0.036$
$\phi_F/\phi_R = -1.458$
$\phi_c/\phi = 0.776$

TABLE 20

Embodiment 20 f = 100   $F_{No} = 1.9$

| | | radius of curvature | axial distance | | refractive index (Nd) | | Abbe number ($\nu$d) | |
|---|---|---|---|---|---|---|---|---|
| $L_1$ | $r_1$ | 45.222 | $d_1$ | 9.71 | $N_1$ | 1.69680 | $\nu_1$ | 56.47 |
| | $r_2$ | 119.891 | $d_2$ | 6.50 | | | | |
| $L_2$ | $r_3$ | −97.267 | $d_3$ | 4.50 | $N_2$ | 1.84666 | $\nu_2$ | 23.83 |
| | $r_4$ | −2012.679 | $d_4$ | 11.00 | | | | |
| $L_3$ | $r_5$ | 104.358 | $d_5$ | 11.00 | $N_3$ | 1.69680 | $\nu_3$ | 56.47 |
| | $r_6$ | −97.151 | $d_6$ | 0.50 | | | | |
| $L_4$ | $r_7^*$ | 450.635 | $d_7$ | 5.00 | $N_4$ | 1.49140 | $\nu_4$ | 57.82 |
| | $r_8$ | 248.754 | $d_8$ | 30.00 | | | | |
| $L_5$ | $r_9$ | −28.020 | $d_9$ | 5.60 | $N_5$ | 1.49140 | $\nu_5$ | 57.82 |
| | $r_{10}^{**}$ | −69.030 | | | | | | |

Aspheric coefficients of $r_7$
a = 0.00000      d = −0.78674 × 10$^{-12}$
b = −0.15889 × 10$^{-5}$    e = −0.14663 × 10$^{-15}$
c = 0.40665 × 10$^{-9}$    f = 0.43834 × 10$^{-19}$ Aspheric coefficients of $r_{10}$
a = 0.00000      d = 0.57165 × 10$^{-12}$
b = −0.42819 × 10$^{-6}$    e = −0.58685 × 10$^{-15}$
c = −0.15018 × 10$^{-8}$    f = −0.20779 × 10$^{-19}$

Configuration of $L_4$ (10.6 < h < 21.3)

| h | ΔF |
|---|---|
| 10.6 | 0.0196 |
| 12.0 | 0.0321 |
| 16.0 | 0.1008 |
| 20.0 | 0.2497 |
| 21.3 | 0.3248 |

Configuration of $L_5$ (11.2 < h < 28.0)

| h | ΔR |
|---|---|
| 11.2 | −0.0096 |
| 12.0 | −0.0132 |
| 16.0 | −0.0515 |
| 20.0 | −0.1561 |
| 24.0 | −0.4041 |
| 28.0 | −0.9495 |

$\phi_4/\phi = -0.088$
$\phi_F/\phi_R = -1.336$

TABLE 20-continued

Embodiment 20

$\phi_c/\phi = 0.826$

TABLE 21

Embodiment 21

$f = 100 \quad F_{No} = 1.9$

| | | radius of curvature | axial distance | refractive index (Nd) | | Abbe number ($\nu$d) | |
|---|---|---|---|---|---|---|---|
| $L_1$ | $r_1$ | 65.000 | $d_1$ | 6.00 | $N_1$ 1.49140 | $\nu_1$ | 57.82 |
| | $r_2$* | 60.000 | $d_2$ | 1.50 | | | |
| $L_2$ | $r_3$ | 46.417 | $d_3$ | 10.78 | $N_2$ 1.74250 | $\nu_2$ | 52.51 |
| | $r_4$ | 172.778 | $d_4$ | 4.02 | | | |
| $L_3$ | $r_5$ | −181.789 | $d_5$ | 4.99 | $N_3$ 1.75000 | $\nu_3$ | 25.14 |
| | $r_6$ | 164.921 | $d_6$ | 14.98 | | | |
| $L_4$ | $r_7$ | 84.856 | $d_7$ | 9.02 | $N_4$ 1.69680 | $\nu_4$ | 56.47 |
| | $r_8$ | −163.670 | $d_8$ | 29.68 | | | |
| $L_5$ | $r_9$** | −26.328 | $d_9$ | 2.63 | $N_5$ 1.49140 | $\nu_5$ | 57.82 |
| | $r_{10}$ | −89.961 | $d_{10}$ | 0.50 | | | |
| $L_6$ | $r_{11}$ | −180.194 | $d_{11}$ | 8.67 | $N_6$ 1.77250 | $\nu_6$ | 49.77 |
| | $r_{12}$ | −99.757 | | | | | |

Aspheric coefficients of $r_2$ a = 0.00000  d = 0.11662 × 10$^{-11}$
b = 0.36446 × 10$^{-6}$  e = −0.92744 × 10$^{-15}$
c = −0.47204 × 10$^{-9}$  f = 0.40047 × 10$^{-18}$

Aspheric coefficients of $r_9$ a = 0.00000  d = 0.11901 × 10$^{-10}$
b = 0.14633 × 10$^{-6}$  e = −0.52750 × 10$^{-13}$
c = 0.35709 × 10$^{-8}$  f = 0.73951 × 10$^{-16}$

Configuration of $L_1$ (15.1 < h < 30.2)

| h | ΔF |
|---|---|
| 15.1 | 0.0160 |
| 16.0 | 0.0201 |
| 20.0 | 0.0501 |
| 24.0 | 0.1149 |
| 28.0 | 0.2554 |
| 30.2 | 0.3972 |

Configuration of $L_5$ (9.4 < h < 23.5)

| h | ΔR |
|---|---|
| 9.4 | −0.0041 |
| 12.0 | −0.0162 |
| 16.0 | −0.0834 |
| 20.0 | −0.3194 |
| 23.5 | −1.1412 |

$\phi_1/\phi = -0.038$
$\phi_F/\phi_R = -1.519$
$\phi_b/\phi = -0.849$

TABLE 22

Embodiment 22

$f = 100 \quad F_{No} = 1.9$

| | | radius of curvature | axial distance | refractive index (Nd) | | Abbe number ($\nu$d) | |
|---|---|---|---|---|---|---|---|
| $L_1$ | $r_1$ | 65.000 | $d_1$ | 6.00 | $N_1$ 1.49140 | $\nu_1$ | 57.82 |
| | $r_2$* | 60.000 | $d_2$ | 1.50 | | | |
| $L_2$ | $r_3$ | 49.144 | $d_3$ | 10.48 | $N_2$ 1.77250 | $\nu_2$ | 49.77 |
| | $r_4$ | 171.328 | $d_4$ | 4.36 | | | |
| $L_3$ | $r_5$ | −204.902 | $d_5$ | 4.90 | $N_3$ 1.75000 | $\nu_3$ | 25.14 |
| | $r_6$ | 111.460 | $d_6$ | 12.00 | | | |
| $L_4$ | $r_7$ | 84.820 | $d_7$ | 9.02 | $N_4$ 1.71300 | $\nu_4$ | 53.93 |
| | $r_8$ | −230.989 | $d_8$ | 12.60 | | | |
| $L_5$ | $r_9$ | 1098.465 | $d_9$ | 18.73 | $N_5$ 1.67000 | $\nu_5$ | 57.07 |
| | $r_{10}$ | −97.049 | $d_{10}$ | 9.50 | | | |
| $L_6$ | $r_{11}$** | −29.316 | $d_{11}$ | 8.10 | $N_6$ 1.49140 | $\nu_6$ | 57.82 |
| | $r_{12}$ | −212.975 | | | | | |

Aspheric coefficients of $r_2$ a = 0.00000  d = 0.91758 × 10$^{-12}$
b = 0.32404 × 10$^{-6}$  e = −0.84987 × 10$^{-15}$
c = −0.34272 × 10$^{-9}$  f = 0.44392 × 10$^{-18}$

Aspheric coefficients of $r_{11}$ a = 0.00000  d = 0.15665 × 10$^{-10}$
b = 0.21077 × 10$^{-5}$  e = −0.24805 × 10$^{-13}$
c = −0.17919 × 10$^{-8}$  f = 0.22141 × 10$^{-16}$

Configuration of $L_1$ (15.3 < h < 30.6)

| h | ΔF |
|---|---|
| 15.3 | 0.0156 |
| 16.0 | 0.0186 |
| 20.0 | 0.0465 |
| 24.0 | 0.1053 |
| 28.0 | 0.2320 |
| 30.6 | 0.3956 |

Configuration of $L_6$ (10.2 < h < 25.6)

| h | ΔR |
|---|---|
| 10.2 | −0.0224 |
| 12.0 | −0.0438 |
| 16.0 | −0.1543 |
| 20.0 | −0.4603 |
| 24.0 | −1.3171 |
| 25.6 | −2.0460 |

$\phi_1/\phi = -0.038$
$\phi_F/\phi_R = -1.949$
$\phi_b/\phi = -0.824$

TABLE 23

Embodiment 23

$f = 100 \quad F_{No} = 1.9$

| | | radius of curvature | axial distance | refractive index (Nd) | | Abbe number ($\nu$d) | |
|---|---|---|---|---|---|---|---|
| $L_1$ | $r_1$ | 65.000 | $d_1$ | 6.00 | $N_1$ 1.49140 | $\nu_1$ | 57.82 |
| | $r_2$* | 60.000 | $d_2$ | 1.50 | | | |
| $L_2$ | $r_3$ | 54.277 | $d_3$ | 10.80 | $N_2$ 1.77250 | $\nu_2$ | 49.77 |
| | $r_4$ | 173.925 | $d_4$ | 4.86 | | | |
| $L_3$ | $r_5$ | −122.142 | $d_5$ | 5.00 | $N_3$ 1.75000 | $\nu_3$ | 25.14 |
| | $r_6$ | 249.277 | $d_6$ | 15.01 | | | |
| $L_4$ | $r_7$ | 89.573 | $d_7$ | 9.01 | $N_4$ 1.71300 | $\nu_4$ | 53.93 |
| | $r_8$ | −114.920 | $d_8$ | 35.17 | | | |
| $L_5$ | $r_9$** | −28.806 | $d_9$ | 5.00 | $N_5$ 1.49140 | $\nu_5$ | 57.82 |
| | $r_{10}$ | −59.878 | | | | | |

Aspheric coefficients of $r_2$ a = 0.00000  d = −0.58962 × 10$^{-12}$
b = 0.29061 × 10$^{-6}$  e = 0.27363 × 10$^{-15}$
c = 0.48643 × 10$^{-9}$  f = 0.42922 × 10$^{-18}$

Aspheric coefficients of $r_9$

TABLE 23-continued

Embodiment 23 a = 0.00000          d = 0.26231 × $10^{-10}$
b = 0.63588 × $10^{-6}$   e = −0.44906 × $10^{-13}$
c = −0.55569 × $10^{-8}$  f = 0.32914 × $10^{-16}$

Configuration of $L_1$ (14.9 < h < 29.7)

| h | ΔF |
|---|---|
| 14.9 | 0.0184 |
| 16.0 | 0.0251 |
| 20.0 | 0.0671 |
| 24.0 | 0.1575 |
| 28.0 | 0.3710 |
| 29.7 | 0.5513 |

Configuration of $L_5$ (10.0 < h < 25.0)

| h | ΔR |
|---|---|
| 10.0 | −0.0030 |
| 12.0 | −0.0054 |
| 16.0 | −0.0210 |
| 20.0 | −0.0926 |
| 24.0 | −0.3913 |
| 25.0 | −0.5735 |

$\phi_1/\phi = -0.038$
$\phi_F/\phi_R = -1.541$
$\phi_b/\phi = -1.071$

TABLE 24

Embodiment 24 f = 100   $F_{No}$ = 1.9

|  | radius of curvature | axial distance | refractive index (Nd) | Abbe number (νd) |
|---|---|---|---|---|
| $L_1$ ( $r_1$* | −65.000 | $d_1$ 6.00 | $N_1$ 1.49140 | $\nu_1$ 57.82 |
| $r_2$ | 60.000 | | | |
| | | $d_2$ 1.50 | | |
| $L_2$ ( $r_3$ | 54.101 | $d_3$ 10.80 | $N_2$ 1.77250 | $\nu_2$ 49.77 |
| $r_4$ | 213.325 | | | |
| | | $d_4$ 4.86 | | |
| $L_3$ ( $r_5$ | −179.261 | $d_5$ 5.00 | $N_3$ 1.75000 | $\nu_3$ 25.14 |
| $r_6$ | 126.365 | | | |
| | | $d_6$ 15.01 | | |
| $L_4$ ( $r_7$ | 91.023 | $d_7$ 9.70 | $N_4$ 1.69680 | $\nu_4$ 56.47 |
| $r_8$ | −104.152 | | | |
| | | $d_8$ 35.17 | | |
| $L_5$ ( $r_9$** | −28.992 | $d_9$ 5.00 | $N_5$ 1.49140 | $\nu_5$ 57.82 |
| $r_{10}$ | −64.840 | | | |

Aspheric coefficients of $r_1$ a = 0.00000           d = −0.39367 × $10^{-12}$
b = −0.49693 × $10^{-6}$   e = 0.18750 × $10^{-15}$
c = −0.47090 × $10^{-10}$  f = −0.13641 × $10^{-18}$

Aspheric coefficients of $r_9$ a = 0.00000          d = 0.29566 × $10^{-10}$
b = 0.17741 × $10^{-5}$   e = −0.45608 × $10^{-13}$
c = −0.78400 × $10^{-8}$  f = 0.32900 × $10^{-16}$

Configuration of $L_1$ (17.0 < h < 34.0)

| h | ΔF |
|---|---|
| 17.0 | 0.0451 |
| 20.0 | 0.0912 |
| 24.0 | 0.2103 |
| 28.0 | 0.4530 |
| 32.0 | 0.9506 |
| 34.0 | 1.3783 |

Configuration of $L_5$ (1.00 < h < 25.1)

| h | ΔR |
|---|---|
| 10.0 | −0.0124 |
| 12.0 | −0.0234 |
| 16.0 | −0.0708 |
| 20.0 | −0.2067 |
| 24.0 | −0.6547 |
| 25.1 | −0.9322 |

$\phi_1/\phi = -0.038$
$\phi_F/\phi_R = -1.446$
$\phi_b/\phi = -0.788$

TABLE 25

Embodiment 25 f = 100   $F_{No}$ = 1.9

|  | radius of curvature | axial distance | refractive index (Nd) | Abbe number (νd) |
|---|---|---|---|---|
| $L_1$ ( $r_1$* | 60.000 | $d_1$ 6.00 | $N_1$ 1.49140 | $\nu_1$ 57.82 |
| $r_2$ | 65.000 | | | |
| | | $d_2$ 1.50 | | |
| $L_2$ ( $r_3$ | 59.312 | $d_3$ 10.80 | $N_2$ 1.77250 | $\nu_2$ 49.77 |
| $r_4$ | 169.543 | | | |
| | | $d_4$ 4.86 | | |
| $L_3$ ( $r_5$ | −143.328 | $d_5$ 5.01 | $N_3$ 1.75000 | $\nu_3$ 25.14 |
| $r_6$ | 128.529 | | | |
| | | $d_6$ 12.00 | | |
| $L_4$ ( $r_7$ | 85.412 | $d_7$ 9.71 | $N_4$ 1.69680 | $\nu_4$ 56.47 |
| $r_8$ | −87.301 | | | |
| | | $d_8$ 35.18 | | |
| $L_5$ ( $r_9$** | −28.887 | $d_9$ 5.00 | $N_5$ 1.49140 | $\nu_5$ 57.82 |
| $r_{10}$ | −64.086 | | | |

Aspheric coefficients of $r_1$ a = 0.00000           d = −0.47817 × $10^{-12}$
b = −0.66988 × $10^{-6}$   e = 0.15233 × $10^{-15}$
c = −0.15558 × $10^{-9}$   f = −0.23448 × $10^{-18}$

Aspheric coefficients of $r_9$ a = 0.00000          d = 0.31417 × $10^{-10}$
b = 0.13183 × $10^{-5}$   e = −0.48687 × $10^{-13}$
c = −0.83980 × $10^{-8}$  f = 0.32846 × $10^{-16}$

Configuration of $L_1$ (16.5 < h < 33.0)

| h | ΔF |
|---|---|
| 16.5 | 0.0553 |
| 20.0 | 0.1288 |
| 24.0 | 0.3035 |
| 28.0 | 0.6767 |
| 32.0 | 1.4940 |
| 33.0 | 1.8256 |

Configuration of $L_5$ (1.00 < h < 25.0)

| h | ΔR |
|---|---|
| 10.0 | −0.0075 |
| 12.0 | −0.0130 |
| 16.0 | −0.0362 |
| 20.0 | −0.1137 |
| 24.0 | −0.4034 |
| 25.0 | −0.5732 |

$\phi_1/\phi = 0.088$
$\phi_F/\phi_R = -1.479$
$\phi_b/\phi = -0.990$

TABLE 26

Embodiment 26 f = 100   $F_{No}$ = 1.9

|  | radius of curvature | axial distance | refractive index (Nd) | Abbe number (νd) |
|---|---|---|---|---|
| $L_1$ ( $r_1$* | 65.000 | $d_1$ 6.00 | $N_1$ 1.49140 | $\nu_1$ 57.82 |
| $r_2$ | 60.000 | | | |
| | | $d_2$ 1.50 | | |
| $L_2$ ( $r_3$ | 55.583 | $d_3$ 10.79 | $N_2$ 1.77250 | $\nu_2$ 49.77 |
| $r_4$ | 181.473 | | | |
| | | $d_4$ 4.85 | | |

TABLE 26-continued

Embodiment 26

| | | | | | | | |
|---|---|---|---|---|---|---|---|
| $L_3$ | $r_5$ | −154.441 | $d_5$ | 5.00 | $N_3$ 1.75000 | $\nu_3$ | 25.14 |
| | $r_6$ | 136.225 | | | | | |
| | | | $d_6$ | 13.51 | | | |
| $L_4$ | $r_7$ | 83.302 | $d_7$ | 9.70 | $N_4$ 1.69680 | $\nu_4$ | 56.47 |
| | $r_8$ | −94.795 | | | | | |
| | | | $d_8$ | 35.17 | | | |
| $L_5$ | $r_9$ | −29.720 | $d_9$ | 5.70 | $N_5$ 1.49140 | $\nu_5$ | 57.82 |
| | $r_{10}^{**}$ | −71.302 | | | | | |

Aspheric coefficients of $r_1$ a = 0.00000      d = −0.39211 × $10^{-12}$
b = −0.59864 × $10^{-6}$   e = 0.79566 × $10^{-16}$
c = −0.16716 × $10^{-9}$   f = −0.12142 × $10^{-18}$ Aspheric coefficients of $r_{10}$ a = 0.00000      d = −0.38689 × $10^{-13}$
b = −0.79943 × $10^{-7}$   e = 0.26571 × $10^{-16}$
c = −0.67728 × $10^{-10}$  f = −0.35059 × $10^{-19}$ Configuration of $L_3$ (16.7 < h < 33.5)

| h | ΔF |
|---|---|
| 16.7 | 0.0525 |
| 20.0 | 0.1162 |
| 24.0 | 0.2731 |
| 28.0 | 0.6013 |
| 32.0 | 1.2887 |
| 33.5 | 1.7131 |

Configuration of $L_6$ (11.9 < h < 29.7)

| h | ΔR |
|---|---|
| 11.9 | −0.0018 |
| 16.0 | −0.0065 |
| 20.0 | −0.0180 |
| 24.0 | −0.0433 |
| 28.0 | −0.0967 |
| 29.7 | −0.1344 |

$\phi_1/\phi = -0.038$
$\phi_F/\phi_R = -1.437$
$\phi_b/\phi = -0.921$

TABLE 27 embodiment 27 f = 100   $F_{No}$ = 1.9

| | radius of curvature | | axial distance | | refractive index (Nd) | | Abbe number (νd) |
|---|---|---|---|---|---|---|---|
| $r_1$ | 43.044 | | | | | | |
| | | $d_1$ | 11.44 | $N_1$ | 1.77250 | $\nu_1$ | 49.77 |
| $r_2$ | 111.505 | | | | | | |
| | | $d_2$ | 4.80 | | | | |
| $r_3$ | −159.682 | | | | | | |
| | | $d_3$ | 4.77 | $N_2$ | 1.76182 | $\nu_2$ | 26.55 |
| $r_4$ | 94.707 | | | | | | |
| | | $d_4$ | 5.83 | | | | |
| $r_5^*$ | 300.000 | | | | | | |
| | | $d_5$ | 4.43 | $N_3$ | 1.49140 | $\nu_3$ | 57.82 |
| $r_6$ | 550.000 | | | | | | |
| | | $d_6$ | 2.94 | | | | |
| $r_7$ | 71.824 | | | | | | |
| | | $d_7$ | 10.56 | $N_4$ | 1.62135 | $\nu_4$ | 61.28 |
| $r_8$ | −93.716 | | | | | | |
| | | $d_8$ | 29.68 | | | | |
| $r_9$ | −28.742 | | | | | | |
| | | $d_9$ | 3.82 | $N_5$ | 1.49140 | $\nu_5$ | 57.82 |
| $r_{10}$ | −118.089 | | | | | | |
| | | $d_{10}$ | 0.50 | | | | |
| $r_{11}$ | −206.817 | | | | | | |
| | | $d_{11}$ | 7.04 | $N_6$ | 1.77551 | $\nu_6$ | 37.90 |
| $r_{12}$ | −114.828 | | | | | | |

Aspheric coefficients of $r_5$ a = 0.00000      d = 0.13541 × $10^{-11}$
b = −0.14724 × $10^{-5}$   e = −0.15453 × $10^{-14}$
c = −0.43125 × $10^{-9}$   f = 0.60713 × $10^{-19}$ Configuration of $L_3$ (11.6 < h < 23.2)

TABLE 27-continued embodiment 27

| h | ΔF |
|---|---|
| 11.6 | 0.0273 |
| 12.0 | 0.0313 |
| 16.0 | 0.0996 |
| 20.0 | 0.2441 |
| 23.2 | 0.4485 |

$\phi_3/\phi = 0.075$
$\phi_F/\phi_R = -1.486$
$\phi_b/\phi = -0.633$

TABLE 28

Embodiment 28 f = 100   $F_{No}$ = 1.9

| | radius of curvature | | axial distance | | refractive index (Nd) | | Abbe number (νd) |
|---|---|---|---|---|---|---|---|
| $r_1$ | 45.403 | | | | | | |
| | | $d_1$ | 12.56 | $N_1$ | 1.74250 | $\nu_1$ | 52.51 |
| $r_2$ | 132.774 | | | | | | |
| | | $d_2$ | 4.80 | | | | |
| $r_3$ | −149.674 | | | | | | |
| | | $d_3$ | 4.82 | $N_2$ | 1.76182 | $\nu_2$ | 26.55 |
| $r_4$ | 116.804 | | | | | | |
| | | $d_4$ | 6.43 | | | | |
| $r_5^*$ | 1045.401 | | | | | | |
| | | $d_5$ | 4.43 | $N_3$ | 1.49140 | $\nu_3$ | 57.82 |
| $r_6$ | 157.516 | | | | | | |
| | | $d_6$ | 2.99 | | | | |
| $r_7$ | 70.073 | | | | | | |
| | | $d_7$ | 9.07 | $N_4$ | 1.6405 | $\nu_4$ | 60.08 |
| $r_8$ | −102.031 | | | | | | |
| | | $d_8$ | 12.59 | | | | |
| $r_9$ | −1513.362 | | | | | | |
| | | $d_9$ | 6.04 | $N_5$ | 1.67003 | $\nu_5$ | 47.15 |
| $r_{10}$ | −87.088 | | | | | | |
| | | $d_{10}$ | 10.07 | | | | |
| $r_{11}$ | −33.249 | | | | | | |
| | | $d_{11}$ | 4.53 | $N_6$ | 1.51763 | $\nu_6$ | 53.47 |
| $r_{12}$ | −453.980 | | | | | | |

Aspheric coefficients of $r_5$ a = 0.00000      d = 0.97229 × $10^{-12}$
b = −0.13886 × $10^{-5}$   e = −0.11551 × $10^{-14}$
c = −0.38608 × $10^{-9}$   f = 0.66975 × $10^{-19}$ Configuration of $L_3$ (11.5 < h < 23.0)

| h | ΔF |
|---|---|
| 11.5 | 0.0249 |
| 12.0 | 0.0296 |
| 16.0 | 0.0946 |
| 20.0 | 0.2336 |
| 23.0 | 0.4160 |

$\phi_3/\phi = -0.265$
$\phi_F/\phi_R = -1.927$
$\phi_b/\phi = -0.603$

TABLE 29

Embodiment 29 f = 100   $F_{No}$ = 1.9

| | radius of curvature | | axial distance | | refractive index (Nd) | | Abbe number (νd) |
|---|---|---|---|---|---|---|---|
| $r_1$ | 48.015 | | | | | | |
| | | $d_1$ | 10.50 | $N_1$ | 1.78850 | $\nu_1$ | 45.68 |
| $r_2$ | 259.800 | | | | | | |
| | | $d_2$ | 2.80 | | | | |
| $r_3$ | −272.610 | | | | | | |
| | | $d_3$ | 3.19 | $N_2$ | 1.80518 | $\nu_2$ | 25.43 |
| $r_4$ | 65.039 | | | | | | |
| | | $d_4$ | 7.00 | | | | |
| $r_5^*$ | −476.980 | | | | | | |
| | | $d_5$ | 5.01 | $N_3$ | 1.49140 | $\nu_3$ | 57.82 |
| $r_6$ | −601.862 | | | | | | |
| | | $d_6$ | 9.22 | | | | |
| $r_7$ | 281.103 | | | | | | |

TABLE 29-continued

Embodiment 29

| | | | | | | | |
|---|---|---|---|---|---|---|---|
| | | $d_7$ | 13.01 | $N_4$ | 1.67000 | $\nu_4$ | 57.07 |
| $r_8$ | −50.624 | | | | | | |
| | | $d_8$ | 37.50 | | | | |
| $r_9$ | −58.947 | | | | | | |
| | | $d_9$ | 7.50 | $N_5$ | 1.58144 | $\nu_5$ | 40.89 |
| $r_{10}$ | 1055.430 | | | | | | |

Aspheric coefficients of $r_5$ $a = 0.00000$  $d = -0.36270 \times 10^{-12}$
$b = -0.40044 \times 10^{-5}$  $e = -0.16887 \times 10^{-14}$
$c = -0.12788 \times 10^{-8}$  $f = 0.22283 \times 10^{-19}$

Configuration of $L_3$ ($11.8 < h < 23.5$)

| h | ΔF |
|---|---|
| 11.8 | 0.0813 |
| 12.0 | 0.0871 |
| 16.0 | 0.2873 |
| 20.0 | 0.7490 |
| 23.5 | 1.5565 |

$\phi_3/\phi = -0.021$
$\phi_F/\phi_R = -1.274$
$\phi_b/\phi = -1.350$

TABLE 30

Embodiment 30

$f = 100$  $F_{No} = 1.9$

| | radius of curvature | | axial distance | | refractive index (Nd) | | Abbe number ($\nu$d) |
|---|---|---|---|---|---|---|---|
| $r_1$ | 50.42 | | | | | | |
| | | $d_1$ | 12.19 | $N_1$ | 1.71300 | $\nu_1$ | 53.93 |
| $r_2$ | 118.679 | | | | | | |
| | | $d_2$ | 4.49 | | | | |
| $r_3$ | −130.261 | | | | | | |
| | | $d_3$ | 4.30 | $N_2$ | 1.75000 | $\nu_2$ | 25.14 |
| $r_4$ | 234.426 | | | | | | |
| | | $d_4$ | 6.49 | | | | |
| $r_5^*$ | −855.300 | | | | | | |
| | | $d_5$ | 4.21 | $N_3$ | 1.49140 | $\nu_3$ | 57.82 |
| $r_6$ | 121.111 | | | | | | |
| | | $d_6$ | 4.80 | | | | |
| $r_7$ | 68.884 | | | | | | |
| | | $d_7$ | 12.00 | $N_4$ | 1.69680 | $\nu_4$ | 56.47 |
| $r_8$ | −82.405 | | | | | | |
| | | $d_8$ | 33.71 | | | | |
| $r_9$ | −29.829 | | | | | | |
| | | $d_9$ | 5.02 | $N_5$ | 1.52584 | $\nu_5$ | 52.06 |
| $r_{10}$ | −70.512 | | | | | | |

Aspheric coefficients of $r_5$ $a = 0.00000$  $d = -0.60453 \times 10^{-12}$
$b = -0.18207 \times 10^{-5}$  $e = -0.29416 \times 10^{-15}$
$c = -0.11966 \times 10^{-9}$  $f = 0.70240 \times 10^{-19}$

Configuration of $L_3$ ($11.9 < h < 23.7$)

| h | ΔF |
|---|---|
| 11.9 | 0.0371 |
| 16.0 | 0.1242 |
| 20.0 | 0.3172 |
| 23.7 | 0.6700 |

$\phi_3/\phi = -0.464$
$\phi_F/\phi_R = -1.386$
$\phi_b/\phi = -0.379$

TABLE 31

Embodiment 31

$f = 100$  $F_{No} = 1.9$

| | radius of curvature | | axial distance | | refractive index (Nd) | | Abbe number ($\nu$d) |
|---|---|---|---|---|---|---|---|
| $r_1$ | 55.769 | | | | | | |
| | | $d_1$ | 13.92 | $N_1$ | 1.78850 | $\nu_1$ | 45.68 |
| $r_2$ | 328.197 | | | | | | |
| | | $d_2$ | 2.90 | | | | |
| $r_3$ | −280.652 | | | | | | |

TABLE 31-continued

Embodiment 31

| | | | | | | | |
|---|---|---|---|---|---|---|---|
| | | $d_3$ | 2.57 | $N_2$ | 1.80518 | $\nu_2$ | 25.43 |
| $r_4$ | 78.003 | | | | | | |
| | | $d_4$ | 7.97 | | | | |
| $r_5^*$ | −2738.675 | | | | | | |
| | | $d_5$ | 4.97 | $N_3$ | 1.49140 | $\nu_3$ | 57.82 |
| $r_6$ | 4958.34 | | | | | | |
| | | $d_6$ | 11.80 | | | | |
| $r_7$ | 279.463 | | | | | | |
| | | $d_7$ | 12.69 | $N_4$ | 1.67000 | $\nu_4$ | 57.07 |
| $r_8$ | −51.191 | | | | | | |
| | | $d_8$ | 38.28 | | | | |
| $r_9$ | −58.836 | | | | | | |
| | | $d_9$ | 7.98 | $N_5$ | 1.58144 | $\nu_5$ | 40.89 |
| $r_{10}$ | 923.497 | | | | | | |

Aspheric coefficients of $r_5$ $a = 0.00000$  $d = 0.77222 \times 10^{-12}$
$b = -0.37375 \times 10^{-5}$  $e = -0.24919 \times 10^{-14}$
$c = -0.19204 \times 10^{-8}$  $f = 0.10055 \times 10^{-19}$

Configuration of $L_3$ ($11.5 < h < 23.0$)

| h | ΔF |
|---|---|
| 11.5 | 0.0697 |
| 12.0 | 0.0831 |
| 16.0 | 0.2766 |
| 20.0 | 0.7266 |
| 23.0 | 1.3727 |

$\phi_3/\phi = -0.028$
$\phi_F/\phi_R = -1.247$
$\phi_b/\phi = -1.052$

TABLE 32

Embodiment 32

$f = 100$  $F_{No} = 1.9$

| | radius of curvature | | axial distance | | refractive index (Nd) | | Abbe number ($\nu$d) |
|---|---|---|---|---|---|---|---|
| $r_1$ | 48.188 | | | | | | |
| | | $d_1$ | 12.19 | $N_1$ | 1.71300 | $\nu_1$ | 53.93 |
| $r_2$ | 137.794 | | | | | | |
| | | $d_2$ | 4.79 | | | | |
| $r_3$ | −130.468 | | | | | | |
| | | $d_3$ | 4.30 | $N_2$ | 1.75000 | $\nu_2$ | 25.14 |
| $r_4$ | 197.441 | | | | | | |
| | | $d_4$ | 6.48 | | | | |
| $r_5$ | −644.654 | | | | | | |
| | | $d_5$ | 4.20 | $N_3$ | 1.49140 | $\nu_3$ | 57.82 |
| $r_6^*$ | 218.575 | | | | | | |
| | | $d_6$ | 4.79 | | | | |
| $r_7$ | 69.998 | | | | | | |
| | | $d_7$ | 12.00 | $N_4$ | 1.69680 | $\nu_4$ | 56.47 |
| $r_8$ | −95.853 | | | | | | |
| | | $d_8$ | 33.71 | | | | |
| $r_9$ | −29.921 | | | | | | |
| | | $d_9$ | 5.02 | $N_5$ | 1.52584 | $\nu_5$ | 52.06 |
| $r_{10}$ | −70.477 | | | | | | |

Aspheric coefficients of $r_6$ $a = 0.00000$  $d = 0.31945 \times 10^{-12}$
$b = 0.14655 \times 10^{-5}$  $e = -0.90916 \times 10^{-16}$
$c = 0.26330 \times 10^{-9}$  $f = -0.10538 \times 10^{-20}$

Configuration of $L_3$ ($11.7 < h < 23.4$)

| h | ΔF |
|---|---|
| 11.7 | 0.0282 |
| 12.0 | 0.0313 |
| 16.0 | 0.1017 |
| 20.0 | 0.2586 |
| 23.4 | 0.5068 |

$\phi_3/\phi = -0.301$
$\phi_F/\phi_R = -1.378$
$\phi_b/\phi = -0.458$

TABLE 33

Embodiment 33

$f = 100 \quad F_{No} = 1.9$

| radius of curvature | | axial distance | | refractive index (Nd) | | Abbe number ($\nu d$) |
|---|---|---|---|---|---|---|
| $r_1$ | 41.658 | | | | | |
| | | $d_1$ | 10.99 | $N_1$ | 1.60311 | $\nu_1$ 60.74 |
| $r_2$ | 97.435 | | | | | |
| | | $d_2$ | 3.89 | | | |
| $r_3^*$ | 199.944 | | | | | |
| | | $d_3$ | 4.37 | $N_2$ | 1.49140 | $\nu_2$ 57.82 |
| $r_4$ | 171.568 | | | | | |
| | | $d_4$ | 4.09 | | | |
| $r_5$ | −183.272 | | | | | |
| | | $d_5$ | 4.39 | $N_3$ | 1.84666 | $\nu_3$ 23.83 |
| $r_6$ | 106.630 | | | | | |
| | | $d_6$ | 6.27 | | | |
| $r_7$ | 81.287 | | | | | |
| | | $d_7$ | 12.92 | $N_4$ | 1.78850 | $\nu_4$ 45.68 |
| $r_8$ | −78.516 | | | | | |
| | | $d_8$ | 29.69 | | | |
| $r_9$ | −29.918 | | | | | |
| | | $d_9$ | 3.82 | $N_5$ | 1.51763 | $\nu_5$ 53.47 |
| $r_{10}$ | −139.845 | | | | | |
| | | $d_{10}$ | 0.50 | | | |
| $r_{11}$ | −221.492 | | | | | |
| | | $d_{11}$ | 7.05 | $N_6$ | 1.77250 | $\nu_6$ 49.77 |
| $r_{12}$ | −120.437 | | | | | |

Aspheric coefficients of $r_3$ $a = 0.00000 \quad d = -0.81942 \times 10^{-11}$
$b = -0.25836 \times 10^{-5} \quad e = 0.12817 \times 10^{-13}$
$c = 0.15915 \times 10^{-3} \quad f = -0.74104 \times 10^{-17}$ Configuration of $L_2$ (12.3 < h < 24.6)

| h | $\Delta F$ |
|---|---|
| 12.3 | 0.0570 |
| 16.0 | 0.1658 |
| 20.0 | 0.4204 |
| 24.6 | 1.0161 |

$\phi_2/\phi = -0.039$
$\phi_F/\phi_R = -1.403$
$(\phi_a + \phi_b)/\phi = -1.121$

TABLE 34

Embodiment 34

$f = 100 \quad F_{No} = 1.9$

| radius of curvature | | axial distance | | refractive index (Nd) | | Abbe number ($\nu d$) |
|---|---|---|---|---|---|---|
| $r_1$ | 42.748 | | | | | |
| | | $d_1$ | 11.00 | $N_1$ | 1.62280 | $\nu_1$ 56.98 |
| $r_2$ | 74.308 | | | | | |
| | | $d_2$ | 3.89 | | | |
| $r_3^*$ | 202.519 | | | | | |
| | | $d_3$ | 4.37 | $N_2$ | 1.49140 | $\nu_2$ 57.82 |
| $r_4$ | 333.610 | | | | | |
| | | $d_4$ | 4.11 | | | |
| $r_5$ | −105.626 | | | | | |
| | | $d_5$ | 4.39 | $N_3$ | 1.84666 | $\nu_3$ 23.83 |
| $r_6$ | 143.485 | | | | | |
| | | $d_6$ | 6.24 | | | |
| $r_7$ | 96.032 | | | | | |
| | | $d_7$ | 12.92 | $N_4$ | 1.78850 | $\nu_4$ 45.68 |
| $r_8$ | −78.295 | | | | | |
| | | $d_8$ | 12.60 | | | |
| $r_9$ | 486.563 | | | | | |
| | | $d_9$ | 6.04 | $N_5$ | 1.69350 | $\nu_5$ 51.83 |
| $r_{10}$ | −98.063 | | | | | |
| | | $d_{10}$ | 10.08 | | | |
| $r_{11}$ | −37.286 | | | | | |
| | | $d_{11}$ | 4.53 | $N_6$ | 1.51763 | $\nu_6$ 53.47 |
| $r_{12}$ | 335.398 | | | | | |

Aspheric coefficients of $r_3$ $a = 0.00000 \quad d = -0.88274 \times 10^{-11}$
$b = -0.24311 \times 10^{-5} \quad e = 0.13070 \times 10^{-13}$
$c = 0.17824 \times 10^{-8} \quad f = -0.74044 \times 10^{-17}$

TABLE 34-continued

Embodiment 34

Configuration of $L_2$ (12.3 < h < 24.5)

| h | $\Delta F$ |
|---|---|
| 12.3 | 0.0532 |
| 16.0 | 0.1550 |
| 20.0 | 0.3974 |
| 24.5 | 0.9643 |

$\phi_2/\phi = 0.096$
$\phi_F/\phi_R = -1.714$
$(\phi_a + \phi_b)/\phi = -1.541$

TABLE 35

Embodiment 35

$f = 100 \quad F_{No} = 1.9$

| radius of curvature | | axial distance | | refractive index (Nd) | | Abbe number ($\nu d$) |
|---|---|---|---|---|---|---|
| $r_1$ | 43.708 | | | | | |
| | | $d_1$ | 11.00 | $N_1$ | 1.60311 | $\nu_1$ 60.74 |
| $r_2$ | 91.406 | | | | | |
| | | $d_2$ | 3.90 | | | |
| $r_3^*$ | 200.574 | | | | | |
| | | $d_3$ | 4.38 | $N_2$ | 1.49140 | $\nu_2$ 57.82 |
| $r_4$ | 162.981 | | | | | |
| | | $d_4$ | 4.11 | | | |
| $r_5$ | −144.610 | | | | | |
| | | $d_5$ | 4.39 | $N_3$ | 1.84666 | $\nu_3$ 23.83 |
| $r_6$ | 125.561 | | | | | |
| | | $d_6$ | 6.25 | | | |
| $r_7$ | 88.474 | | | | | |
| | | $d_7$ | 12.91 | $N_4$ | 1.78850 | $\nu_4$ 45.68 |
| $r_8$ | −68.029 | | | | | |
| | | $d_8$ | 33.16 | | | |
| $r_9$ | −30.839 | | | | | |
| | | $d_9$ | 5.08 | $N_5$ | 1.49140 | $\nu_5$ 57.82 |
| $r_{10}$ | −93.589 | | | | | |

Aspheric coefficients of $r_3$ $a = 0.00000 \quad d = -0.84369 \times 10^{-11}$
$b = -0.30430 \times 10^{-5} \quad e = 0.12797 \times 10^{-13}$
$c = 0.11624 \times 10^{-8} \quad f = -0.74109 \times 10^{-17}$ Configuration of $L_2$ (12.3 < h < 24.6)

| h | $\Delta F$ |
|---|---|
| 12.3 | 0.0691 |
| 16.0 | 0.2042 |
| 20.0 | 0.5278 |
| 24.6 | 1.3137 |

$\phi_2/\phi = -0.054$
$\phi_F/\phi_R = -1.323$
$(\phi_a + \phi_b)/\phi = -1.303$

TABLE 36

Embodiment 36

$f = 100 \quad F_{No} = 1.9$

| radius of curvature | | axial distance | | refractive index (Nd) | | Abbe number ($\nu d$) |
|---|---|---|---|---|---|---|
| $r_1$ | 40.601 | | | | | |
| | | $d_1$ | 11.00 | $N_1$ | 1.60311 | $\nu_1$ 60.74 |
| $r_2$ | 72.769 | | | | | |
| | | $d_2$ | 3.90 | | | |
| $r_3$ | 202.888 | | | | | |
| | | $d_3$ | 4.38 | $N_2$ | 1.49140 | $\nu_2$ 57.82 |
| $r_4^*$ | 310.658 | | | | | |
| | | $d_4$ | 5.51 | | | |
| $r_5$ | −129.739 | | | | | |
| | | $d_5$ | 4.39 | $N_3$ | 1.84666 | $\nu_3$ 23.83 |
| $r_6$ | 132.255 | | | | | |
| | | $d_6$ | 6.26 | | | |
| $r_7$ | 84.638 | | | | | |
| | | $d_7$ | 12.91 | $N_4$ | 1.78850 | $\nu_4$ 45.68 |
| $r_8$ | −75.780 | | | | | |
| | | $d_8$ | 33.16 | | | |
| $r_9$ | −30.667 | | | | | |

TABLE 36-continued

Embodiment 36

|  |  |  |  |  |  |  |
|---|---|---|---|---|---|---|
|  | $d_9$ | 5.08 | $N_5$ | 1.49140 | $\nu_5$ | 57.82 |
| $r_{10}$ | −80.510 |  |  |  |  |  |

Aspheric coefficients of $r_4$

| a = 0.00000 | d = 0.20688 × $10^{-11}$ |
|---|---|
| b = 0.30463 × $10^{-5}$ | e = −0.33813 × $10^{-16}$ |
| c = 0.25199 × $10^{-9}$ | f = −0.79368 × $10^{-21}$ |

Configuration of $L_2$ (11.7 < h < 23.3)

| h | ΔF |
|---|---|
| 11.7 | 0.0585 |
| 12.0 | 0.0648 |
| 16.0 | 0.2127 |
| 20.0 | 0.5561 |
| 23.3 | 1.1162 |

$\phi_2/\phi = 0.085$
$\phi_F/\phi_R = -1.392$
$(\phi_a + \phi_b)/\phi = -1.395$

TABLE 37

Embodiment 37 f = 100  $F_{No} = 1.9$

| | radius of curvature | axial distance | | refractive index (Nd) | | Abbe number ($\nu d$) |
|---|---|---|---|---|---|---|
| $r_1$ | 40.380 | | | | | |
| | | $d_1$ 11.58 | $N_1$ | 1.71300 | $\nu_1$ | 53.93 |
| $r_2$ | 78.722 | | | | | |
| | | $d_2$ 7.38 | | | | |
| $r_3$ | −110.970 | | | | | |
| | | $d_3$ 4.49 | $N_2$ | 1.84666 | $\nu_2$ | 23.83 |
| $r_4$ | 221.875 | | | | | |
| | | $d_4$ 8.06 | | | | |
| $r_5$ | 58.648 | | | | | |
| | | $d_5$ 11.03 | $N_3$ | 1.69680 | $\nu_3$ | 56.47 |
| $r_6$ | −100.196 | | | | | |
| | | $d_6$ 0.50 | | | | |
| $r_7$* | −880.033 | | | | | |
| | | $d_7$ 5.03 | $N_4$ | 1.49140 | $\nu_4$ | 57.82 |
| $r_8$ | 392.977 | | | | | |
| | | $d_8$ 25.55 | | | | |
| $r_9$ | −27.741 | | | | | |
| | | $d_9$ 3.83 | $N_5$ | 1.53241 | $\nu_5$ | 51.54 |
| $r_{10}$ | −125.821 | | | | | |
| | | $d_{10}$ 0.50 | | | | |
| $r_{11}$ | −315.433 | | | | | |
| | | $d_{11}$ 7.05 | $N_6$ | 1.77250 | $\nu_6$ | 49.77 |
| $r_{12}$ | −109.320 | | | | | |

Aspheric coefficients of $r_7$

| a = 0.00000 | d = 0.22421 × $10^{-11}$ |
|---|---|
| b = −0.30345 × $10^{-5}$ | e = −0.25095 × $10^{-14}$ |
| c = −0.65228 × $10^{-10}$ | f = −0.67241 × $10^{-19}$ |

Configuration of $L_4$ (12.3 < h < 24.6)

| h | ΔF |
|---|---|
| 12.3 | 0.0177 |
| 16.0 | 0.0480 |
| 20.0 | 0.1125 |
| 24.6 | 0.2555 |

$\phi_4/\phi = 0.670$
$\phi_F/\phi_R = -1.815$
$\phi_c/\phi = 0.462$

TABLE 38

Embodiment 38 f = 100  $F_{No} = 1.9$

| | radius of curvature | axial distance | | refractive index (Nd) | | Abbe number ($\nu d$) |
|---|---|---|---|---|---|---|
| $r_1$ | 45.610 | | | | | |
| | | $d_1$ 9.66 | $N_1$ | 1.77250 | $\nu_1$ | 49.77 |
| $r_2$ | 99.085 | | | | | |
| | | $d_2$ 7.50 | | | | |
| $r_3$ | −88.435 | | | | | |
| | | $d_3$ 4.47 | $N_2$ | 1.70055 | $\nu_2$ | 30.11 |
| $r_4$ | 69.682 | | | | | |
| | | $d_4$ 6.00 | | | | |
| $r_5$ | 63.998 | | | | | |
| | | $d_5$ 11.04 | $N_3$ | 1.69680 | $\nu_3$ | 56.47 |
| $r_6$ | −250.538 | | | | | |
| | | $d_6$ 0.52 | | | | |
| $r_7$* | 266.168 | | | | | |
| | | $d_7$ 8.01 | $N_4$ | 1.49140 | $\nu_4$ | 57.82 |
| $r_8$ | −100.201 | | | | | |
| | | $d_8$ 12.55 | | | | |
| $r_9$ | 236.635 | | | | | |
| | | $d_9$ 8.01 | $N_5$ | 1.67003 | $\nu_5$ | 47.15 |
| $r_{10}$ | −190.135 | | | | | |
| | | $d_{10}$ 10.07 | | | | |
| $r_{11}$ | −33.693 | | | | | |
| | | $d_{11}$ 4.52 | $N_6$ | 1.49140 | $\nu_6$ | 57.82 |
| $r_{12}$ | −795.810 | | | | | |

Aspheric coefficients of $r_7$

| a = 0.00000 | d = −0.13529 × $10^{-11}$ |
|---|---|
| b = −0.87085 × $10^{-6}$ | e = 0.85364 × $10^{-15}$ |
| c = 0.83663 × $10^{-9}$ | f = −0.19936 × $10^{-18}$ |

Configuration of $L_4$ (10.7 < h < 21.3)

| h | ΔF |
|---|---|
| 10.3 | 0.0395 |
| 12.0 | 0.0623 |
| 16.0 | 0.1931 |
| 20.0 | 0.4583 |
| 21.3 | 0.5845 |

$\phi_4/\phi = -0.181$
$\phi_F/\phi_R = -1.465$
$\phi_c/\phi = 0.640$

TABLE 39

Embodiment 39 f = 100  $F_{No} = 1.9$

| | radius of curvature | axial distance | | refractive index (Nd) | | Abbe number ($\nu d$) |
|---|---|---|---|---|---|---|
| $r_1$ | 44.772 | | | | | |
| | | $d_1$ 9.70 | $N_1$ | 1.77250 | $\nu_1$ | 49.77 |
| $r_2$ | 91.914 | | | | | |
| | | $d_2$ 6.79 | | | | |
| $r_3$ | −97.857 | | | | | |
| | | $d_3$ 4.39 | $N_2$ | 1.76182 | $\nu_2$ | 26.55 |
| $r_4$ | 132.290 | | | | | |
| | | $d_4$ 8.66 | | | | |
| $r_5$ | 64.747 | | | | | |
| | | $d_5$ 13.32 | $N_3$ | 1.71300 | $\nu_3$ | 53.93 |
| $r_6$ | −104.487 | | | | | |
| | | $d_6$ 1.49 | | | | |
| $r_7$* | 395.662 | | | | | |
| | | $d_7$ 4.97 | $N_4$ | 1.49140 | $\nu_4$ | 57.82 |
| $r_8$ | 684.566 | | | | | |
| | | $d_8$ 28.36 | | | | |
| $r_9$ | −29.543 | | | | | |
| | | $d_9$ 5.62 | $N_5$ | 1.49140 | $\nu_5$ | 57.82 |
| $r_{10}$ | −69.014 | | | | | |

Aspheric coefficients of $r_7$

| a = 0.00000 | d = −0.12736 × $10^{-11}$ |
|---|---|
| b = −0.19325 × $10^{-5}$ | e = 0.45332 × $10^{-14}$ |
| c = −0.44791 × $10^{-10}$ | f = −0.51677 × $10^{-17}$ |

Configuration of $L_4$ (11.1 < h < 22.2)

| h | ΔF |
|---|---|
| 11.1 | 0.0296 |
| 12.0 | 0.0405 |
| 16.0 | 0.1293 |
| 20.0 | 0.3194 |
| 22.2 | 0.4921 |

$\phi_4/\phi = 0.053$
$\phi_F/\phi_R = -1.483$
$\phi_c/\phi = 0.805$

TABLE 40

Embodiment 40

$f = 100 \quad F_{No} = 1.9$

| radius of curvature | axial distance | refractive index (Nd) | Abbe number (νd) |
|---|---|---|---|
| $r_1$ 43.661 | | | |
| | $d_1$ 10.48 | $N_1$ 1.74250 | $\nu_1$ 52.51 |
| $r_2$ 91.666 | | | |
| | $d_2$ 6.77 | | |
| $r_3$ −98.053 | | | |
| | $d_3$ 4.27 | $N_2$ 1.76182 | $\nu_2$ 26.55 |
| $r_4$ 152.469 | | | |
| | $d_4$ 9.38 | | |
| $r_5$ 64.204 | | | |
| | $d_5$ 12.55 | $N_3$ 1.71300 | $\nu_3$ 53.93 |
| $r_6$ −114.486 | | | |
| | $d_6$ 0.65 | | |
| $r_7$ 459.538 | | | |
| | $d_7$ 5.71 | $N_4$ 1.49140 | $\nu_4$ 57.82 |
| $r_8^*$ 1158.412 | | | |
| | $d_8$ 25.35 | | |
| $r_9$ −29.606 | | | |
| | $d_9$ 5.88 | $N_5$ 1.49140 | $\nu_5$ 57.82 |
| $r_{10}$ −71.085 | | | |

Aspheric coefficients of $r_8$

$a = 0.00000 \qquad d = -0.11187 \times 10^{-11}$
$b = 0.20576 \times 10^{-5} \qquad e = -0.62206 \times 10^{-14}$
$c = 0.81855 \times 10^{-9} \qquad f = 0.15070 \times 10^{-16}$

Configuration of $L_4$ ($10.1 < h < 20.2$)

| h | ΔF |
|---|---|
| 10.1 | 0.0221 |
| 12.0 | 0.0444 |
| 16.0 | 0.1412 |
| 20.2 | 0.3664 |

$\phi_4/\phi = 0.065$
$\phi_F/\phi_R = -1.484$
$\phi_c\phi = 0.729$

TABLE 41

Embodiment 41

$f = 100 \quad F_{No} = 1.9$

| radius of curvature | axial distance | refractive index (Nd) | Abbe number (νd) |
|---|---|---|---|
| $r_1$ 65.000 | | | |
| | $d_1$ 6.00 | $N_1$ 1.49140 | $\nu_1$ 57.82 |
| $r_2^*$ 60.00 | | | |
| | $d_2$ 1.50 | | |
| $r_3$ 47.666 | | | |
| | $d_3$ 10.76 | $N_2$ 1.74250 | $\nu_2$ 52.51 |
| $r_4$ 150.973 | | | |
| | $d_4$ 5.00 | | |
| $r_5$ −153.917 | | | |
| | $d_5$ 4.51 | $N_3$ 1.75000 | $\nu_3$ 25.14 |
| $r_6$ 174.310 | | | |
| | $d_6$ 14.20 | | |
| $r_7$ 78.394 | | | |
| | $d_7$ 9.08 | $N_4$ 1.69680 | $\nu_4$ 56.47 |
| $r_8$ −129.332 | | | |
| | $d_8$ 29.70 | | |
| $r_9$ −29.475 | | | |
| | $d_9$ 4.50 | $N_5$ 1.54072 | $\nu_5$ 47.22 |
| $r_{10}$ −116.459 | | | |
| | $d_{10}$ 0.50 | | |
| $r_{11}$ −190.342 | | | |
| | $d_{11}$ 8.34 | $N_6$ 1.77250 | $\nu_6$ 49.77 |
| $r_{12}$ −97.378 | | | |

Aspheric coefficients of $r_2$

$a = 0.00000 \qquad d = 0.19222 \times 10^{-12}$
$b = 0.41341 \times 10^{-6} \qquad e = -0.15786 \times 10^{-15}$
$c = 0.27864 \times 10^{-10} \qquad f = 0.43709 \times 10^{-18}$

Configuration of $L_1$ ($12.7 < h < 25.4$)

| h | ΔF |
|---|---|
| 12.7 | 0.0110 |
| 16.0 | 0.0283 |
| 20.0 | 0.0730 |

TABLE 41-continued

| 24.0 | 0.1696 |
| 25.4 | 0.2267 |

$\phi_1/\phi = -0.038$
$\phi_F/\phi_R = -1.566$
$\phi_b/\phi = -0.991$

TABLE 42

Embodiment 42

$f = 100 \quad F_{No} = 1.9$

| radius of curvature | axial distance | refractive index (Nd) | Abbe number (νd) |
|---|---|---|---|
| $r_1$ 65.000 | | | |
| | $d_1$ 6.00 | $N_1$ 1.49140 | $\nu_1$ 57.82 |
| $r_2^*$ 60.000 | | | |
| | $d_2$ 1.50 | | |
| $r_3$ 43.420 | | | |
| | $d_3$ 10.59 | $N_2$ 1.74250 | $\nu_2$ 52.51 |
| $r_4$ 97.401 | | | |
| | $d_4$ 6.00 | | |
| $r_5$ −197.387 | | | |
| | $d_5$ 4.42 | $N_3$ 1.75000 | $\nu_3$ 25.14 |
| $r_6$ 143.844 | | | |
| | $d_6$ 11.77 | | |
| $r_7$ 62.874 | | | |
| | $d_7$ 9.67 | $N_4$ 1.69680 | $\nu_4$ 56.47 |
| $r_8$ 6862.468 | | | |
| | $d_8$ 12.59 | | |
| $r_9$ 413.592 | | | |
| | $d_9$ 6.05 | $N_5$ 1.67003 | $\nu_5$ 47.15 |
| $r_{10}$ −98.771 | | | |
| | $d_{10}$ 10.07 | | |
| $r_{11}$ −30.148 | | | |
| | $d_{11}$ 4.55 | $N_6$ 1.49140 | $\nu_6$ 57.82 |
| $r_{12}$ −206.403 | | | |

Aspheric coefficients of $r_2$

$a = 0.00000 \qquad d = 0.15612 \times 10^{-11}$
$b = 0.45883 \times 10^{-6} \qquad e = -0.13792 \times 10^{-14}$
$c = -0.64855 \times 10^{-9} \qquad f = 0.55244 \times 10^{-18}$

Configuration of $L_1$ ($12.7 < h < 25.4$)

| h | ΔF |
|---|---|
| 12.7 | 0.0101 |
| 16.0 | 0.0245 |
| 20.0 | 0.0600 |
| 24.0 | 0.1329 |
| 25.4 | 0.1762 |

$\phi_1/\phi = -0.038$
$\phi_F/\phi_R = -2.534$
$\phi_b/\phi = -1.160$

TABLE 43

Embodiment 43

$f = 100 \quad F_{No} = 1.9$

| radius of curvature | axial distance | refractive index (Nd) | Abbe number (νd) |
|---|---|---|---|
| $r_1$ 57.983 | | | |
| | $d_1$ 6.00 | $N_1$ 1.49140 | $\nu_1$ 57.82 |
| $r_2^*$ 54.511 | | | |
| | $d_2$ 1.50 | | |
| $r_3$ 60.162 | | | |
| | $d_3$ 10.79 | $N_2$ 1.77250 | $\nu_2$ 49.77 |
| $r_4$ 181.975 | | | |
| | $d_4$ 6.00 | | |
| $r_5$ −118.815 | | | |
| | $d_5$ 4.75 | $N_3$ 1.84666 | $\nu_3$ 23.83 |
| $r_6$ 315.110 | | | |
| | $d_6$ 14.88 | | |
| $r_7$ 75.442 | | | |
| | $d_7$ 11.78 | $N_4$ 1.71300 | $\nu_4$ 53.93 |
| $r_8$ −106.069 | | | |
| | $d_8$ 35.47 | | |
| $r_9$ −29.605 | | | |
| | $d_9$ 4.36 | $N_5$ 1.54072 | $\nu_5$ 47.22 |
| $r_{10}$ −65.226 | | | |

TABLE 43-continued

Aspheric coefficients of $r_2$ a = 0.00000
b = 0.59134 × 10$^{-6}$
c = −0.50604 × 10$^{-9}$
d = 0.25075 × 10$^{-11}$
e = −0.32984 × 10$^{-14}$
f = 0.22263 × 10$^{-17}$

Configuration of $L_1$ (12.6 < h < 25.3)

| h | ΔF |
|---|---|
| 12.6 | 0.0142 |
| 16.0 | 0.0380 |
| 20.0 | 0.1018 |
| 24.0 | 0.2477 |
| 25.3 | 0.3292 |

$\phi_1/\phi = -0.023$
$\phi_F/\phi_R = -1.388$
$\phi_b/\phi = -1.155$

TABLE 44

Embodiment 44
f = 100    F$_{No}$ = 1.9

| | radius of curvature | | axial distance | refractive index (Nd) | Abbe number (νd) |
|---|---|---|---|---|---|
| $r_1$* | 60.000 | | | | |
| | | $d_1$ | 6.00 | $N_1$ 1.49140 | $\nu_1$ 57.82 |
| $r_2$ | 65.000 | | | | |
| | | $d_2$ | 1.50 | | |
| $r_3$ | 58.393 | | | | |
| | | $d_3$ | 10.80 | $N_2$ 1.77250 | $\nu_2$ 49.77 |
| $r_4$ | 152.755 | | | | |
| | | $d_4$ | 4.86 | | |
| $r_5$ | −173.605 | | | | |
| | | $d_5$ | 5.00 | $N_3$ 1.75000 | $\nu_3$ 25.14 |
| $r_6$ | 86.286 | | | | |
| | | $d_6$ | 10.01 | | |
| $r_7$ | 72.999 | | | | |
| | | $d_7$ | 11.69 | $N_4$ 1.69680 | $\nu_4$ 56.47 |
| $r_8$ | −80.681 | | | | |
| | | $d_8$ | 35.17 | | |
| $r_9$ | −28.954 | | | | |
| | | $d_9$ | 5.00 | $N_5$ 1.49140 | $\nu_5$ 57.82 |
| $r_{10}$ | −65.203 | | | | |

Aspheric coefficients of $r_1$ a = 0.00000
b = −0.84228 × 10$^{-6}$
c = −0.46386 × 10$^{-9}$
d = −0.14611 × 10$^{-12}$
e = −0.46427 × 10$^{-15}$
f = 0.51543 × 10$^{-19}$

Configuration of $L_1$ (13.2 < h < 26.3)

| h | ΔF |
|---|---|
| 13.2 | 0.0282 |
| 16.0 | 0.0641 |
| 20.0 | 0.1727 |
| 24.0 | 0.4117 |
| 26.3 | 0.6578 |

$\phi_1/\phi = 0.088$
$\phi_F/\phi_R = -1.474$
$\phi_b/\phi = -0.948$

TABLE 45

| Embodiment | $\phi_P/\phi$ | $\phi_R/\phi$ | Embodiment | $\phi_P/\phi$ | $\phi_R/\phi$ |
|---|---|---|---|---|---|
| 1 | 1.23 | −0.92 | 23 | 1.02 | −0.84 |
| 2 | 1.20 | −0.61 | 24 | 1.10 | −0.89 |
| 3 | 1.42 | −0.79 | 25 | 0.88 | −0.89 |
| 4 | 1.20 | −0.98 | 26 | 1.00 | −0.92 |
| 5 | 1.10 | −0.96 | 27 | 1.18 | −0.92 |
| 6 | 1.09 | −0.92 | 28 | 1.14 | −0.61 |
| 7 | 1.11 | −0.96 | 29 | 1.37 | −1.04 |
| 8 | 1.07 | −0.93 | 30 | 0.99 | −0.97 |
| 9 | 0.88 | −0.92 | 31 | 1.20 | −1.05 |
| 10 | 0.90 | −0.75 | 32 | 1.02 | −0.97 |
| 11 | 0.91 | −0.96 | 33 | 0.89 | −0.99 |
| 12 | 0.85 | −1.00 | 34 | 0.70 | −0.56 |
| 13 | 0.89 | −0.99 | 35 | 0.78 | −1.04 |
| 14 | 0.89 | −0.99 | 36 | 0.74 | −0.96 |
| 15 | 0.93 | −0.86 | 37 | 0.97 | −0.94 |
| 16 | 0.92 | −0.67 | 38 | 0.99 | −0.66 |
| 17 | 0.98 | −0.91 | 39 | 0.96 | −0.91 |
| 18 | 0.97 | −0.91 | 40 | 0.97 | −0.92 |
| 19 | 0.98 | −0.91 | 41 | 1.11 | −0.87 |
| 20 | 1.01 | −1.00 | 42 | 1.03 | −0.43 |
| 21 | 1.21 | −0.88 | 43 | 0.89 | −0.95 |
| 22 | 1.16 | −0.58 | 44 | 0.86 | −0.90 |

What is claimed is:

1. A photographic lens system comprising from the object side to the image side;

a front lens unit of a positive refractive power including at least four lens components containing a front lens component with an aspheric surface; and a rear lens unit of a negative refractive power including a rear lens component with an aspheric surface;

wherein the lens system fulfills the following condition when $0.5\ R_F < h < R_F$ is maintained:

$$t_F(h) > r_l\left(1 - \sqrt{1 - \left(\frac{h}{r_l}\right)^2}\right) -$$

$$r_k\left(1 - \sqrt{1 - \left(\frac{h}{r_k}\right)^2}\right) + d_F$$

wherein, h; the height from the optical axis, $t_F(h)$; the thickness of the front lens component on the height h, $r_k$; the paraxial radius of curvature of the object side surface of the front lens component, $r_l$; the paraxial radius of curvature of the image side surface of the front lens component, $d_F$; the axial thickness of the front lens component, and $R_F$; the minimum value among $|r_k|$, $|r_l|$, and the effective height of the aspheric surface of the front lens component.

2. A photographic lens system as claimed in claim 1, wherein the lens system further fulfills the following condition when $0.4\ R_R < h < R_R$ is maintained:

$$t_R(h) < r_n\left(1 - \sqrt{1 - \left(\frac{h}{r_n}\right)^2}\right) -$$

$$r_m\left(1 - \sqrt{1 - \left(\frac{h}{r_m}\right)^2}\right) + d_R$$

wherein, $t_R(h)$; the thickness of the rear lens component on the height h, $r_m$; the paraxial radius of curvature of the object side surface of the rear lens component, $r_n$; the paraxial radius of curvature of the image side surface of the rear lens component, $d_R$; the axial thickness of the rear lens component, and $R_R$; the minimum value among $|r_k|$, $|r_l|$, and the effective height of the aspheric surface of the rear lens component.

3. A photographic lens system as claimed in claim 2, wherein the front lens unit includes from the object side, a positive first lens component convex to the object side, a negative second lens component, a third lens component having at least an aspheric surface, and a positive fourth lens component, and the rear lens unit includes a negative fifth lens component concave to the object side with having at least an aspheric surface, and wherein the lens system fulfills the following condition;

$$-1.0 < \phi_3/\phi < 1.0$$

wherein, $\phi_3$; the refractive power of the third lens component, and $\phi$; the refractive power of the whole lens system.

4. A photographic lens system, as claimed in claim 3, wherein the lens system fulfills the following condition:

$$-2.0 < \phi_F/\phi_R < -1.0$$

$$-1.7 < \phi_b/\phi < 0$$

wherein, $\phi_F$; the refractive power of the front lens unit, $\phi_R$; the refractive power of the rear lens unit, and $\phi_b$; the refractive power of an air lens formed between the second and third lens components.

5. A photographic lens system as claimed in claim 4, wherein the lens system fulfills the following conditions:

$$0.6 < \phi_P/\phi < 1.5$$

$$-1.1 < \phi_R/\phi < -0.3$$

wherein, $\phi_P$; the refractive power of the first lens component.

6. A photographic lens system as claimed in claim 2, wherein the front lens unit includes from the object side, a positive first lens component convex to the object side, a second lens component having at least an aspheric surface, a negative third lens component, and a positive fourth lens component, and the rear lens unit includes a negative fifth lens component concave to the object surface having at least an aspheric surface, and wherein the lens system fulfills the following condition, $$-1.0 < \phi_2/\phi < 1.0$$

wherein, $\phi_2$; the refractive power of the second lens component, and $\phi$; the refractive power of the whole lens system.

7. A photographic lens system as claimed in claim 6, wherein the lens system fulfills the following conditions:

$$-2.0 < \phi_F/\phi_R < -1.0$$

$$-2.0 < (\phi_a + \phi_b)/\phi < -0.5$$

wherein, $\phi_F$; the refractive power of the front lens unit, $\phi_R$; the refractive power of the rear lens unit, $\phi_a$; the refractive power of an air lens formed between the first and second lens components, and $\phi_b$; the refractive power of an air lens formed between the second and third lens components.

8. A photographic lens system as claimed in claim 7, wherein the lens system fulfills the following condition:

$$0.6 < \phi_P/\phi < 1.5$$

$$-1.1 < \phi_R/\phi < -0.3$$

wherein, $\phi_P$; the refractive power of the first lens component.

9. A photographic lens system as claimed in claim 2, wherein the front lens unit includes from the object side, a positive first lens component, a negative second lens component, a positive third lens component, and a fourth lens component having at least an aspheric surface, and the rear lens unit includes a negative fifth lens component concave to the object side having at least an aspheric surface, and wherein the lens system fulfills the following condition:

$$-1.0 < \phi_4/\phi < 1.0$$

wherein, $\phi_4$; the refractive power of the fourth lens component, and $\phi$; the refractive power of the whole lens system.

10. A photographic lens system as claimed in claim 9, wherein the lens system fulfills the following conditions:

$$-2.0 < \phi_F/\phi_R < -1.0$$

$$0 < \phi_c/\phi < 1.5$$

wherein, $\phi_F$; the refractive power of the front lens unit, $\phi_R$; the refractive power of the rear lens unit, and $\phi_c$; the refractive power of an air lens formed between the third and fourth lens components.

11. An photographic lens system as claimed in claim 10, wherein the lens system fulfill the following conditions:

$$0.6 < \phi_P/\phi < 1.5$$

$$-1.1 < \phi_R/\phi < -0.3$$

wherein, $\phi_P$; the refractive power of the first lens component.

12. A photographic lens system as claimed in claim 2, wherein the front lens unit includes from the object side, a first lens component having at least an aspheric surface, a positive second lens component convex to the object side, a negative third lens component, and a positive fourth lens component, and the rear lens unit includes a fifth lens component concave to the object side having at least an aspheric surface, and wherein the lens system fulfills the following condition:

$$-1.0 < \phi_1/\phi < 1.0$$

wherein, $\phi_1$; the refractive power of the first lens component, and $\phi$; the refractive power of the whole lens system.

13. A photographic lens system as claimed in claim 12, wherein the lens system fulfills the following conditions:

$$-2.0 < \phi_F/\phi_R < -1.0$$

$$-2.0 < \phi_b/\phi < -0.2$$

wherein, $\phi_F$; the refractive power of the front lens unit,
$\phi_R$; the refractive power of the rear lens unit, and
$\phi_b$; the refractive power of an air lens formed between the second and third lens components.

14. A photographic lens system as claimed in claim 13, wherein the lens system fulfills the following conditions:

$$0.6 < \phi_p < 1.5$$

$$-1.1 < \phi_R/\phi < -0.3$$

wherein, $\phi_p$; the refractive power of the second lens component, and
$\phi_R$; the refractive power of the rear lens unit.

15. A photographic lens system comprising from the object side to the image side:
a front lens unit of a positive refractive power including at least four lens components and having an aspheric surface, and
a rear lens unit of a negative refractive power all of whose refractive surfaces are spheric, wherein the lens system fulfills the following condition when $0.5\, R_F < h < R_F$ is maintained:

$$t_F(h) > r_l\left(1 - \sqrt{1 - \left(\frac{h}{r_l}\right)^2}\right) - r_k\left(1 - \sqrt{1 - \left(\frac{h}{r_k}\right)^2}\right) + d_F$$

wherein, h; the height from the optical axis,
$t_F(h)$; the thickness of the lens component having the aspheric surface in the front lens unit on the height h,
$r_k$; the paraxial radius of curvature of the object side surface of the lens component having the aspheric surface in the front lens unit,
$r_l$; the paraxial radius of curvature of the image side surface of the lens component having the aspheric surface in the front lens unit,
$d_F$; the axial thickness of the lens component having the aspheric surface in the front lens unit, and
$R_F$; the minimum value among $|r_k|$, $|r_l|$, and the effective height of the aspheric surface of the front lens unit.

16. A photographic lens system as claimed in claim 15, wherein the rear lens unit includes a negative lens component concave to the object side, and wherein the lens system fulfills the following condition:

$$-0.75 < \phi \cdot r_R < -0.15$$

wherein, $\phi$; the refractive power of the whole lens system, and
$r_R$; the radius of curvature of the object side surface of said negative lens component.

17. A photographic lens system as claimed in claim 16, wherein the front lens unit includes from the object side, a positive first lens component convex to the object side, a negative second lens component, a third lens component having at least an aspheric surface, and a positive fourth lens component, and the rear lens unit includes a negative fifth lens component concave to the object side, and wherein the lens system fulfills the following condition;

$$-1.0 < \phi_3/\phi < 1.0$$

wherein, $\phi_3$: the refractive power of the third lens component.

18. A photographic lens system as claimed in claim 17, wherein the lens system fulfills the following condition:

$$-1.7 < \phi_b/\phi < 0$$

wherein, $\phi_b$; the refractive power of an air lens formed between the second and third lens components.

19. A photographic lens system as claimed in claim 18, wherein the lens systems fulfills the following conditions:

$$0.6 < \phi_p/\phi < 1.5$$

$$-1.1 < \phi_R/\phi < -0.3$$

wherein, $\phi_p$ is the refractive power of the first lens component and
$\phi_R$ is the refractive power of the rear lens unit.

20. A photographic lens system as claimed in claim 16, wherein the front lens unit includes from the object side, a positive first lens component convex to the object side, a second component having at least an aspheric surface, a negative third lens component, and a positive fourth lens component, and the rear lens unit includes a negative fifth lens component concave to the object surface, and wherein the lens system fulfills the following condition:

$$-1.0 < \phi_2/\phi < 1.0$$

wherein, $\phi_2$; the refractive power of the second lens component, and
$\phi$; the refractive power of the whole lens system.

21. A photographic lens system as claimed in claim 20, wherein the lens system fulfills the following condition:

$$-2.0 < (\phi_a + \phi_b)/\phi < -0.5$$

wherein, $\phi_a$; the refractive power of an air lens formed between the first and second lens components, and
$\phi_b$; the refractive power of an air lens formed between the second and third lens components.

22. A photographic lens system as claimed in claim 21, wherein the lens system fulfills the following conditions:

$$0.6 < \phi_p/\phi < 1.5$$

$$-1.1 < \phi_R/\phi < -1.3$$

wherein, $\phi_p$ is the refractive power of the first lens component and $\phi_R$ is the refractive power of the rear lens unit.

23. A photographic lens system as claimed in claim 16, wherein the front lens unit includes from the object side, a positive first lens component convex to the object side, a negative second lens component, a positive third lens component, and a fourth lens component having at least an aspheric surface, and the rear lens unit includes a negative fifth lens component concave to the object side, and wherein the lens system fulfills the following condition:

$$-1.0 < \phi_4/\phi < 1.0$$

wherein, $\phi_4$; the refractive power of the fourth lens component, and $\phi$; the refractive power of the whole lens system.

24. A photographic lens system as claimed in claim 23, wherein the lens system fulfills the following condition:

$$0 < \phi_c/\phi < 1.5$$

wherein, $\phi_c$; the refractive power of an air lens formed between the third and fourth lens components.

25. A photographic lens system as claimed in claim 24, wherein the lens system fulfills the following conditions:

$$0.6 < \phi_p/\phi < 1.5$$

$$-1.1 < \phi_R/\phi < -0.3$$

wherein, $\phi_p$ is the refractive power of the first lens component and $\phi_R$ is the refractive power of the rear lens unit.

26. A photographic lens system as claimed in claim 16, wherein the front lens unit includes from the object side, a first lens component having at least an aspheric surface, a positive second lens component convex to the object side, a negative third lens component, and a positive fourth lens component, and the rear lens unit includes a fifth lens component concave to the object side, and wherein the lens system fulfills the following condition:

$$-1.0 < \phi_1/\phi < 1.0$$

wherein, $\phi_1$; the refractive power of the first lens component, and $\phi$; the refractive power of the whole lens system.

27. A phographic lens system as claimed in claim 26, wherein the lens system fulfills the following conditions:

$$-2.0 < \phi_b/\phi < -0.2$$

wherein, $\phi_b$; the refractive power of an air lens formed between the second and third lens components.

28. A photographic lens system as claimed in claim 27, wherein the lens system fulfills the following conditions:

$$0.6 < \phi_p/\phi < 1.5$$

$$-1.1 < \phi_R/\phi < -0.3$$

wherein, $\phi_p$ is the refractive power of the first lens component and $\phi_R$ is the refractive power of the rear lens unit.

* * * * *